United States Patent
Ouchi

(10) Patent No.: US 7,702,736 B2
(45) Date of Patent: *Apr. 20, 2010

(54) WORKFLOW SYSTEMS AND METHODS FOR PROJECT MANAGEMENT AND INFORMATION MANAGEMENT

(75) Inventor: Norman Ken Ouchi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/022,896

(22) Filed: Jan. 30, 2008

(65) Prior Publication Data

US 2008/0140792 A1  Jun. 12, 2008

Related U.S. Application Data

(60) Continuation of application No. 10/037,545, filed on Dec. 21, 2001, now Pat. No. 7,546,346, which is a continuation-in-part of application No. 09/417,280, filed on Oct. 13, 1999, now Pat. No. 6,442,594, which is a division of application No. 08/901,539, filed on Jul. 28, 1997, now Pat. No. 5,978,836.

(51) Int. Cl.
*G06F 15/16* (2006.01)
*G06F 15/173* (2006.01)
(52) U.S. Cl. ..................... 709/206; 709/238
(58) Field of Classification Search ............... 709/206, 709/238
See application file for complete search history.

(56) References Cited

U.S. PATENT DOCUMENTS

| 4,503,499 A | 3/1985 | Mason et al. |
| 4,799,156 A | 1/1989 | Shavit et al. |
| 5,040,142 A | 8/1991 | Mori et al. |
| 5,113,393 A | 5/1992 | Kam et al. |
| 5,125,075 A | 6/1992 | Goodale et al. |
| 5,182,705 A | 1/1993 | Barr et al. |

(Continued)

FOREIGN PATENT DOCUMENTS

EP  91401268.7  11/1991

(Continued)

OTHER PUBLICATIONS

Alexander Schill, Distributed System and Execution Model for Office Environments, Computer Communications, Oct. 1991, pp. 478-488, No. 8, London, GB.

(Continued)

*Primary Examiner*—George C Neurauter, Jr.

(57) ABSTRACT

The present invention relates to workflow systems and methods. In one embodiment, the invention relates to integration of a calendar system with a workflow system where a calendar event can initiate a workflow by sending a message to a form route manager. The completion of a workflow or step in the workflow can result in sending a message to a calendar system to generate an event. In another embodiment, the invention relates to the integration of workflow with a project management system that includes project segments, which are processes that can be defined and controlled by workflow routes. The project management system sends a message to the workflow system to initiate workflow and the workflow system sends a message to the project management system, for example, at the completion of the workflow route. The relationship between the workflow routes can maintain the relationship between the project segments. If the relationships between project segments change, the relationship between the workflow routes changes without added effort.

22 Claims, 40 Drawing Sheets

U.S. PATENT DOCUMENTS

| | | | |
|---|---|---|---|
| 5,191,522 A | 3/1993 | Bosco et al. |
| 5,311,438 A | 5/1994 | Sellers et al. |
| 5,329,626 A | 7/1994 | Klein et al. |
| 5,436,730 A | 7/1995 | Hube |
| 5,457,797 A | 10/1995 | Butterworth et al. |
| 5,466,159 A | 11/1995 | Clark et al. |
| 5,469,353 A | 11/1995 | Pinsky et al. |
| 5,490,097 A | 2/1996 | Swenson et al. |
| 5,499,364 A | 3/1996 | Klein et al. |
| 5,513,101 A | 4/1996 | Pinsky et al. |
| 5,535,322 A | 7/1996 | Hecht |
| 5,548,506 A | 8/1996 | Srinivasan |
| 5,557,515 A | 9/1996 | Abbruzzese et al. |
| 5,586,252 A | 12/1996 | Barnard et al. |
| 5,623,600 A | 4/1997 | Ji et al. |
| 5,627,764 A | 5/1997 | Schutzman et al. |
| 5,632,018 A | 5/1997 | Otorii |
| 5,655,084 A | 8/1997 | Pinsky et al. |
| 5,666,481 A | 9/1997 | Lewis |
| 5,666,492 A | 9/1997 | Rhodes et al. |
| 5,675,745 A | 10/1997 | Oku et al. |
| 5,701,484 A | 12/1997 | Artsy |
| 5,706,452 A | 1/1998 | Ivanov |
| 5,710,921 A | 1/1998 | Hirose |
| 5,716,213 A | 2/1998 | Clark et al. |
| 5,726,920 A | 3/1998 | Chen et al. |
| 5,732,200 A | 3/1998 | Becker et al. |
| 5,734,837 A | 3/1998 | Flores et al. |
| 5,735,694 A | 4/1998 | Clark et al. |
| 5,737,727 A | 4/1998 | Lehmann et al. |
| 5,745,687 A | 4/1998 | Randell |
| 5,745,901 A | 4/1998 | Etner et al. |
| 5,751,960 A | 5/1998 | Matsunaga |
| 5,754,857 A | 5/1998 | Gadol |
| 5,761,404 A | 6/1998 | Murakami et al. |
| 5,765,033 A | 6/1998 | Miloslavsky |
| 5,765,038 A | 6/1998 | Flannery et al. |
| 5,767,847 A | 6/1998 | Morie et al. |
| 5,768,506 A | 6/1998 | Randell |
| 5,774,656 A | 6/1998 | Hattori et al. |
| 5,774,661 A | 6/1998 | Chatterjee et al. |
| 5,781,857 A | 7/1998 | Hwang et al. |
| 5,781,901 A | 7/1998 | Kuzma |
| 5,787,175 A | 7/1998 | Carter |
| 5,790,789 A | 8/1998 | Suarez |
| 5,790,790 A | 8/1998 | Smith et al. |
| 5,790,847 A | 8/1998 | Fisk et al. |
| 5,794,039 A | 8/1998 | Guck |
| 5,799,297 A | 8/1998 | Goodridge et al. |
| 5,802,253 A | 9/1998 | Gross et al. |
| 5,802,493 A | 9/1998 | Sheflott et al. |
| 5,805,810 A | 9/1998 | Maxwell |
| 5,822,526 A | 10/1998 | Waskiewicz |
| 5,826,020 A | 10/1998 | Randell |
| 5,826,239 A | 10/1998 | Du et al. |
| 5,826,269 A | 10/1998 | Hussey |
| 5,832,455 A | 11/1998 | Hayashi et al. |
| 5,835,758 A | 11/1998 | Nochur et al. |
| 5,838,923 A | 11/1998 | Lee et al. |
| 5,845,255 A | 12/1998 | Mayaud |
| 5,848,248 A | 12/1998 | Kawasaki et al. |
| 5,848,271 A | 12/1998 | Caruso et al. |
| 5,848,393 A | 12/1998 | Goodridge et al. |
| 5,850,519 A | 12/1998 | Vazana |
| 5,856,978 A | 1/1999 | Anthias et al. |
| 5,862,322 A | 1/1999 | Anglin et al. |
| 5,867,824 A | 2/1999 | Saito et al. |
| 5,870,545 A | 2/1999 | Davis et al. |
| 5,870,717 A | 2/1999 | Wiecha et al. |
| 5,870,719 A | 2/1999 | Maritzen et al. |
| 5,874,954 A | 2/1999 | Kilmer et al. |
| 5,878,398 A | 3/1999 | Tokuda et al. |
| 5,878,403 A | 3/1999 | DeFrancesco et al. |
| 5,890,149 A | 3/1999 | Schmonsees |
| 5,892,900 A | 4/1999 | Ginter et al. |
| 5,892,905 A | 4/1999 | Brandt et al. |
| 5,903,877 A | 5/1999 | Berkowitz et al. |
| 5,907,705 A | 5/1999 | Carter |
| 5,910,987 A | 6/1999 | Ginter et al. |
| 5,915,019 A | 6/1999 | Ginter et al. |
| 5,917,912 A | 6/1999 | Ginter et al. |
| 5,920,725 A | 7/1999 | Ma et al. |
| 5,920,861 A | 7/1999 | Hall et al. |
| 5,923,552 A | 7/1999 | Brown et al. |
| 5,930,512 A | 7/1999 | Boden et al. |
| 5,930,801 A | 7/1999 | Falkenhainer et al. |
| 5,940,829 A | 8/1999 | Tsuiki et al. |
| 5,943,422 A | 8/1999 | Van Wie et al. |
| 5,949,876 A | 9/1999 | Ginter et al. |
| 5,950,169 A | 9/1999 | Borghesi et al. |
| 5,956,693 A | 9/1999 | Geerling |
| 5,960,200 A | 9/1999 | Eager et al. |
| 5,960,404 A | 9/1999 | Chaar et al. |
| 5,970,475 A | 10/1999 | Barnes et al. |
| 5,978,804 A | 11/1999 | Dietzman |
| 5,978,836 A | 11/1999 | Ouchi |
| 5,982,891 A | 11/1999 | Ginter et al. |
| 5,986,568 A | 11/1999 | Suziki et al. |
| 5,987,422 A | 11/1999 | Buzsaki |
| 5,991,733 A | 11/1999 | Aleia et al. |
| 5,999,911 A | 12/1999 | Berg et al. |
| 6,004,276 A | 12/1999 | Wright et al. |
| 6,006,195 A | 12/1999 | Marchak et al. |
| 6,006,215 A | 12/1999 | Retallick |
| 6,014,135 A | 1/2000 | Fernandes |
| 6,016,478 A | 1/2000 | Zhang et al. |
| 6,023,702 A | 2/2000 | Leisten et al. |
| 6,029,171 A | 2/2000 | Smiga et al. |
| 6,041,306 A | 3/2000 | Du et al. |
| 6,052,684 A | 4/2000 | Du |
| 6,078,326 A | 6/2000 | Kilmer et al. |
| 6,088,679 A | 7/2000 | Barkley |
| 6,115,641 A | 9/2000 | Brown et al. |
| 6,115,642 A | 9/2000 | Brown et al. |
| 6,122,633 A | 9/2000 | Leymann et al. |
| 6,170,002 B1 | 1/2001 | Ouchi |
| 6,266,683 B1 | 7/2001 | Yehuda et al. |
| 6,279,042 B1 | 8/2001 | Ouchi |
| 6,327,611 B1 | 12/2001 | Everingham |
| 6,370,567 B1 | 4/2002 | Ouchi |
| 6,539,404 B1 | 3/2003 | Ouchi |
| 6,546,364 B1 | 4/2003 | Smirnov et al. |
| 6,938,240 B2 | 8/2005 | Charisius et al. |
| 7,546,346 B2 | 6/2009 | Ouchi |
| 2008/0120388 A1 | 5/2008 | Ouchi |
| 2008/0140793 A1 | 6/2008 | Ouchi |

FOREIGN PATENT DOCUMENTS

| | | |
|---|---|---|
| EP | 95114678.6 | 3/1996 |
| EP | 96308763.0 | 6/1997 |

OTHER PUBLICATIONS

Trammell, Work Flow Without Fear, McGraw Hill, Inc., Byte, Apr. 1996, pp. 3-8, US.

PCT International Search Report (counterpart of U.S. Appl. No. 08/901,539 now US Patent No. 5,978,836).

Tim Pyron, "Teach Yourself Microsoft Project 2000 in 24 Hours," published in Apr. 2000, pp. 91-93, 152-155, 242-243, and 495-512.

Microsoft Corporation, "Integrating Microsoft Project Central and Microsoft Outlook," published in 2000, 4 pages.

Microsoft Corporation, "Copying Microsoft Project Central Tasks to an Exchange 2000 Server Task List," published in 2000, 6 pages.

David Crocker, "Request for Comments (RFC) 822: Standard for the format of ARPA Internet text messages," Aug. 13, 1982, 50 pages.

International Search Report for International Patent Application No. PCT/US02/41212 mailed Mar. 26, 2003, 1 page.

Office Action for EP 98 937 130.7 mailed Feb. 22, 2005, 4 pages.

Oral Summons Decision for EP 98 937 130.7 mailed Nov. 7, 2008, 14 pages.

Office Action for U.S. Patent Publication No. 2008/0120388 mailed Jul. 7, 2009, 8 pages.

Office Action for U.S. Patent Publication No. 2008/0140793 mailed Jul. 8, 2009, 6 pages.

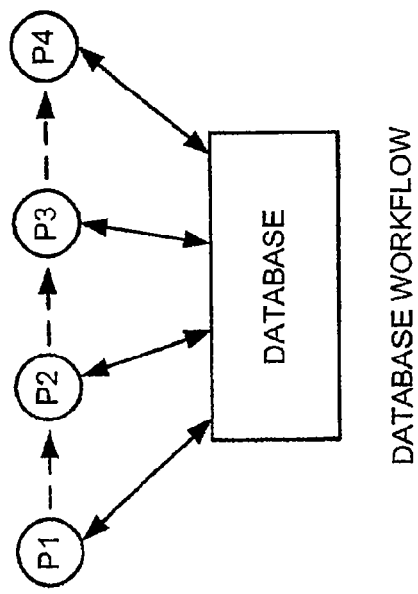
DATABASE WORKFLOW
FIGURE 1A
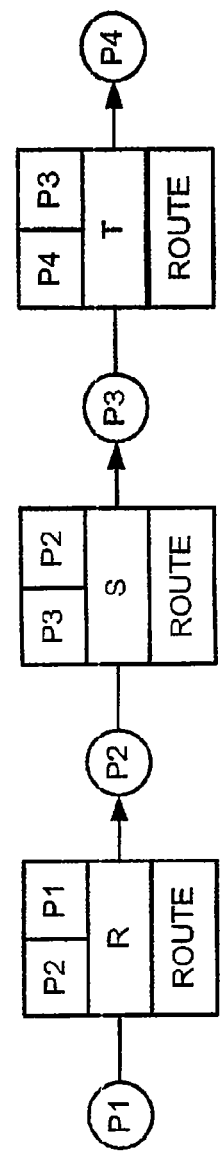
ELECTRONIC MAIL WORKFLOW
FIGURE 1B
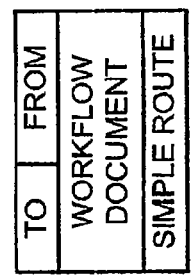
EMAIL MESSAGE

WORKFLOW SYSTEMS AND METHODS FOR PROJECT MANAGEMENT AND INFORMATION MANAGEMENT

CROSS-REFERENCE TO RELATED APPLICATIONS

This application is a continuation of U.S. application Ser. No. 10/037,545, filed Dec. 21, 2001, now U.S. Pat. No. 7,546, 346, which is a continuation-in-part of U.S. application Ser. No. 09/417,280, filed Oct. 13, 1999, now U.S. Pat. No. 6,442, 594, which is a division of U.S. application Ser. No. 08/901, 539, filed Jul. 28, 1997, now U.S. Pat. No. 5,978,836; the disclosure of each is incorporated herein in its entirety.

This application is related to U.S. Patent Publication Nos. 2008/0140793 and 2008/0120388, each entitled "Workflow Systems and Methods for Project Management and Information Management," filed Jan. 30, 2008; the disclosure of each is incorporated herein by reference in its entirety.

BACKGROUND OF THE INVENTION

The present invention relates to the field of computer networks, and in particular to workflow systems and methods used in computer networks to control, access, process, track, and modify documents. The invention also relates to workflow systems integrated with project and information management systems.

A workflow system automates processing of documents in computer networks by defining the sequence of users with access to documents transmitted in the computer network. One application suitable for workflow is business travel reimbursement, having the following steps: (1) the traveler sends a request for reimbursement to a manager; (2) the manager reviews it; and (3) the manager either sends the approved request to accounting for payment or returns the request to the traveler for clarification. During the process, the users of the workflow system may want certain information. The manager may want information from the traveler before approval, accounting may want the total number of requests submitted by the traveler within the year, and the traveler may want to know where the request is in the process, especially if it is delayed. A route describes the step-by-step sequence of a given workflow. The route may have a linear sequence and/or complex conditional branching. The latter type may require databases to store the independent parallel routes, which later join to form a linear route. Simple workflow may require only an email system to emulate paper-based procedures using mail and routing slips. As shown in FIG. 1A, a database workflow system stores the document, the route, and the sequence of access in data tables. Because the information is stored in the memory of the database system, database systems can provide for complex routes, supply information on the document, and alert users to process delays. Many databases also have failure detection and recovery mechanisms to assure reliability. However, databases require that users employ specific programs to process the workflow, and remain connected to the database for the entire session, which can result in expensive long distance phone calls when users are remote from the database. Because the users may participate in many workflow processes, database workflow systems may require a number of specific programs to be loaded in their PCs and require access to a number of databases. This may unnecessarily confuse users who must then identify the programs and the databases associated with a given workflow.

As shown in FIG. 1B, an email workflow system transmits the document and the route in the email. This has the advantage that users only need email programs such as Microsoft Outlook, Lotus Notes, or Microsoft Exchange. Further, a remote user such as a traveling manager can approve documents as remote email. However, since key information about the document is in the email, the workflow process fails if the email is lost. Because there is no central memory, even basic information such as location of a document may be lost. In addition, since there is no access to global information, the email workflow routes are limited to simple linear routes. Further, because the route is part of the email and coded for a particular system, each PC must have a specific program to send the email to the next user. So while users may have the advantage of easy access in email workflow systems, they must have specific programs loaded in their PC before participating in the workflow process. This makes ad hoc creation of a workflow route impracticable, because the participants must have prepared in advance by loading all of the appropriate software in their PCs. As with the database workflow system in which many users participate in the workflow, an email workflow requires many workflow programs be loaded in each PC, lacks capability to perform complex routes and track documents. Thus, the overall benefit of using current email workflow systems is limited.

It would be desirable if workflow systems existed which could perform complex database functions, provide the easy accessibility of email, avoid the need for specific programs in each PC, and insulate the user from the need to identify the pertinent server for a given workflow process.

Workflow systems and methods extend to other applications. For example, many complex projects are planned using groupware and project management tools. A key groupware tool for project management is an electronic calendar system where events are planned and the calendar can be set to create alerts to notify team members that an event is due. A project can have a calendar to post events to coordinate the project's activities. Most electronic calendar systems can coordinate the calendars of each of the individual participants as well as that of the project. Some of these calendar events are based on the execution of project segments and the calendar times may need to be added, modified, or deleted. The calendar events in the project calendar are created and updated manually and require attention to be effective. However, many of the events associated with the calendar could be in workflow processes and it would be desirable to integrate workflow systems with calendar and the calendar events.

One example of a process related to a calendar event is annual performance reviews. A calendar system can set the date to initiate the review process. On that date, a workflow can begin with the steps of notifying the manager of the review, approval of the proposed review by Human Resources (HR), the review with the employee, the sign-off by employee and by the manager, a sign-off by the manager's manager, and a sign-off by HR. At the completion of the workflow process, the calendar system should be notified and the date for the next annual review set. The workflow can have all of the measurement and tracking functions that can be used to control the performance review process. In addition, the workflow integration can coordinate the calendars of the individuals. In the example, as each step is completed, the calendars of the participants for the next step can be coordinated so that the reviews and meetings can be scheduled Integration between workflow controlled business processes and the electronic calendar system would be highly desirable.

Another tool is a project management system where a project is divided into project segments. Project segments are planned with duration and a beginning and end date. A project segment may relate to another project segment such that it cannot start until the other segment completes. The beginning of the second segment can be based on the end of the first segment and the dates calculated by the project management system. A complex project is typically a network of dependent segments and considerable time can be spent on creating all of the segments and the relationships. The project plan is used to calculate the end date based on the beginning date using the segment durations and the relationships. These may be displayed on a calendar grid to illustrate the project plan.

An additional capability of a project management system is that it can be used to track the actual execution of the segments and calculate the resulting end date. If the new end date is not acceptable, the project management system may be used to determine if the segments may be reordered or which segments may be accelerated to make the end date acceptable. Thus, the project management system is a powerful tool. However, in practice, it is difficult to maintain all of the actual start and end times for the project segments during the project. In most projects the collection and entry of the actual times are done manually either in person, phone or email. Thus, project management during project execution is difficult to achieve without dedicated project resources to keep the project status current. However, most of the segments that are planned by the project management system could be handled as workflow-controlled processes. As with the calendar, it would be desirable to integrate a project management system with the process execution of workflow system.

SUMMARY OF THE INVENTION

The present invention relates to message-based workflow systems and methods. In one embodiment, the present invention provides three elements: (1) an email system; (2) PC's, terminals, or workstations connected by the email system; and (3) a form route manager connected by the email system.

In one embodiment, the present invention provides an email-based workflow system for processing a document, where the system is connected to a computer network and an email system, comprising:
  (1) a form route manager, connected to the computer network, capable of receiving and sending the email, and capable of defining:
  (2) a route, a step-by-step sequence of email addresses, in the network; and wherein a computer with an email address in the network is adapted to send the email to the form route manager which is adapted to send the email to the next email address in the route.

In another embodiment, the present invention provides a method for centrally distributing an email to a step-by-step sequence of email addresses, comprising:
  (1) receiving the email with an indicator of the step in the sequence;
  (2) determining from the indicator and the sequence, the successor email address in the sequence;
  (3) updating the email indicator to the successor step; and
  (4) sending the email to the successor email address.

The present invention also relates to integration of a calendar system with a message based workflow system where a calendar event can initiate a workflow by sending an appropriate message to the form route manager to start a workflow. The completion of a workflow or step in the workflow can also result in sending a message to the calendar system that can generate a calendar event. Many of the segments in project management are processes that can be defined and controlled by workflow routes. Each project segment can relate to a workflow route where the segment starts with the beginning of the route and completes at the completion of the route. The project management system sends a message to the workflow system to initiate the related workflow route and the workflow system sends a message to the project management system at the completion of the workflow route. The relationship between the project segments is maintained in the project management system. Thus, the relationship between the routes is maintained by the relationship between the project segments. If the relationships between project segments change, the relationship between the workflow routes change without added effort.

BRIEF DESCRIPTION OF THE DRAWINGS

FIG. 1A illustrates the architecture of a conventional database workflow system.

FIG. 1B illustrates the architecture of a conventional email workflow system.

DETAILED DESCRIPTION OF THE PREFERRED EMBODIMENTS

Figure 2:
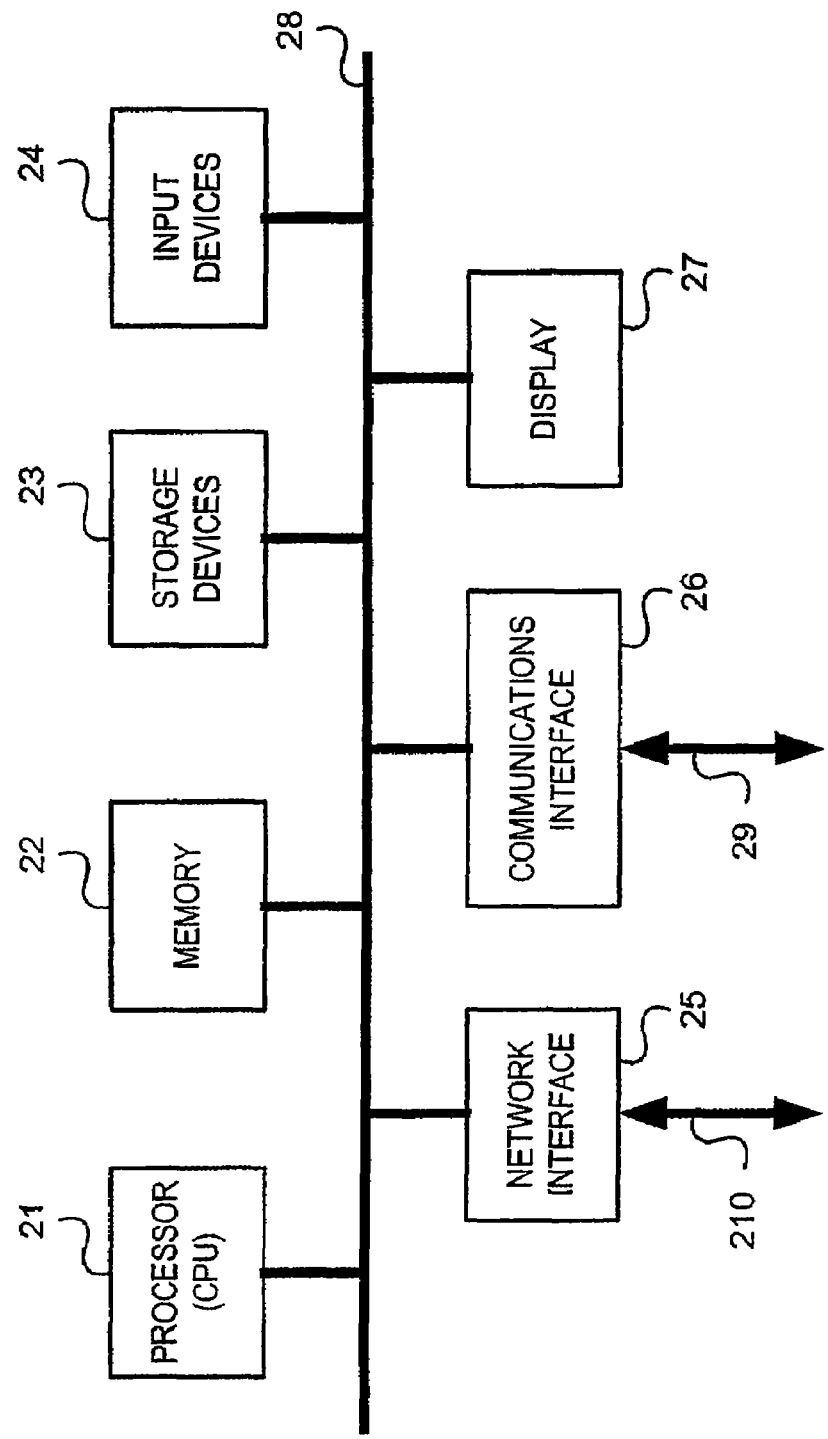
FIG. 2 illustrates one embodiment of the hardware of the form route manager.

The systems and methods for message-based workflow preferably operate in a computer network. The form route manager is embodied in a computer in the network. With reference to FIG. 2, one embodiment of the form route manager runs on server hardware including a processor (CPU) 21, a memory 22, storage devices 23, input devices 24, network interface 25, communications interface 26, and a display 27. A computer bus 28 connects the elements. The CPU 21 can be a suitable Intel, AMD, Motorola, or Sun processor or the like. The display 27 is preferably a video monitor and the input device 24 is a keyboard and mouse. The storage devices 23 are a hard disk drive, a floppy diskette drive and a CD ROM drive. Those skilled in the art would realize the form route manager can run on many types of computers, including a PC, a workstation, a mini-computer, or mainframe computer and that they may be used by multiple users with multiple sets of display and input devices.

The network interface 25 connected to bus 28 is connected to a local area network (LAN) or wide area network (WAN) 210 or the Internet to communicate to other computers in the network. The network interface 25 is preferably an Ethernet or Token ring adapter connected to a twisted pair wire or to a coaxial cable. In addition, the communications interface 26 is connected 29 to a communications network, which may communicate with other computers using an ISP and/or a dial up phone system to connect to the network. The communications interface 26 can be a modem. The CPU 21 operates under the control of instructions stored in memory 22.

Figure 3:
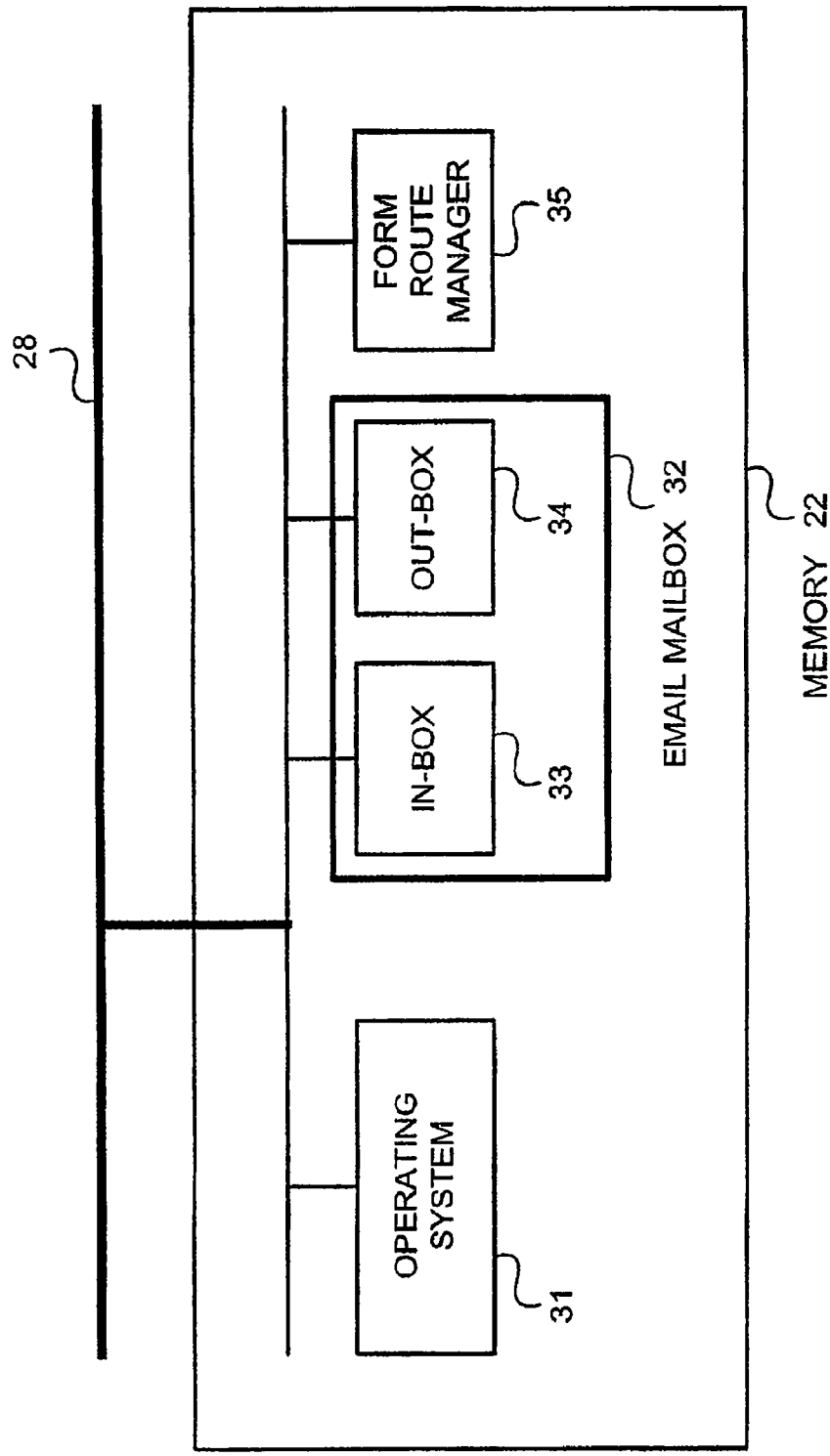
FIG. 3 illustrates one embodiment of the software stored in the memory of the form route manager.

FIG. 3 illustrates a more detailed preferred embodiment of memory 22. The memory 22 is preferably random access memory (RAM) but may include read only memory (ROM). The memory 22 includes operating system 31, email mailbox 32 with an in-box 33 and an out-box 34, and the form route manager 35. The operating system is preferably Microsoft Windows XP, Linux, Windows 2000, or Unix such as Sun Solaris. Microsoft Exchange or Lotus Notes or the like can be the email application and provide the email mailbox 32. Each email mailbox 32 has an email address that is a unique identifier within the email system. Each email message contains a field with the email address of the email mailbox 32 to which the email is sent, a field with the email address of the email mailbox 32 from which it was sent, and a field with the content of the message. A user of an email mailbox 32 receives email in the in-box 33 and can select, open and read the email. New email is created using a text editor, addressed with the email address of the mailbox to which it is to be sent, and is sent by placing the email in the out-box 34. The email on the LAN and WAN is transmitted to the in-box 33 and from the out-box 34 through the communications interface 26 for email transmitted remotely using the dial up phone lines. Email is generally discussed on pages 643-669 in section 7.4 of Tanenbaum, *Computer Networks* (1996), Prentice-Hall, which is hereby incorporated by reference.

Figure 4:
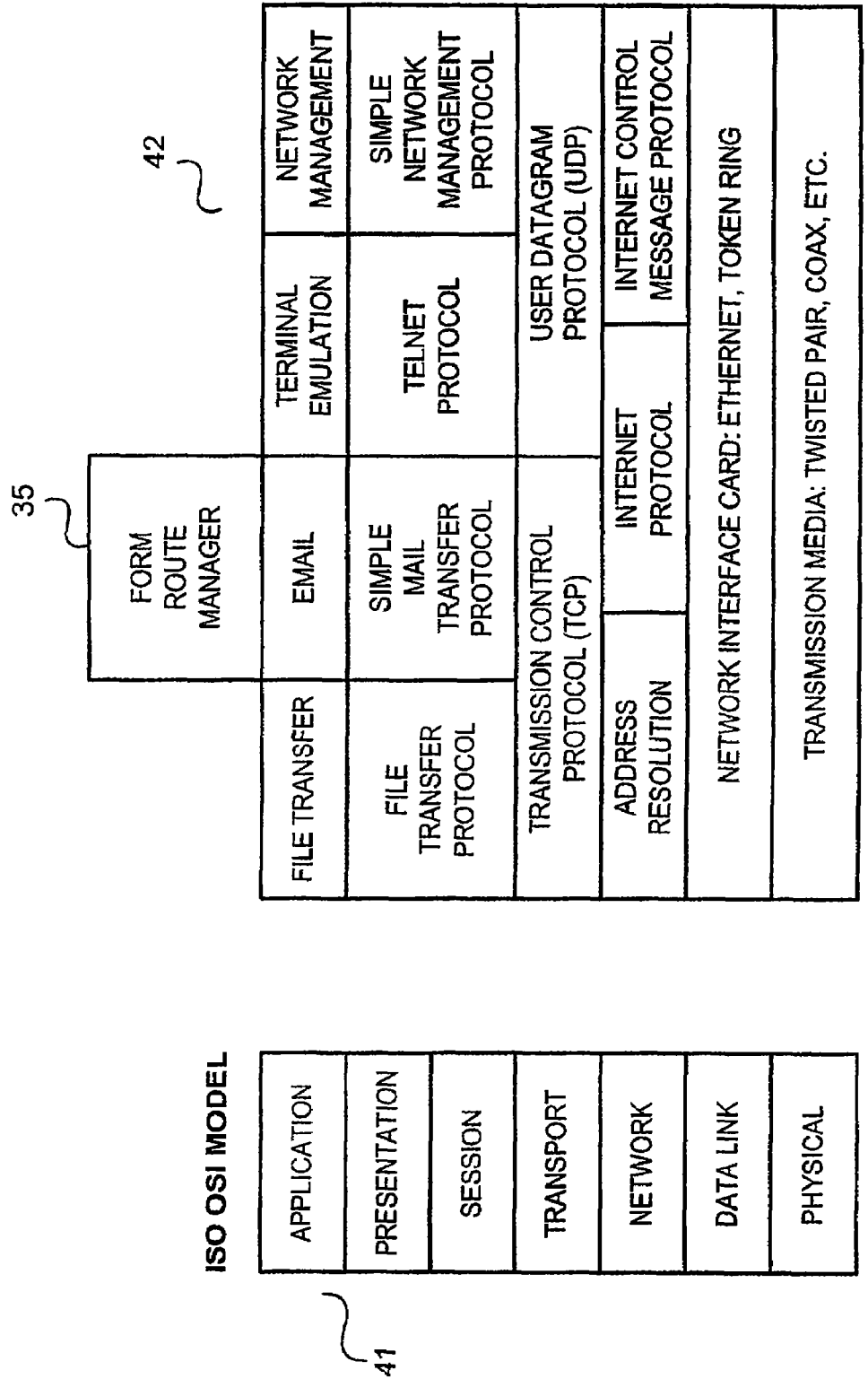
FIG. 4 is the ISO OSI network layer model, and the relationship of the model to the form route manager.

The form route manager 35 uses the email as an application. FIG. 4 illustrates the form route manager 35 in relationship to the ISO OSI reference model 41 and the implementation layers 42 of the ISO OSI reference model. Those skilled in the art will recognize that the form route manager may be adapted to use a wide variety of messaging and email systems such as IBM PROFS, DEC Mail, Internet Mail, Oracle Mail, Lotus Notes, Microsoft Outlook, Microsoft Exchange, SMTP mail, wireless mail, LAN- and WAN-based, remote mail and mail access using phone lines, Internet access, wireless access, voice mail, video mail, and other forms of messaging with characteristics of addressable messages. Since the Internet functions to connect numerous email systems, all email systems connected to the Internet, even those connected through intermediate mail systems and relay nodes, can be considered to be part of one email system.

Figure 5:
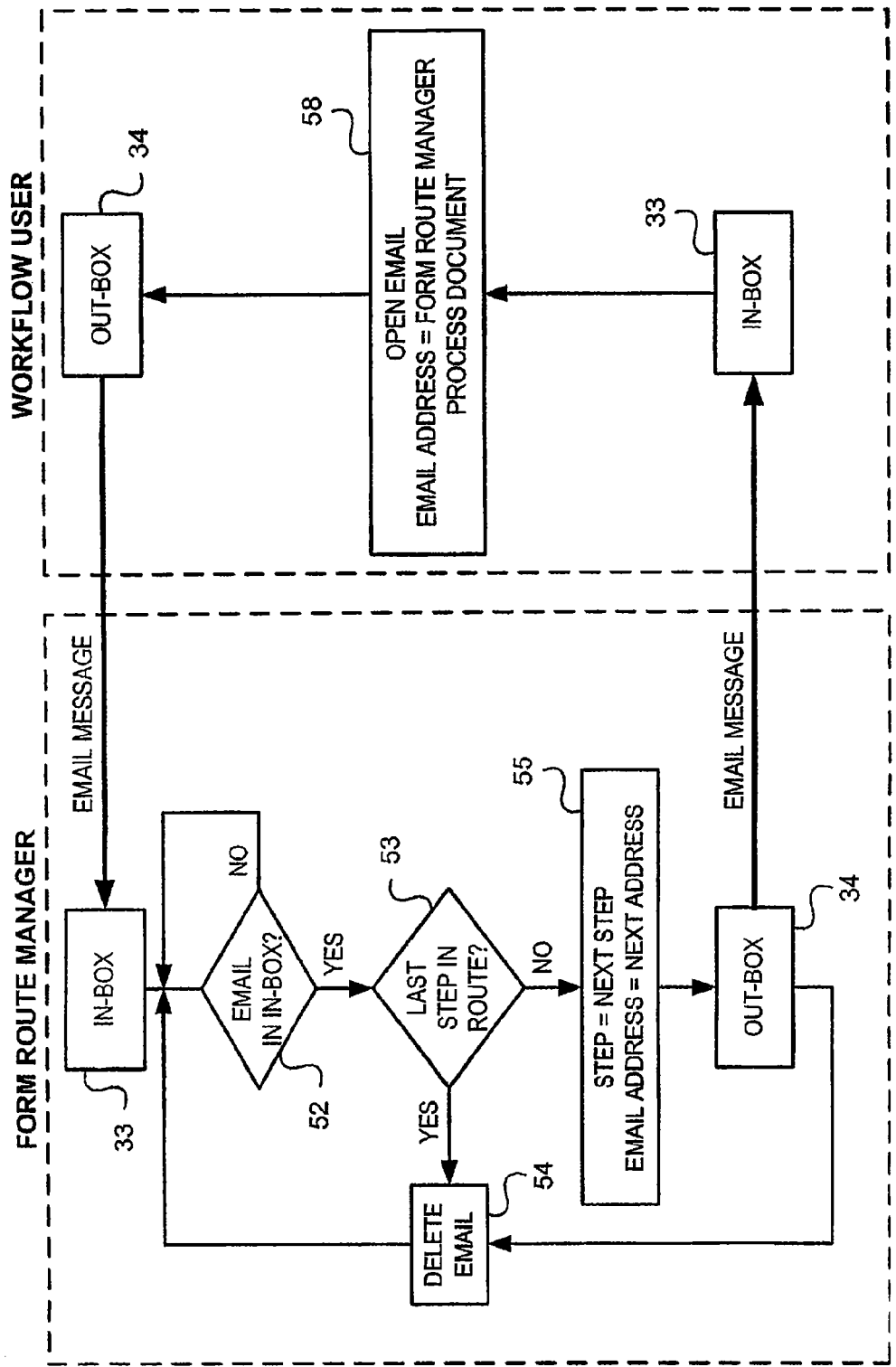
FIG. 5 is a flowchart of the form route manager functions and the workflow user functions.

The function of the form route manager 35 is illustrated in the flowchart in FIG. 5. The route is a step-by-step sequence of email addresses. The mailbox for the form route manager is assigned an email address. The emails addressed to the form route manager are received in the in-box 33. At step 52, the form route manager checks if the email is in the in-box 33. If there is an email, it checks at step 53 if the email is sent from an email address that is the last step in the route. If it is the last step in the route, the email is deleted at step 54 from the in-box. If it is not the last step, at step 55, a step field is set to the next step in the route and the email address is set to the email address of the next step in the route. The email is sent to the next email address by using out-box 34. The email is deleted at step 54 from the in-box. In other words, the form route manager receives email from an email address in the route and sends it to the next email address in the route. If the email is from the email address that is the last step in the route, the email is not sent further.

The form route manager function is part of a message-based workflow system. This is illustrated in FIG. 5, where the e-min FIG. 5, where the email contains a workflow document and the route specifies the step-by-step sequence of email addresses of the workflow. The message-based workflow user receives the workflow document as email in the in-box 33. The user selects 58 the email from the in-box 33, opens the email, sets the email address to that of the form route manage, processes the workflow document in the email, and sends the email back to the form route manager using the out-box 34. The form route manager receives the email in the in-box, and if this is not the last step in the route, sends the email to the next email address as described earlier. This process continues until the workflow route is completed.

Many email systems have a reply function, which returns email to the sender, which can be used to return email to the form route manager without explicitly entering the email address of the form route manager. A more complex environment may have multiple form route managers, each with an email address. In a preferred embodiment, users need not be concerned as to which form route manager sent the email, because the reply function will return email to the correct form route manager. The users need only open the email from the in-box, process the workflow document in the email, use the reply function to address the email to the correct form route manager, and send it out the out-box.

The form route manager provides a central, sequential email distribution function based on the step-by-step sequence of a route where a computer in the network sends an email to the form route manager and the form route manager sends the email to the next computer in the route.

Figure 6:
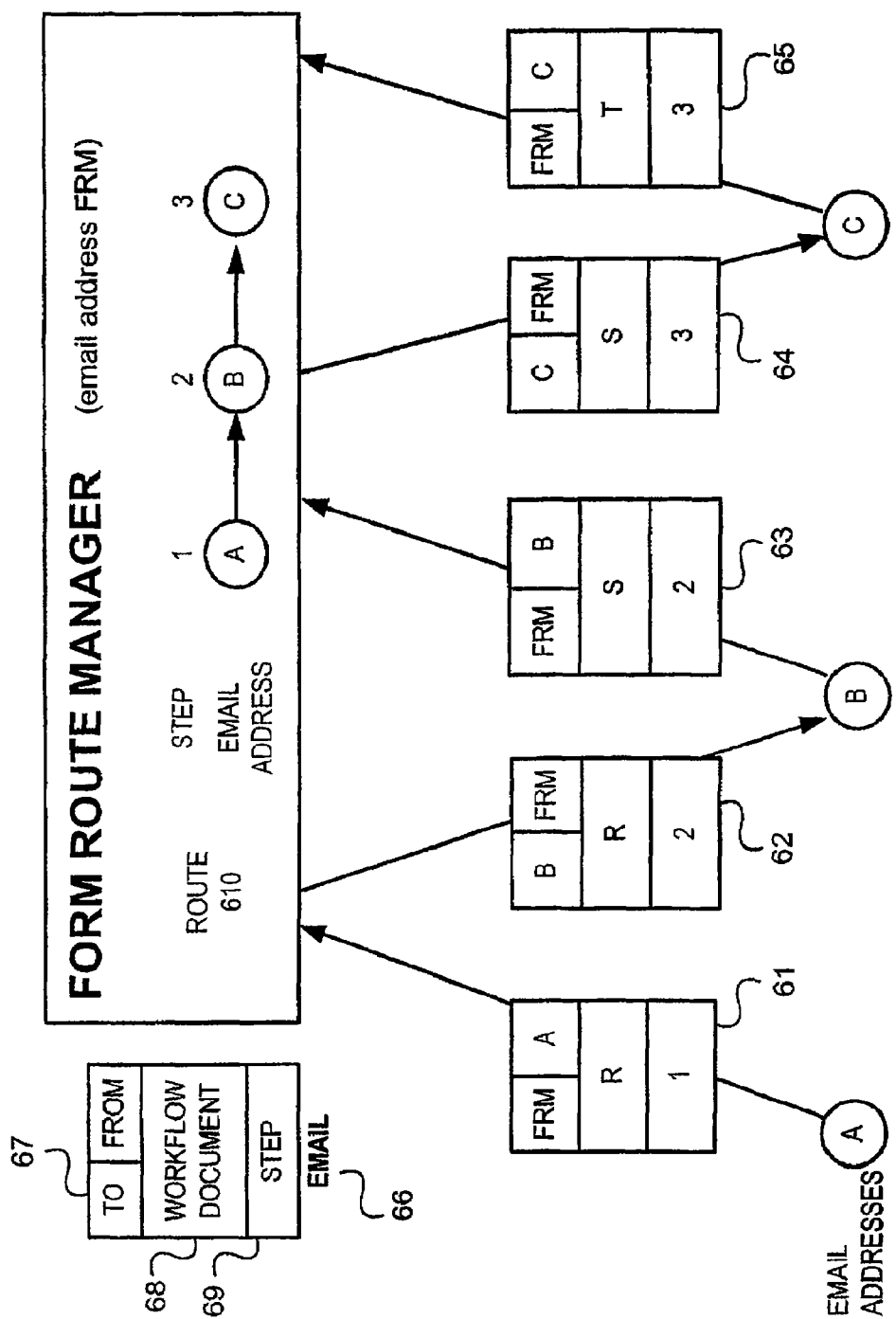
FIG. 6 is a block diagram of the system and the sequence of emails demonstrating one function of the present invention.

In an embodiment, the route defines the sequence of email addresses of the workflow. The route is contained in a table of structured query language (SQL) in an SQL database accessed by the form route manager. As shown in FIG. 6, the route 610 includes an email address A, an email address B, and an email address C implemented by the SQL Table ROUTE where each row of the table represents a step in the route: STEP, the next email address: NEXT EMAIL ADDRESS, and the next step in the route: NEXT STEP.

| SQL TABLE ROUTE: | | |
| --- | --- | --- |
| STEP | NEXT E-MAIL ADDRESS | NEXT STEP |
| 1 | B | 2 |
| 2 | C | 3 |
| 3 | NULL | NULL |

The first row indicates that for step=1, the next email address is B and the next step is 2. For the second row step=2, and the next email is C and next step is 3. The third row for step=3, the next email address and next step values are NULL which indicates step 3 is the last step in the route.

The email and the form route manager contain the information necessary to identify the step in the route. As shown in FIG. 6, in one implementation, the email contains a control field, STEP 69 that holds the value of step to access the route SQL table to determine the next email address and next step. Those skilled in the art will realize there are many data structures that can be used to implement the information needed in the route and that the route step information can be indicated by other means such as a storage location in the form route manager.

FIG. 6 illustrates the workflow email format, the route in the form route manager and the sequence of emails sent between the email addresses and the form route manager to effect the workflow of route 610 for the sequence: A to B to C. The email format 66 consists of the email To and From address fields 67, the workflow document as the body of the message 68, and the control field, STEP 69.

In one embodiment, the workflow document is processed as follows:

1) The user at email address A initiates the workflow by sending an email 61 with document R and STEP=1 to the form route manager;
2) The form route manager receives the email 61, and determines from STEP=1 and the route that the next email address is B and the next step is 2. The form route manager updates STEP=2 and sends the workflow document R as email 62 to email address B;
3) The user at email address B receives the email 62 from the form route manager, processes the document by changing the body of the message to S, and sends email 63 back to the form route manager;
4) The form route manager receives the email 63, and determines from STEP=2 and the route that the next email address is C and that the next step is 3. The form route manager updates STEP=3 and sends the workflow document as email 64 to email address C;
5) A user at email address C receives the email 64 from the form route manager, processes the document by changing the body to T, and sends email 65 back to the form route manager; and
6) The form route manager receives the email 65 and determines from STEP=3 and the route the next step is NULL, which completes the route.

In this example, the workflow document is embodied in five different emails, but at any time only one is the active carrier of the document. If email 61 is transformed into email 62, the email 61 no longer acts as the carrier of the document and can be deleted. Each email carries its position in the route in the control field STEP 69. This permits more than one concurrent use of a workflow route. Because each workflow email carries its state in the route, each document is independent of other workflow documents and may share the same route without interference. Using the email address or name of a user as indicator of the step in a route is ambiguous, since the email address or name may be repeated in a route. Thus, the email field STEP 69 permits the route to distinguish each use of a user who may appear more than once in the route. As an example, a workflow that requires the user at email address A to review the work of the user at email address B, which is then followed by work by the user at email address C, which is reviewed by the user at email address A, the route might be described by the sequence: email address B (STEP=1), email address A (STEP=2), email address C (STEP=3), email address A (STEP=4). The use of only the email address as the state variable would not distinguish between the first use of email address A (STEP=2) from the second use of email address A (STEP=4). This example demonstrates implementation of a workflow system where each user need only have access to the email system.

A more sophisticated user interface for workflow can be developed by use of special electronic form programs that format the email and display the workflow email as a workflow form for editing and automate the reply function to address the email to return to the form route manager. For example, the Microsoft operating systems and Microsoft Exchange email system with the Microsoft E-Forms extensions have these functions as part of the Windows environment and the message-based workflow system can take advantage of this without other special programs.

Figure 7:
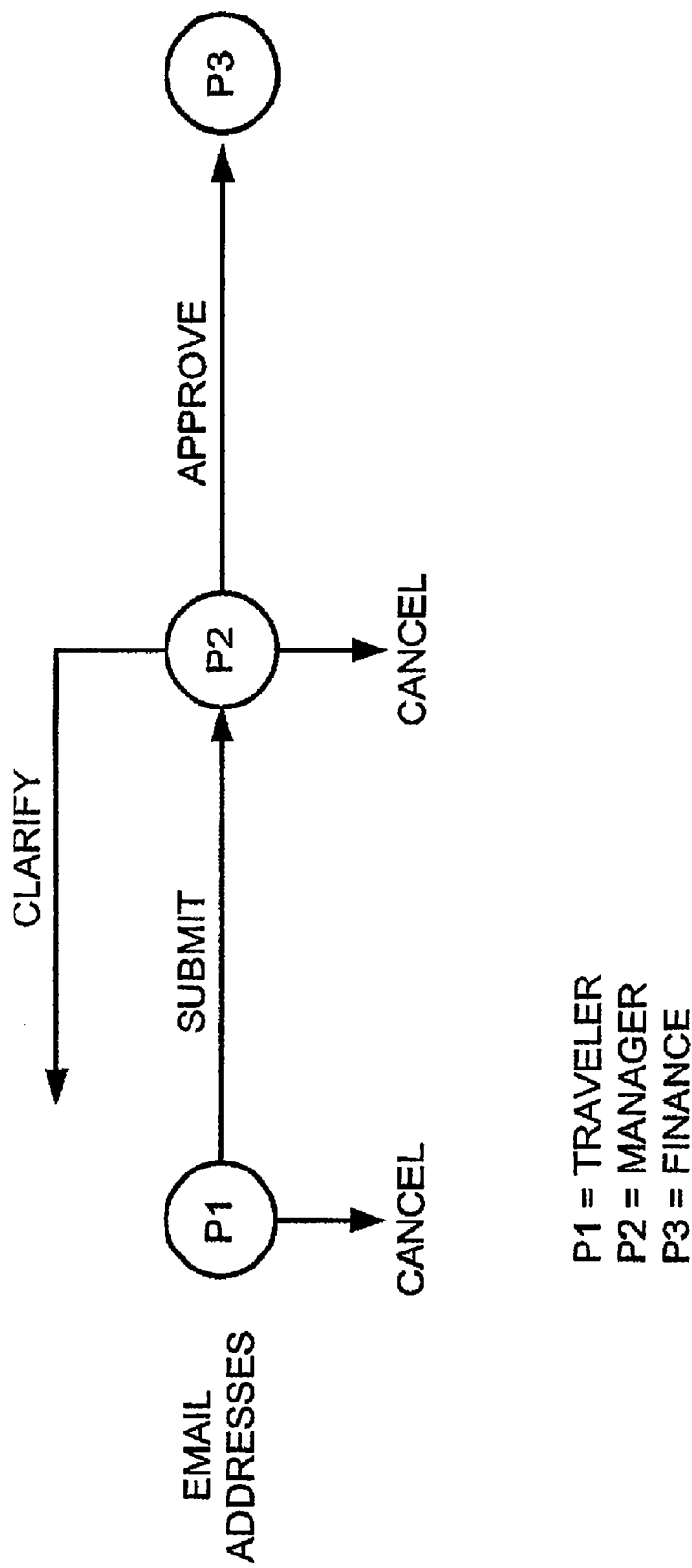
FIG. 7 is an example of business travel reimbursement approval.

FIG. 7 shows one embodiment of the invention in the context of reimbursement approval. Rather than a linear route, the workflow required has several conditional branches. A traveler, P1, can SUBMIT the completed business travel reimbursement document to the manager or can elect to CANCEL the travel approval procedure after a CLARIFY return from the manager as described later. The manager, P2, may APPROVE, sending the document to finance, P3, or may ask to CLARIFY, sending it back to P1 (for example, to ask for explanations or corrections), or may CANCEL the approval procedure. Finance, P3, can send a message to P1 when the procedure is complete. The traveler, P1, may receive the document back from the manager, P2, and can amend it and SUBMIT it back to P2 or may CANCEL the procedure. The participants and others may want information about the status of the procedure.

The travel reimbursement workflow illustrates useful features of the form route manager. These features are: (1) support for two or more different routes; (2) capability to track each document in the workflow system and to collect statistical information; (3) support for conditional branches and cancellation of a document workflow; and (4) support for sending messages when specific steps are processed or when conditional events occur. These may be combined to implement a workflow, which supports business procedures like the business travel reimbursement procedure.

Support for Two or More Routes

Figure 8:
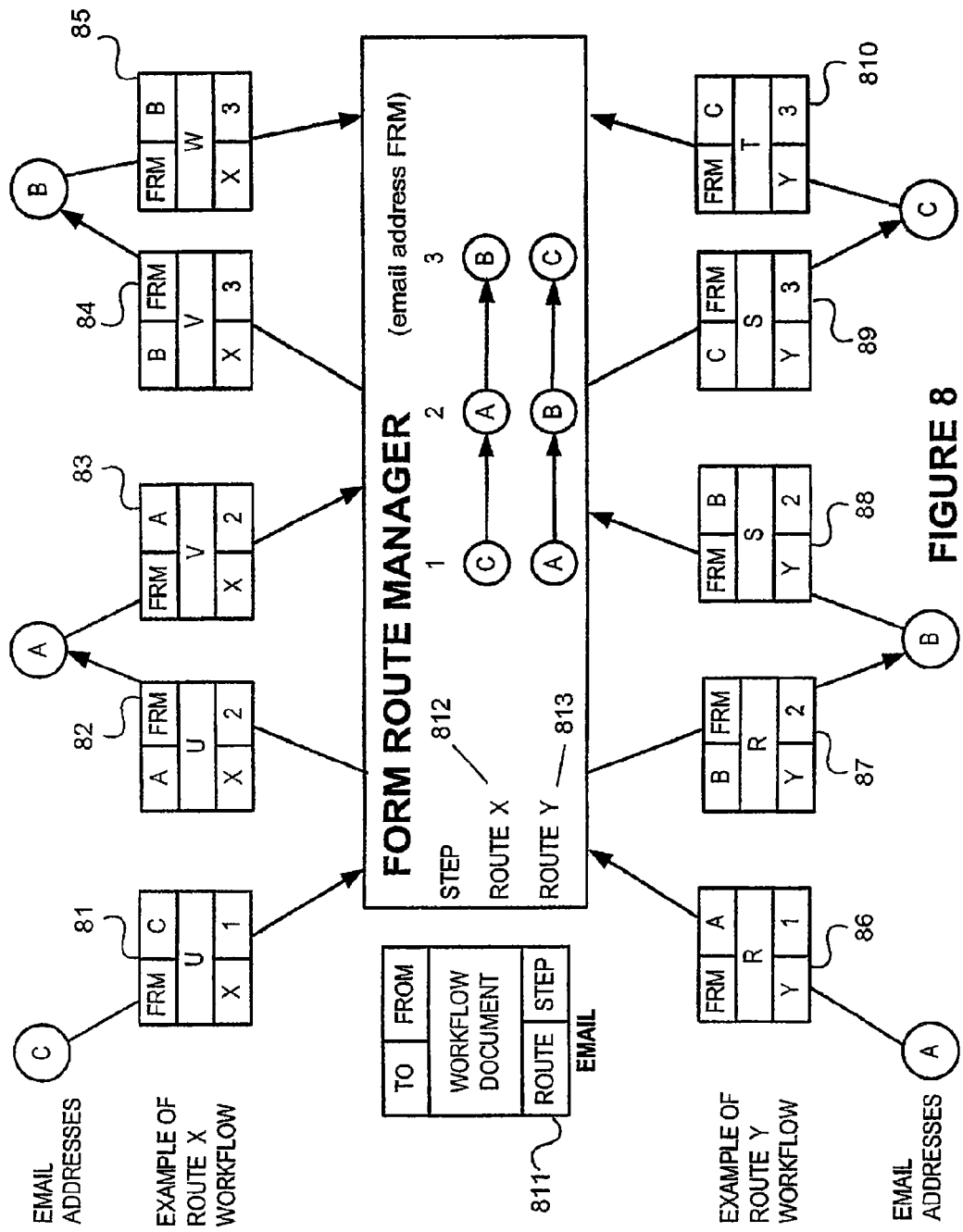
FIG. 8 is a block diagram and sequence of emails illustrating the function to support multiple routes.

The present invention of message-based workflow supports multiple routes as illustrated in FIG. 8 by the use of an email control field ROUTE 811 that is set to the name of the route email is associated. The SQL Table ROUTE X & Y illustrates the SQL table structure to implement two routes named X 812 and Y 813.

| SQL TABLE: ROUTE X & Y: | | | |
|---|---|---|---|
| ROUTE | STEP | NEXT E-MAIL ADDRESS | NEXT STEP |
| X | 1 | A | 2 |
| X | 2 | B | 3 |

| SQL TABLE: ROUTE X & Y: -continued | | | |
|---|---|---|---|
| ROUTE | STEP | NEXT E-MAIL ADDRESS | NEXT STEP |
| X | 3 | NULL | NULL |
| Y | 1 | B | 2 |
| Y | 2 | C | 3 |
| Y | 3 | NULL | NULL |

Row one of SQL Table ROUTE X & Y indicates that for route X at step 1, the next email address is A and the next step in route X is 2 and so forth. The form route manager determines the next email address and next step by using the ROUTE and STEP control fields in the email to access the route SQL table and updates the email address to the next email address and STEP to the next step and sends the email to the next email address.

FIG. 8 illustrates the form route manager supporting the two routes: route X 812 and route Y 813. The email contains the control field ROUTE 811 to identify which route is to be used for the email. The sequence of emails: 81, 82, 83, 84, and 85 with control field ROUTE=X is processed using Route X and the sequence of emails: 86, 87, 88, 89, and 810 with control field ROUTE=ROUTE is processed using route Y.

Figure 9:
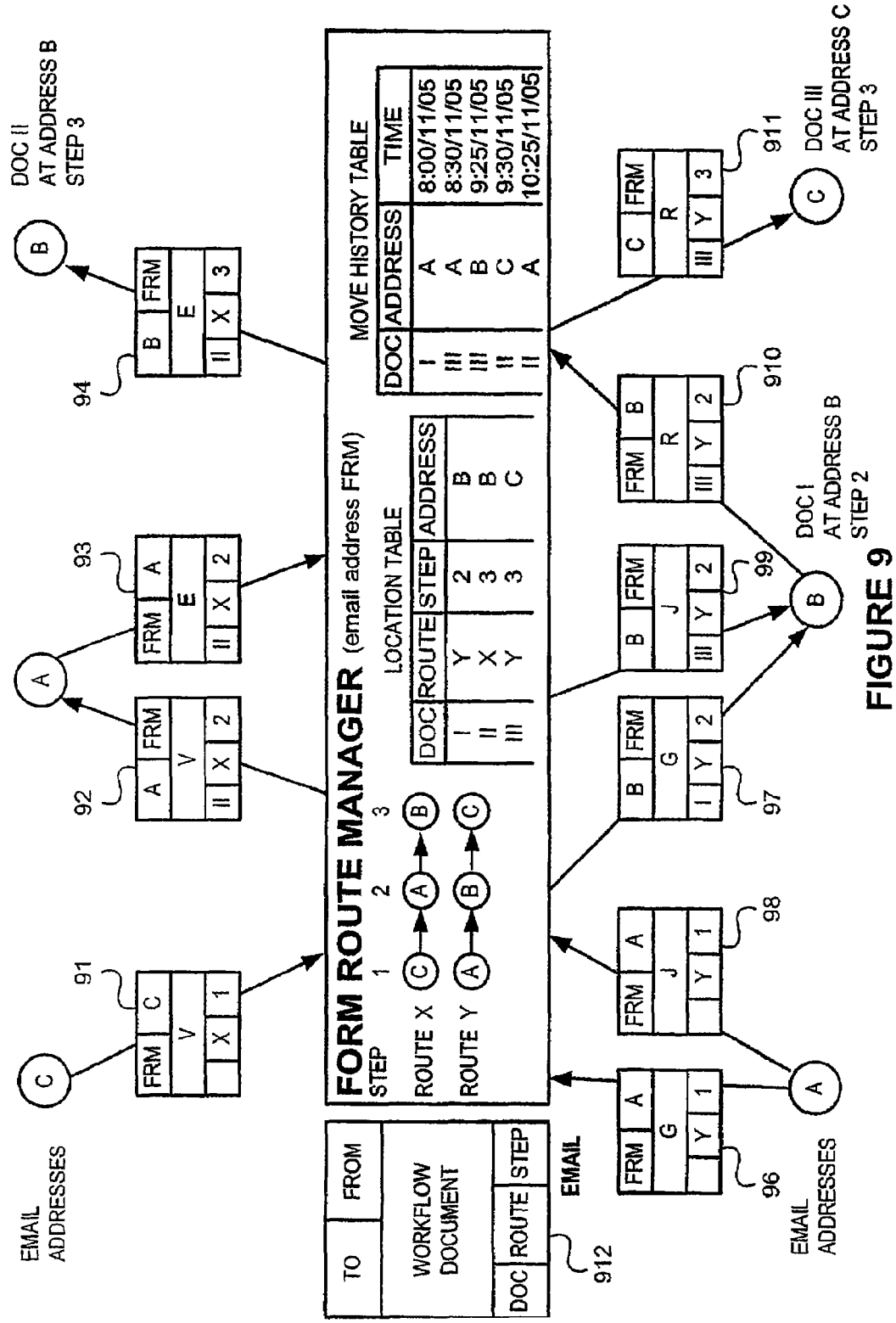
FIG. 9 is a block diagram and sequence of emails illustrating the tables and functions to track the location and move history of each workflow document.

Document and Providing Statistical Information:

Additional functions are provided when the form route manager tracks each document as it is processed. In FIG. 9, the email control field DOC 912, for document, is a message control field associated with a workflow document and is carried in each workflow email to identify the document that it is carrying. The value of DOC 912 for a given document must be unique to distinguish an email containing this document from among the emails for other documents active in the workflow system. The value for DOC 912 is set when a document begins a procedure with the initial email. The value may be set by the form route manager, or by the user and the form route manager will verify that the value is unique for the active document, or by rules that insure that the values are unique. An example of a rule to generate a unique DOC 912 value is the concatenation of the user email address and the time in milliseconds and date. This value would be unique since it would be impossible for a user at the same email address to create two documents at the same time in milliseconds.

As illustrated in FIG. 9, the form route manager contains a LOCATION table and a MOVE HISTORY table. These are referenced using DOC 912 as the index. An implementation could combine these two tables into one where the most recent entry for a document represents the location of the document in the workflow system.

FIG. 9 illustrates workflow for three documents where a user at email address C initiates one workflow by generating the sequence of emails 91, 92, 93, and 94 that follow route X. The email 91 does not have a DOC 912 value when sent by a user at email address C to the form route manager, but rather merely identifies it is an initial email, STEP=1, and which route is to be used, ROUTE=X.

The form route manager assigns II for DOC 912 for the email and table indexes. The form route manager then enters in the MOVE HISTORY table that the email assigned DOC=II was received from the email address C at a military time and date of 9:30/11/05. The form route manager determines email address A is the next address in ROUTE X and sends the email 92 with DOC=II, ROUTE=X, and STEP=2, to email address A and enters the following in the LOCA- TION table: DOC=II, ROUTE=X, STEP=2, email address=A. The user at email address A processes email 92 (changes the body from "V" to "E") and returns email 93 to the form route manager. The form route manager using that ROUTE=X and STEP=2 determines that the next step in route X is 3, the next email address B, and updates the step field to STEP=3 and the email address field to email address=B. As shown in FIG. 9, the form route manager uses DOC=II as an index to access the LOCATION table and update the LOCATION table to email address B, and adds in the MOVE HISTORY table: DOC=II, email address=A, Time=10:25/11/05, and sends the email 94 to email address B. The LOCATION table indicates that the workflow document is at email address B and the MOVE HISTORY table indicates it was sent at 10:25 on 11/05. From the MOVE HISTORY table, one can tell the workflow started at 9:30 on 11/05 and that it took the user at email address A about 55 minutes to respond and perform that workflow step.

The user at email address A initiates two documents which generates email sequence 96 and 97 with DOC=I and email sequence 98, 99, 910, and 911 with DOC=II, both following route Y. The LOCATION table indicates that DOC=I is currently at email address B and DOC=III is at email address C. The MOVE HISTORY table provides the process timing and the users who processed these steps. The number of entries in the LOCATION table is a measure of the number of active documents in the workflow system. The MOVE HISTORY table can be used to calculate statistics, e.g., average time to use the Route X procedure, the total number of documents processed, and find any workflow step with large process time indicating a possible bottleneck.

The LOCATION table holds values for ROUTE and STEP for each active document. The email field DOC 912 can be used as the index to access these values from the LOCATION table and remove the need for ROUTE and STEP in the email except for the initial email. However, having this information in both the email and LOCATION table provides an integrity check on the flow of the document. For example, the form route manager can compare the ROUTE and STEP fields of an email with the values in the LOCATION table to detect an old email for a document and prevent the propagation of an erroneous email.

Conditional Branching and Conditional Cancellation

Some workflow requires a change in the flow of the document based on decisions made in a workflow step. In the business travel reimbursement example, the manager could approve the document and send it to accounting, send the document back to the traveler, or cancel the approval procedure. The route can specify steps in which choices may be made or the specific functions to be executed by the form route manager. The SQL table branch route illustrates the structure to support the conditional branching illustrated in FIG. 10.

| SQL TABLE BRANCH ROUTE: | | | |
|---|---|---|---|
| STEP | NEXT E-MAIL ADDRESS | NEXT STEP | BRANCH ROUTE |
| 1 | B | 2 | |
| 2 | C | 3 | Y |
| 2 | D | 4 | N |
| 3 | NULL | NULL | |
| 4 | NULL | NULL | |

In the BRANCH ROUTE table, row one indicates that at step 1, the next email address is B and the next step is 2. However, rows two and three have the same step value of 2. This permits selection of the route based on the value of the BRANCH ROUTE.

Figure 10:
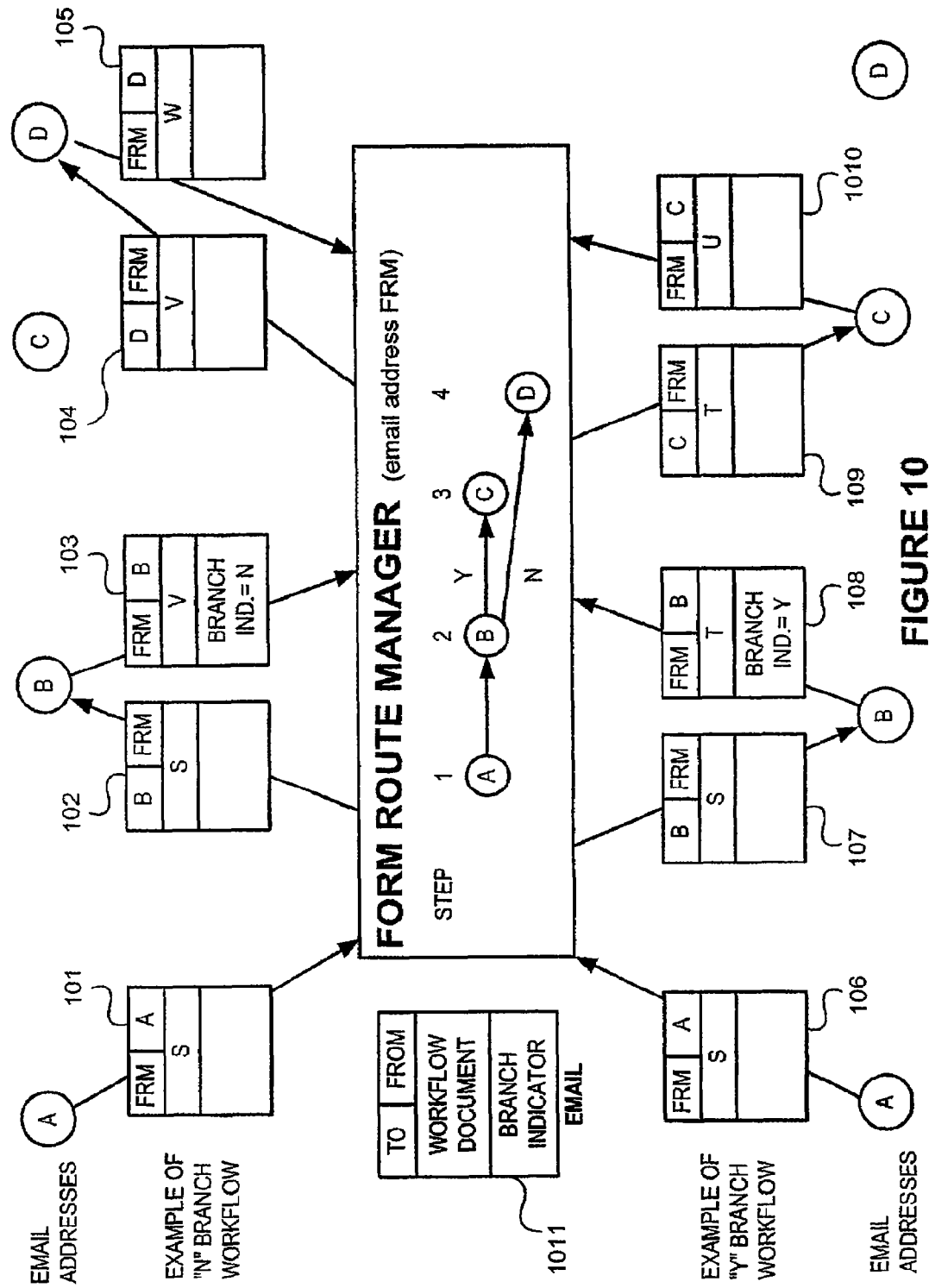
FIG. 10 is a block diagram and sequence of emails illustrating the CONDITIONAL BRANCH function.

In FIG. 10, the route permits a user at email address B at Step 2 to select the route branch by setting the control field BRANCH INDICATOR. The user at email address B can send the document to email address C by setting the BRANCH INDICATOR=Y which selects the branch route to email address C or can select email address D by setting the BRANCH INDICATOR=N. The email sequence 101 and 102 transmits the document from the user at email address A to email address B. The user at email address B responds with email 103 with BRANCH INDICATOR=N. The form route manager compares the BRANCH INDICATOR with the BRANCH ROUTE and determines that the next email address in the selected branch route is email address D and sends the email 104 to the email address D. A user at email address D completes the route by sending the email 105 to the form route manager. Email sequence 106, 107, 108, 109, and 1010 illustrates a document workflow that selects the branch route to the email address C by setting the BRANCH INDICATOR=Y. While the example illustrates a two-way branching decision, three or more branches can be implemented easily after review of the present application.

Figure 11:
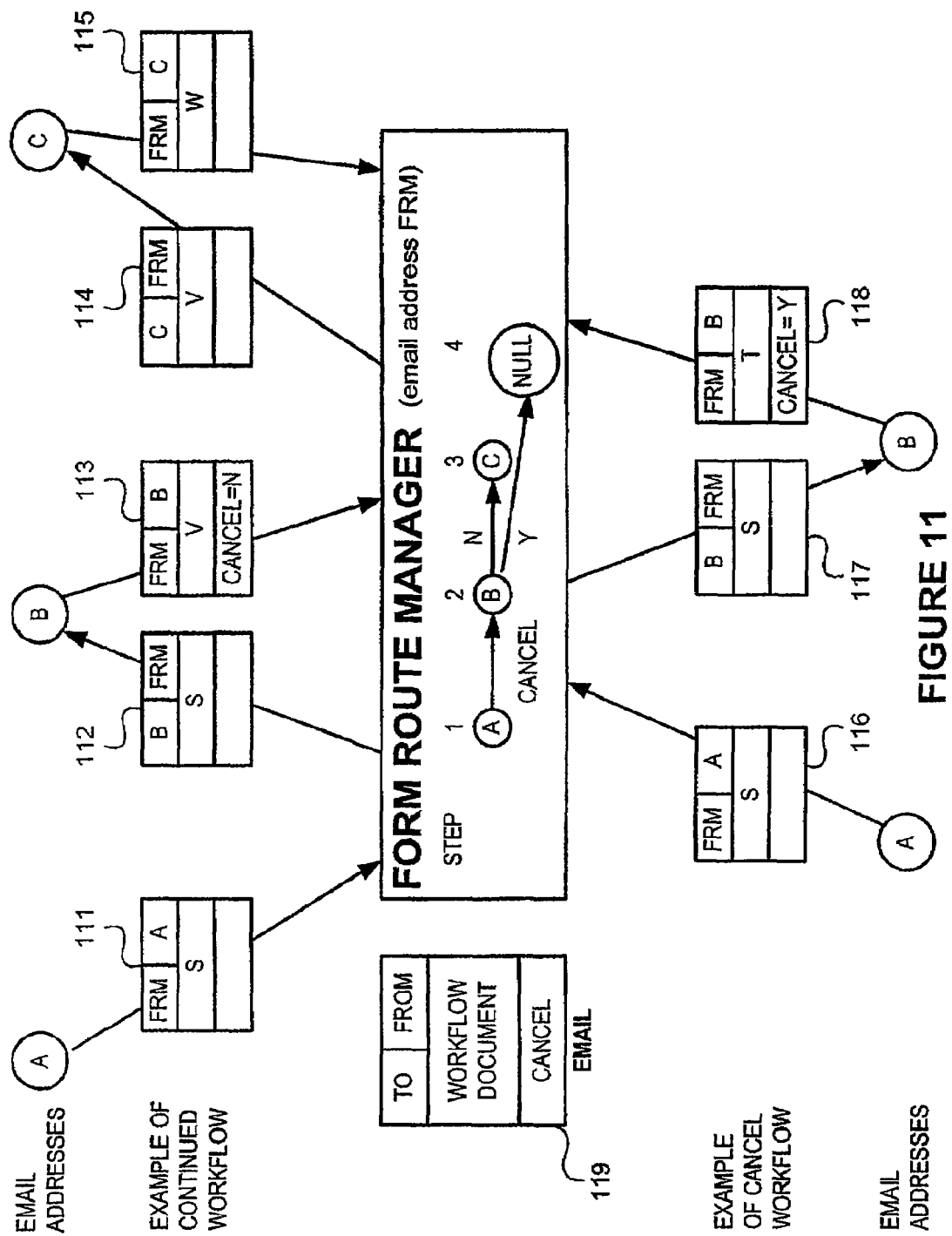
FIG. 11 is a block diagram and sequence of emails illustrating the CONDITIONAL CANCEL function.

The cancellation of workflow can be thought of as a special case of the conditional branch where the workflow terminates on one of the branches. In FIG. 11, the email contains a control field CANCEL 119. A user at email address B can either send the document to email address C or cancel the work flow by setting CANCEL=Y. The email sequence 116 and 117 sends the document from the user at email address A to email address B. In email 118, the user at email address B cancels the workflow by setting the CANCEL=Y. The form route manager determines from CANCEL 119 being set=Y that no further emails are to be sent for this document. The email sequence 111, 112, 113, 114, and 115 illustrate a workflow where the user at email address B continues the workflow and the document is sent to email address C.

Another form of a conditional cancel can be made by constructing a route that permits selecting a branch route that ends the workflow using the BRANCH INDICATOR as described earlier. The indicator for the end of a workflow in this example is a branch route with "NULL" as the next route step.

Event Notification

Figure 12:
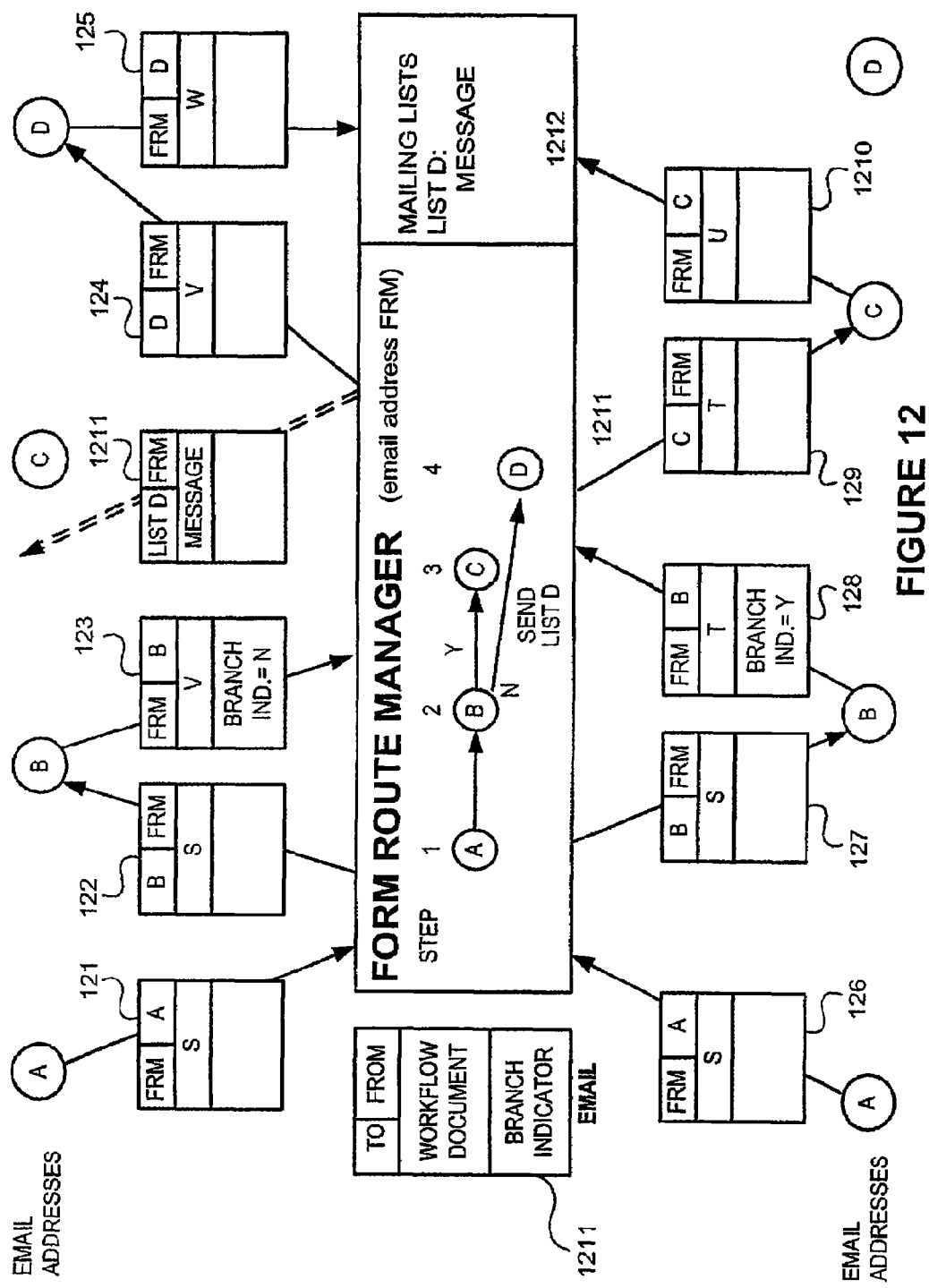
FIG. 12 is a block diagram and sequence of emails illustrating the function to send email to a specified list of email addresses when a branch of a CONDITIONAL BRANCH is selected.

In many businesses, the users like prompt notification when choices are made or process steps are completed. For example, the traveler seeking reimbursement would like to be promptly notified if the manager denies the business travel reimbursement request. FIG. 12 illustrates a route that specifies that a set of emails are to be sent to a distribution list if the user at email address B sets the BRANCH INDICATOR=N. A similar function extends to the CONDITIONAL CANCEL function. The route contains a SEND MESSAGE 1211 field that indicates when a message is to be sent. The route is represented by SQL TABLE MESSAGE where the message is to be sent to LIST D, a list of email addresses, if ROUTE BRANCH N is set at STEP=2.

| SQL TABLE MESSAGE: | | | | |
|---|---|---|---|---|
| STEP | NEXT E-MAIL ADDRESS | NEXT STEP | BRANCH ROUTE | SEND MESSAGE |
| 1 | B | 2 | | |
| 2 | C | 3 | Y | |

-continued

SQL TABLE MESSAGE:

| STEP | NEXT E-MAIL ADDRESS | NEXT STEP | BRANCH ROUTE | SEND MESSAGE |
|---|---|---|---|---|
| 2 | D | 4 | N | LIST D |
| 3 | NULL | NULL | | |
| 4 | NULL | NULL | | |

In FIG. 12, the email sequence 121 and 122 transmits the document from the user at email address A to email address B. A user at email address B sets the BRANCH INDICATOR=N in email 123. The form route manager determines that email address D is next and sends emails 1211 to the distribution list LIST D informing of the decision of the user at email address B to set the BRANCH INDICATOR=N. Email sequence 126, 127, 128, 129 and 1210 illustrates where BRANCH INDICATOR=Y was set at step 2 and informational messages are not sent.

Figure 13:
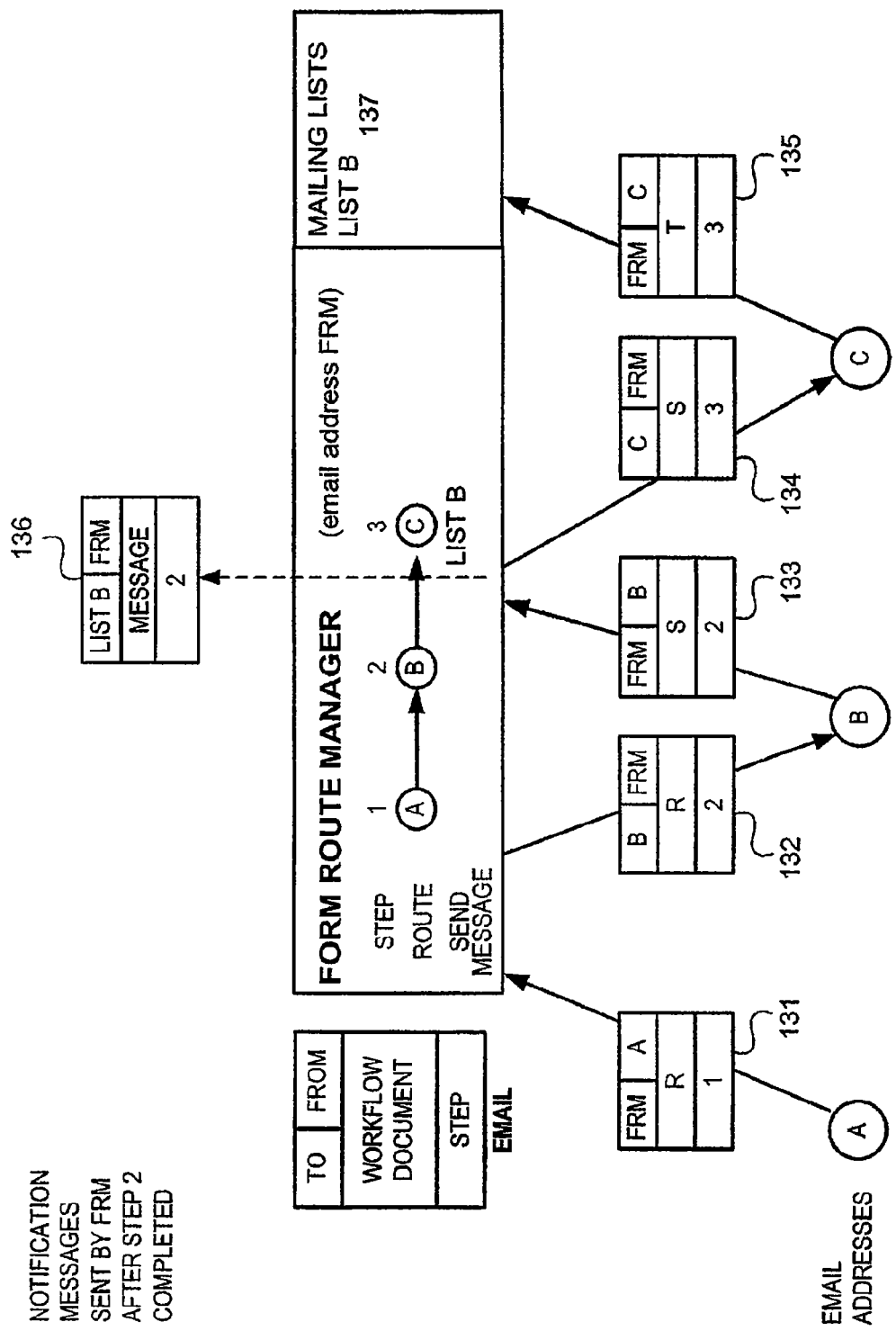
FIG. 13 is a block diagram and sequence of emails illustrating the function to send email to a specified list of email address when the workflow passes a specific step in the route.

It may be desirable to have the emails sent when the workflow reaches a specific step. FIG. 13 illustrates a route where a set of emails 136 are sent to a mailing list 137, a list of email addresses, when step 2 is completed by the user at email address B and email 133 is received by the form route manager. Those skilled in the art will realize notifications are not limited to email but may involve phone pages, voicemail, facsimile, or other notifications.

Travel Reimbursement Approval Procedure

We have now defined the necessary functions to implement the travel reimbursement approval procedure. The route for the procedure in FIG. 7 is illustrated in SQL TABLE TRAVELER. The traveler is P1, the manager is P2, and accounting is P3.

SQL TABLE TRAVEL:

| STEP | NEXT E-MAIL ADDRESS | NEXT STEP | BRANCH ROUTE | SEND MESSAGE |
|---|---|---|---|---|
| 1 | P2 | 2 | | |
| 2 | P3 | 3 | APPROVE | |
| 2 | P1 | 4 | CLARIFY | |
| 2 | NULL | NULL | CANCEL | P1 |
| 3 | NULL | NULL | | P1 |
| 4 | P2 | 2 | SUBMIT | |
| 4 | NULL | NULL | CANCEL | P2 |

In the first row, the document is sent to P2. The next three rows provide P2 with the choice of approving the document and sending it to P3, or sending the document back to P1, or canceling the workflow and sending a message to P1. The fifth row is the completion of the workflow by P3. The sixth and seventh rows provide P1 with the choice of sending the document to P2 or canceling the workflow and sending a message to P2. The email format uses STEP, DOC, and BRANCH INDICATOR control fields. The DOC field enables tracking of each document using the LOCATION table and MOVE HISTORY table. These tables provide real time location of the document and statistical information on each document and collection of documents. The BRANCH INDICATOR field permits P1 and P2 to implement their choices.

Workflow Routes and Organizational Knowledge Base

Figure 14:
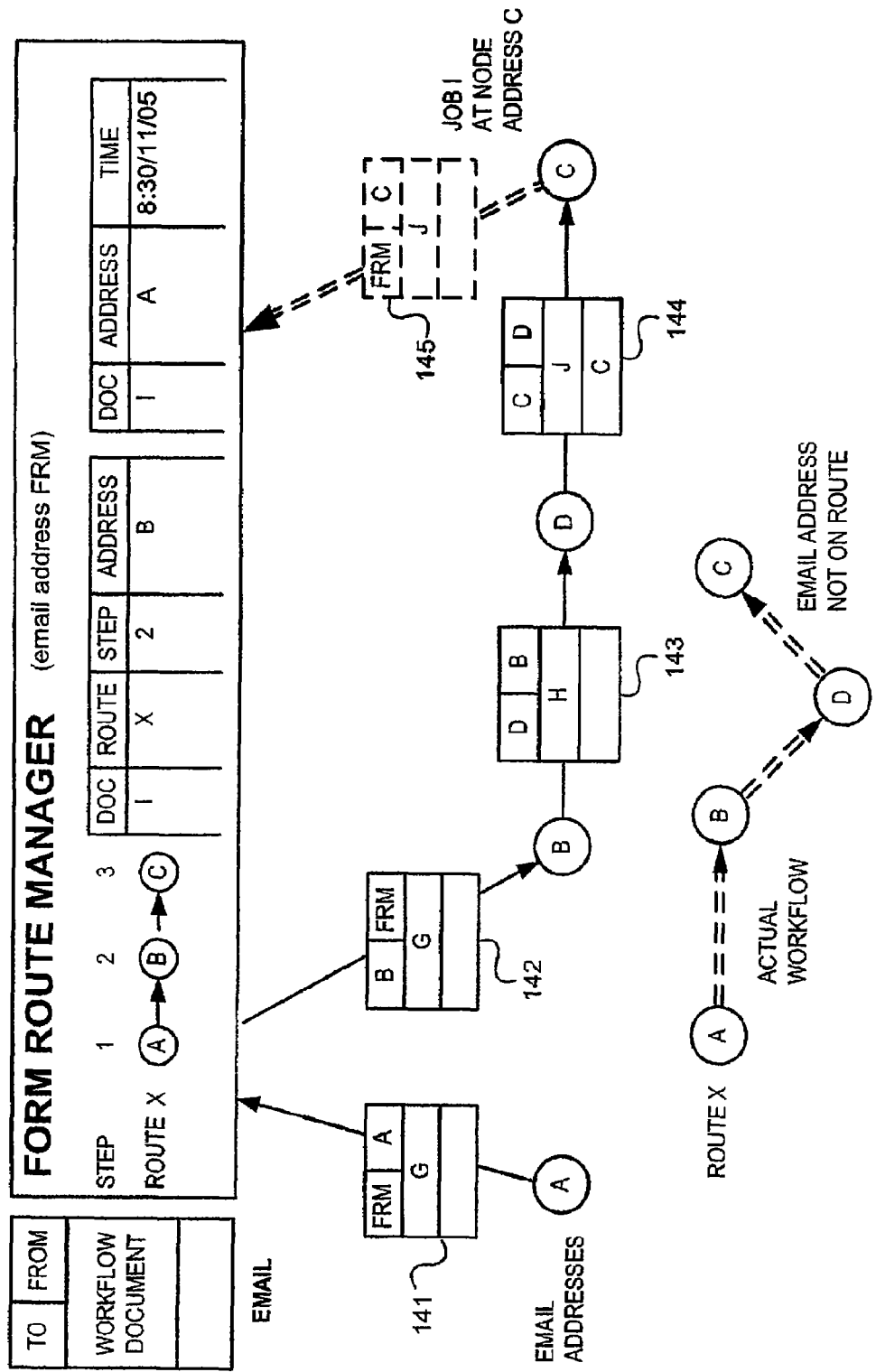
FIG. 14 is a block diagram and sequence of emails illustrating the sending of email to a user not on route and not tracked by the form route manager.

The workflow emails appear in some respects as emails to the email system. Thus, a user can send workflow email to anyone on the computer network and not just back to the form route manager. If the workflow is tracked by the form route manager in the LOCATION and MOVE HISTORY tables, the form route manager can only track the email to the last user to whom it had sent the email. In FIG. 14, a user at email address B sends a workflow email 143 to email address D rather than to the form route manager. A user at email address D sends the email 144 to email address C, but the form route manager can only track the email to the email address B, the last email address that the form route manager sent the email. The expectation is that the user at email address C will send the email 145 to the form route manager.

Redefining the Workflow Route to Obtain an Optimal Set of Users

It may be desirable to send workflow email to a user not on the predetermined route. In the past, many workflow applications were for routine processes making it easy to predefine the route and users to carry out the process. Now, however, many people have a role in our knowledge-based society imposing different constraints on workflow. Unlike the routine processes of the past, the best route may not be clear at the outset. The present invention addresses this problem by providing a way to dynamically redefine the route based on choices made by the users on the route to better harness the ever-changing knowledge of the organization. This ability to redefine the route at the user level is of great value.

In one embodiment, the system opens workflow to anyone on the email system and not just those originally specified in the route. Thus, an individual in the route can send an email to others who may have information, which adds value to the workflow. This is very advantageous as it is difficult to establish the optimal set of experts for knowledge-based processes. However, the users on the route can typically identify others who should be added to the route. Thus, in one embodiment, the system provides workflow, which tracks the actual route and captures the actual route as defined by the user community. This permits an organization to leverage its knowledge of the organization and use the workflow as the "memory" of successful workflows. This ability to go off route and capture the optimal route permits the workflow to track the evolving knowledge of the organization.

Capturing Actual Workflow Routes

Figure 15:
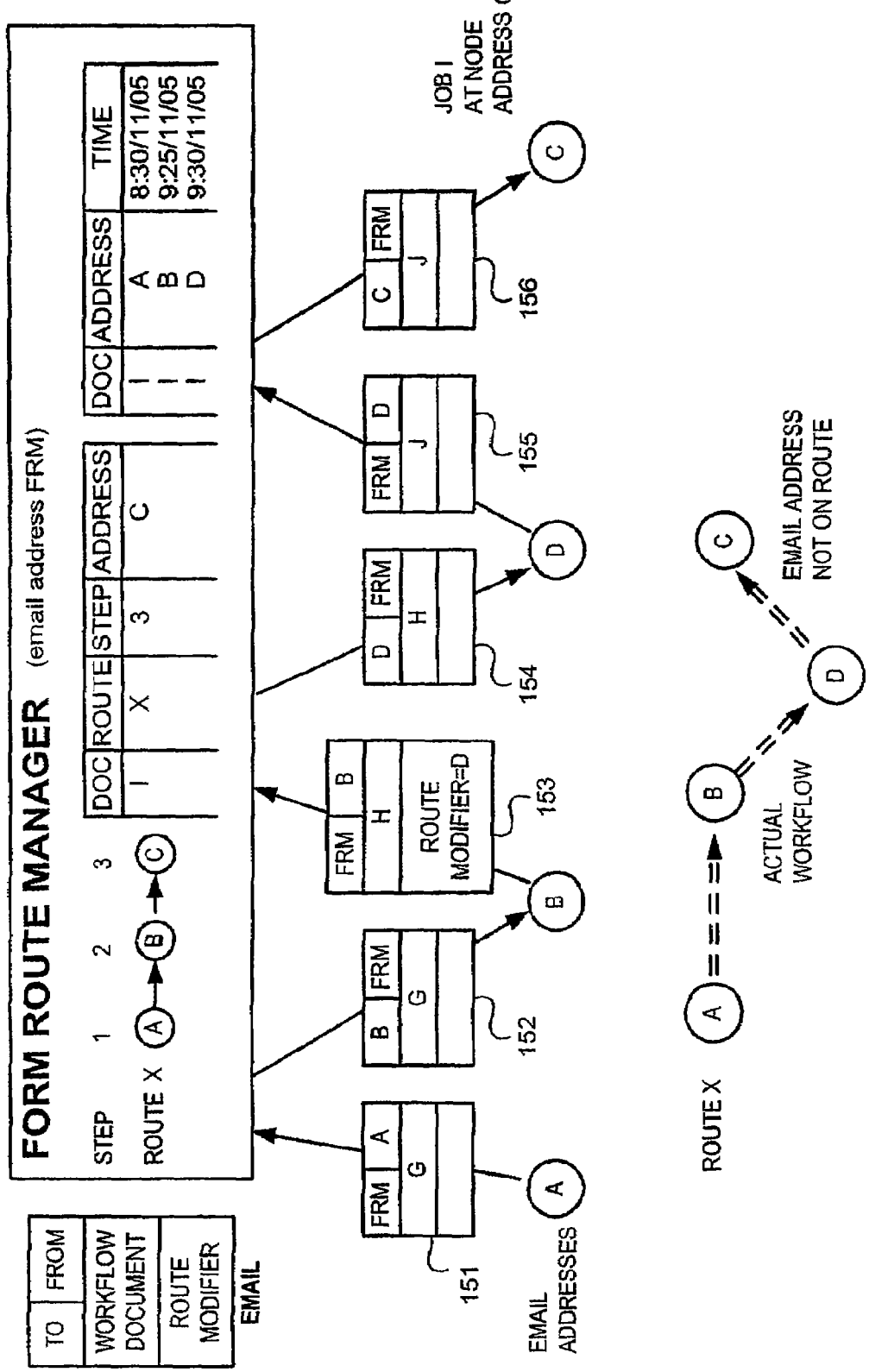
FIG. 15 is a block diagram and sequence of emails illustrating the sending of email to a user not on route but tracked by the form route manager.

To track email, the form route manager must be part of the email message workflow. The ROUTE MODIFIER control field in workflow email provides this mechanism. If the ROUTE MODIFIER is assigned an email address, the form route manager sends the email to this email address and tracks it by updating the LOCATION and MOVE HISTORY tables. As shown in FIG. 15, route X flows from email address A to email address B to email address C. The route that is executed, the actual route, includes the user at email address D. The email sequence 151 and 152 sends the email from the user at email address A to email address B. The user at email address B sends email 153, with the ROUTE MODIFIER set to email address D and to the form route manager. The form route manager updates the LOCATION and MOVE HISTORY tables to reflect that it sent the workflow email 154 to email address D. A user at email address D returns email 155 to the form route manager and the form route manager determines the next user on the route email address C, updates the tables, and sends email 156 to email address C.

Figure 16:
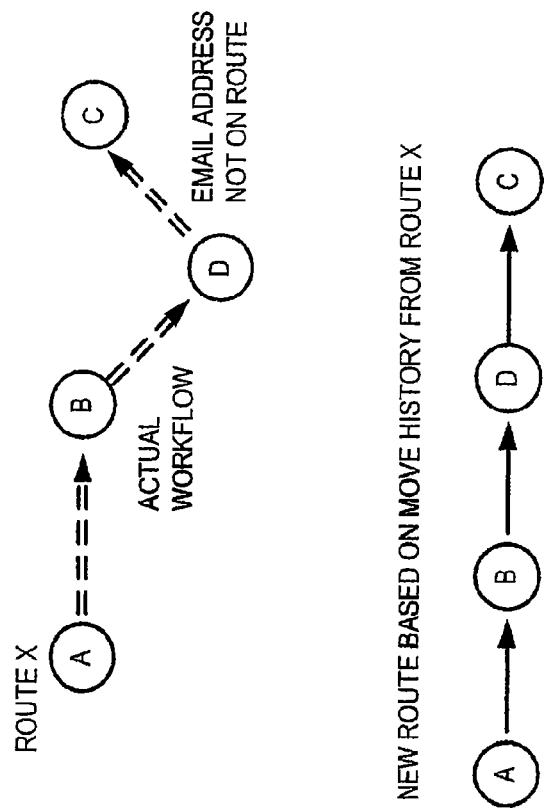
FIG. 16 is a block diagram and tables to create a new route based on the move history table.

At the completion, the MOVE HISTORY table holds the exact sequence of email addresses for a specific document. As illustrated in FIG. 16, the MOVE HISTORY table can be used to create a new route based on the route actually executed. The MOVE HISTORY can be used directly or can be edited to prune and/or extend to people not in the MOVE HISTORY table to help the evolution of a procedure. Thus, the original route specified A to B to C, the route created from the MOVE HISTORY table specifies A to B to D to C, where D was added to the original route.

Multiple Form Route Managers Workflow System

It may be desirable to have the route and tracking of workflow separated into two or more form route managers. For example, a workflow may cross two widely separated sites and the delay of email transfer may impact the performance of the workflow. Another application is when the workflow route is separated so that each route segment can evolve without impacting the other route segment. A third application is where a workflow may start in one company and continue in another company. Finally, the two route managers may backup one another.

Figure 17:
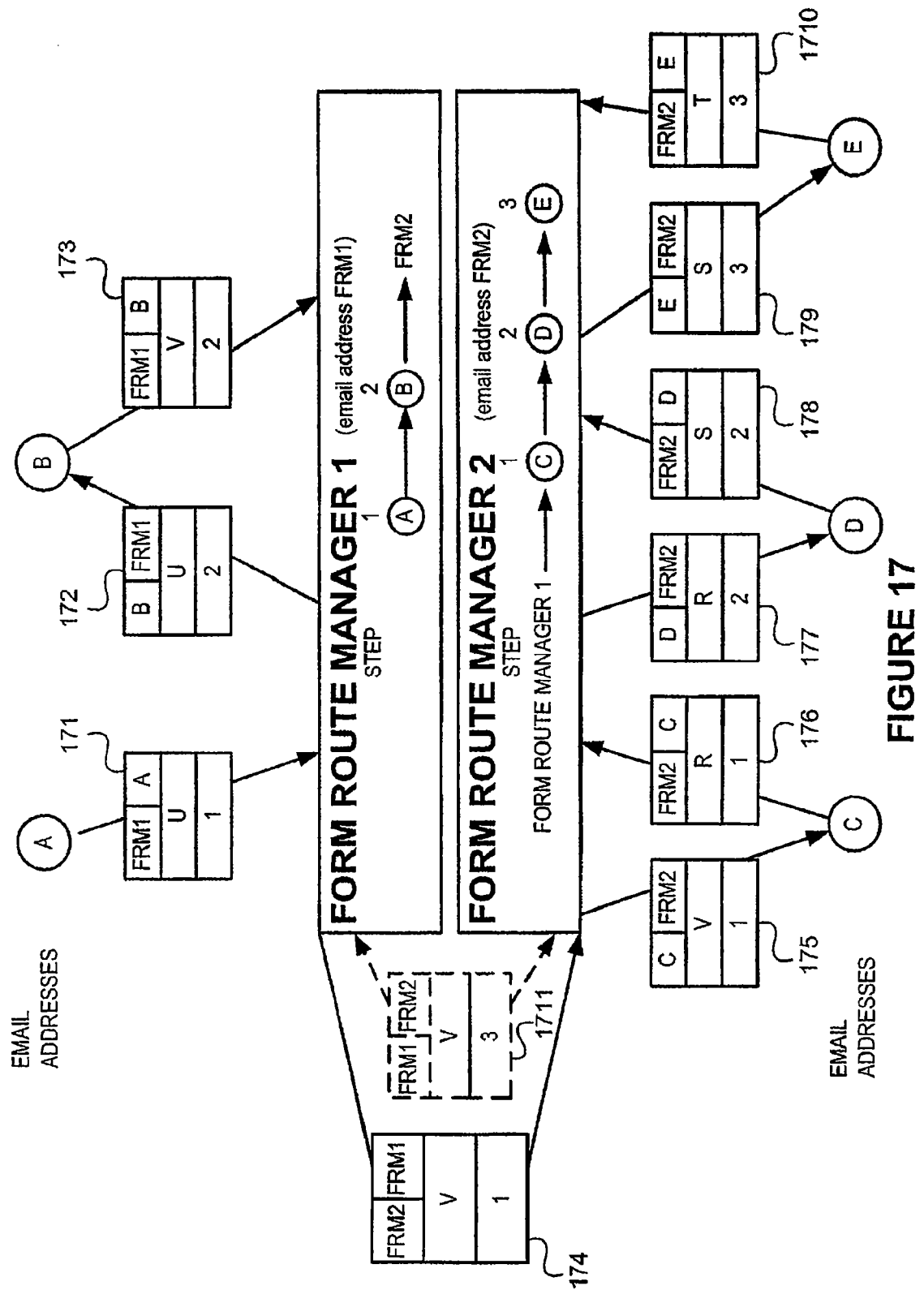
FIG. 17 is a block diagram and sequence of emails illustrating the cooperative functions of two form route managers to support a route that starts in one and continues in the other.

FIG. 17 illustrates a workflow route segment that begins in form route manager 1 from email address A to email address B, then to a second route segment in form route manager 2, email address C, email address D, and finally to email address E. In an implementation, the SQL table in form route manager 1 representing route segment 1 is illustrated as SQL table ROUTE SEGMENT ONE and the route segment 2 in form route manager 2 is illustrated as SQL table ROUTE SEGMENT TWO.

| STEP | NEXT E-MAIL ADDRESS | NEXT STEP |
|---|---|---|
| SQL TABLE ROUTE SEGMENT ONE: | | |
| 1 | B | 2 |
| 2 | FORM ROUTE MANAGER 2 | 3 |
| 3 | NULL | NULL |
| SQL TABLE ROUTE SEGMENT TWO: | | |
| 1 | C | 2 |
| 2 | D | 3 |
| 3 | E | 4 |
| 4 | NULL | NULL |

The email sequence 171, 172, and 173 transfers the email from email address A to email address B. The email 174 is used to transfer the email between form route manager 1 and form route manager 2. The STEP field in email 174 is set to the initial step, STEP=1, for route segment 2 by form route manager 1. Form route manager 2 sends the email 175 to email address C to continue route segment 2 and email 1711 to form route manager 1 to confirm the transfer to route segment 2. The email 1711 with STEP=3 is required if the form route manager 1 has a LOCATION and MOVE HISTORY TABLE to signify that route segment 1 is complete. The form route manager uses email 1711 to confirm the receipt of email 174. The email sequence 176, 177, 178, 179, and 1710 transfers the email from email address C to email address D to email address E.

Complex Routes with Fork Branching, Parallel Routes, and Joining of Routes

Figure 18:
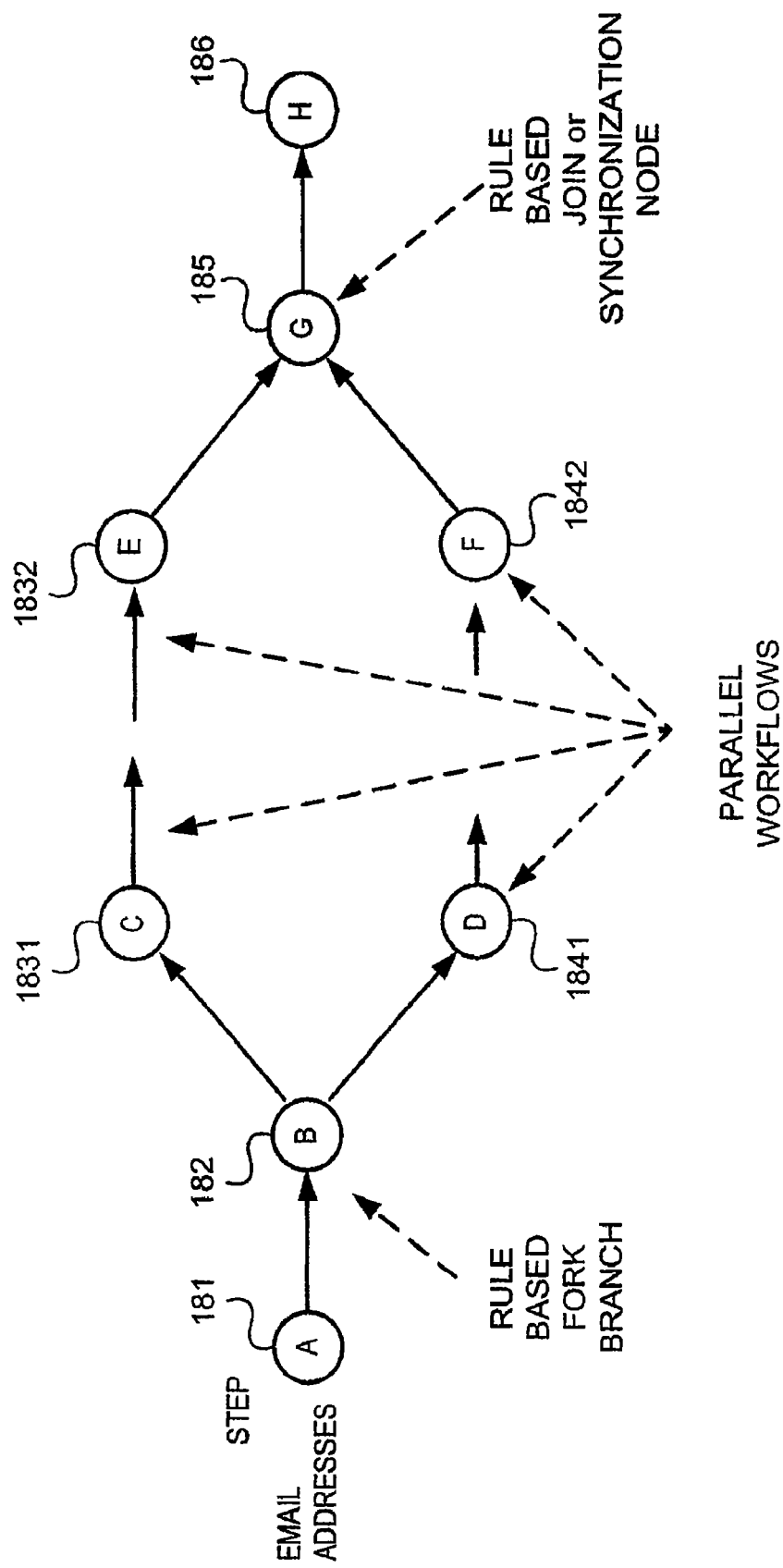
FIG. 18 is a block diagram illustrating the FORK and JOIN functions and parallel branch routes in a route.

In complex workflow, it may be highly desirable to have a route split into two or more parallel branch routes that proceed independently of each other. It may be also desirable to bring parallel branch routes together to synchronize workflow or to combine into a single or smaller number of routes. These concepts are illustrated in FIG. 18. The function of splitting a route into branch routes, called a FORK, occurs when the route at the user at email address B 182 splits into two branch routes to email address C 1831 and to email address D 1841. The combination function called a JOIN occurs at email address G 185 where the branch routes from the email address E 1832 and email address F 1842 join together. FORKS and JOINS can be based on rules to provide a high degree of flexibility while still automating the procedures. A FORK can result in parallel branch routes while a CONDITIONAL BRANCH directs flow to one of several choices.

The rules to activate branch routes need not activate all of the branch routes but can activate a subset of the branch routes depending on the result of the rules. As an example, assume there is four branch routes, W, X, Y, and Z and Rule 1 and Rule 2 apply at a FORK. Rule 1 can specify conditions that when satisfied activate branch routes W and X in parallel by sending an email to the first email address in branch route W and an email to the first email address in branch route X. Rule 2 can specify conditions that when satisfied activate branch routes W, Y and Z in parallel by sending emails to the first email addresses in branch routes W, Y and Z.

In an example, the JOIN rule may be employed in a situation where parallel approval is required such as that where both fixed asset approval and finance approval is required to continue a purchase approval procedure. In general, these rules may be generalized to include Boolean functions, voting, weighted votes, and unconditional joins.

Figure 19:
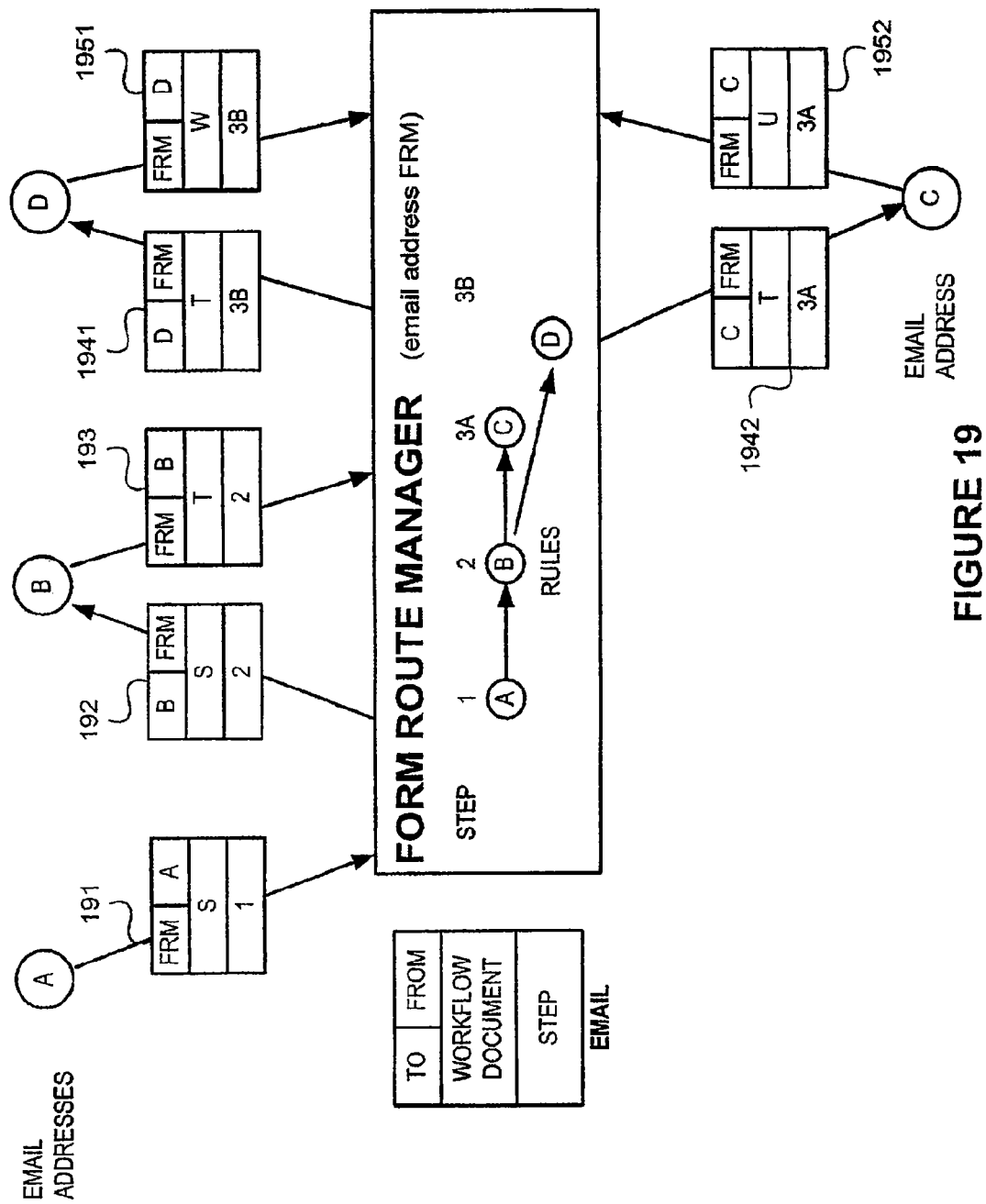
FIG. 19 is a block diagram and sequence of emails illustrating rule based FORK branch function.

FIG. 19 illustrates the route and sequence of emails to effect a FORK at email address B. In one embodiment, a FORK ROUTE is shown in SQL TABLE FORK below. The FORK/JOIN column indicates when two or more rows at the same step produce parallel workflow routes by the word "FORK".

| STEP | NEXT E-MAIL ADDRESS | NEXT STEP | FORK/JOIN |
|---|---|---|---|
| SQL TABLE FORK: | | | |
| 1 | B | 2 | |
| 2 | C | 3A | FORK |
| 2 | D | 3B | FORK |
| 3A | NULL | NULL | |
| 3B | NULL | NULL | |

At step or row 1, the form route directs the email to the email address B. Rows two and three have the same step number and the key word FORK in the FORK/JOIN column. At step 2, the form route manager generates a parallel workflow by sending email to both email address C and to email address D. If the form route manager contains the LOCATION table and MOVE HISTORY table, each parallel route would have an entry in the LOCATION table. The document identifier can be augmented with a suffix to distinguish between the locations and move history of the parallel routes. Those skilled in the art will recognize after review of the present application that alternative data structures can represent the information required for the parallel route and tracking functions.

In FIG. 19, the email sequence 191, 192, and 193 transfers the workflow document from email address A to the form route manager to email address B to the form route manager. The form route manager copies the email 193 and sends a copy email 1941 to email address D and a copy email 1942 to email address C so that C and D can process the document in parallel.

Figure 20:
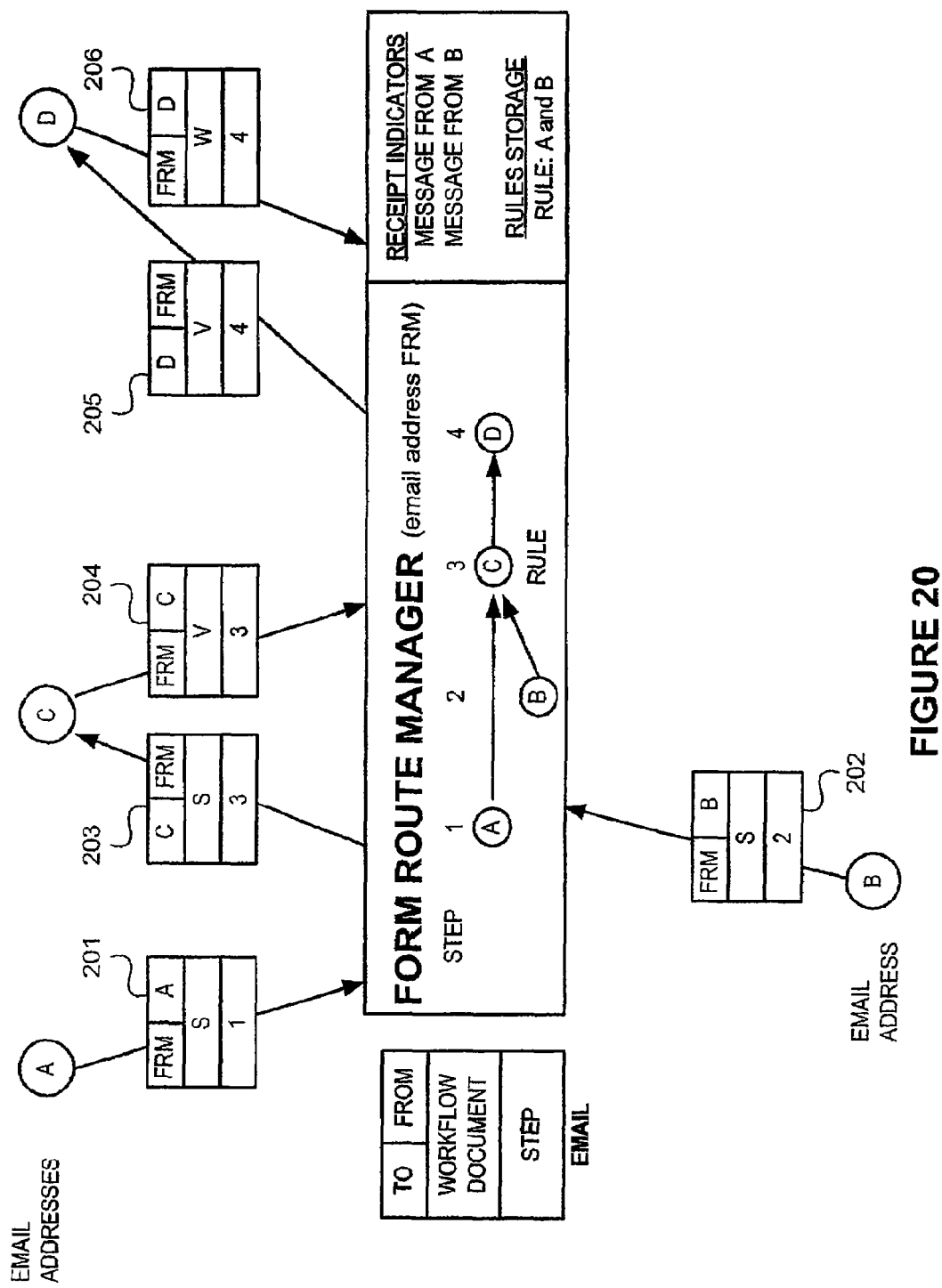
FIG. 20 is a block diagram and sequence of emails illustrating rule based JOIN function.

In FIG. 20, the route specifies a JOIN at email address C. The route structure is illustrated in SQL TABLE JOIN where a row with the key word "JOIN" in the FORK/JOIN column is used to signify where two or more parallel routes join.

| SQL TABLE JOIN: | | | |
|---|---|---|---|
| STEP | NEXT E-MAIL ADDRESS | NEXT STEP | FORK/JOIN |
| 1 | C | 3 | JOIN |
| 2 | C | 3 | JOIN |
| 3 | D | 4 | |
| 4 | NULL | NULL | |

The email 201 from the user at email address A and the email 202 from the user at email address B must be received by the form route manager before sending the email 203 to email address C. Thus, the join function is similar to an AND logic gate. The form route manager has memory to save receipt indicators of the asynchronous receipt of emails 201 and 202 before sending the email to the email address C. The form route manager receives either email 201 or 202 and sets an indicator to show one email was received and checks the other indicator to determine if the other email was received. The SQL table MESSAGE RECEIVED illustrates a data structure that implements this function when message 201 was received.

| SQL TABLE MESSAGE RECEIVED: | |
|---|---|
| STEP | RECEIVED |
| 1 | 201 |
| 2 | |

Since message 202 had not been received, the form route manager begins processing the next email. When message 202 is received, the form route manager sends email 203 to the next step in the route, email address C. For multiple documents using the join function, each message and the SQL table MESSAGE RECEIVED would require an additional field, DOC, to distinguish the use of join flags among the documents. Those skilled in the art will recognize after review of the present application that different data structures could be devised to accomplish this function.

Fault Detection and Recovery

Figure 21:
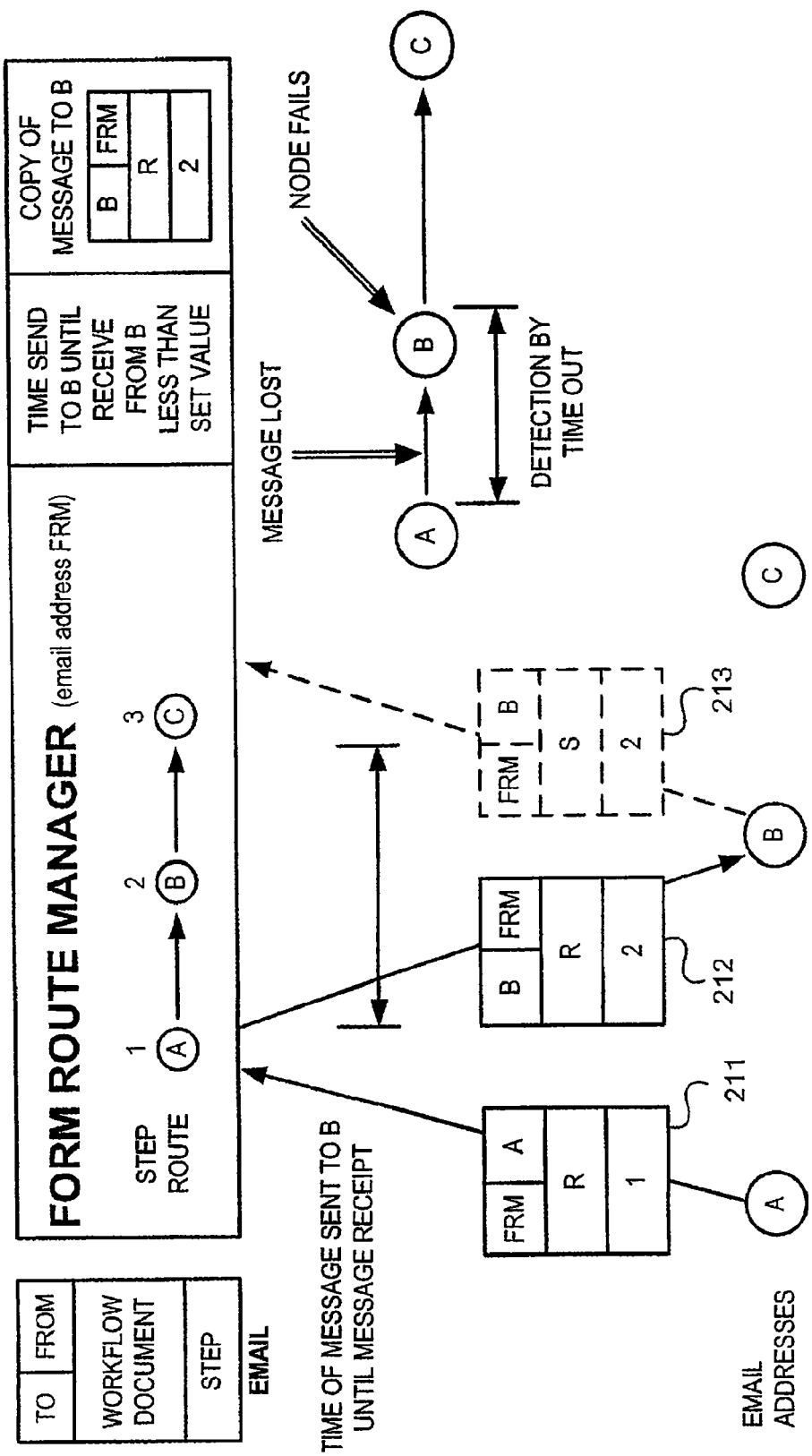
FIG. 21 is a block diagram and sequence of emails illustrating error detection using timed intervals and error recovery of a lost email using a stored copy of the email.

Workflow requires the cooperation of independent PCs and the email system. A workflow can be delayed, for example, by a user not timely performing his step, or by an email being lost by a faulty email system. A fault detection mechanism can measure the time between the sending of an email to a user and the receipt of the return email as illustrated in FIG. 21. There email 212 is sent and the form route manager clocks the waiting period for the receipt of the email 213. If the time exceeds a predetermined interval, a potential fault is detected. Recovery could be resending the email, sending a notification email to another email address or list of email addresses, sending an email to an email address C next on the route, an email to the email address A who initiates the workflow, an email to the manager of a user at email address B who is not responding, or sending a telephone page to a phone number or set of numbers, or sending a FAX to a number or set of numbers. In some of these failures, the email will be lost. Because many email systems hold images of emails sent by a client, the form route manager can store images of the sent emails to recover the lost email, For example, Lotus Notes has an email log that can be used to recover lost emails. Many email and email systems also have extensive backup and recovery mechanisms to recover from system outages. The form route manager may use these mechanisms to recover from email failures.

The form route manager can be implemented using relational database management, RDBM, such as the Oracle 8i database, which has extensive error detection, recovery mechanisms, and permits easy implementation of high reliability structures such as mirrored, duplicated hardware and replicated, redundant databases. With the use of these technologies, the form route manager can be implemented to be highly reliable.

Figure 22:
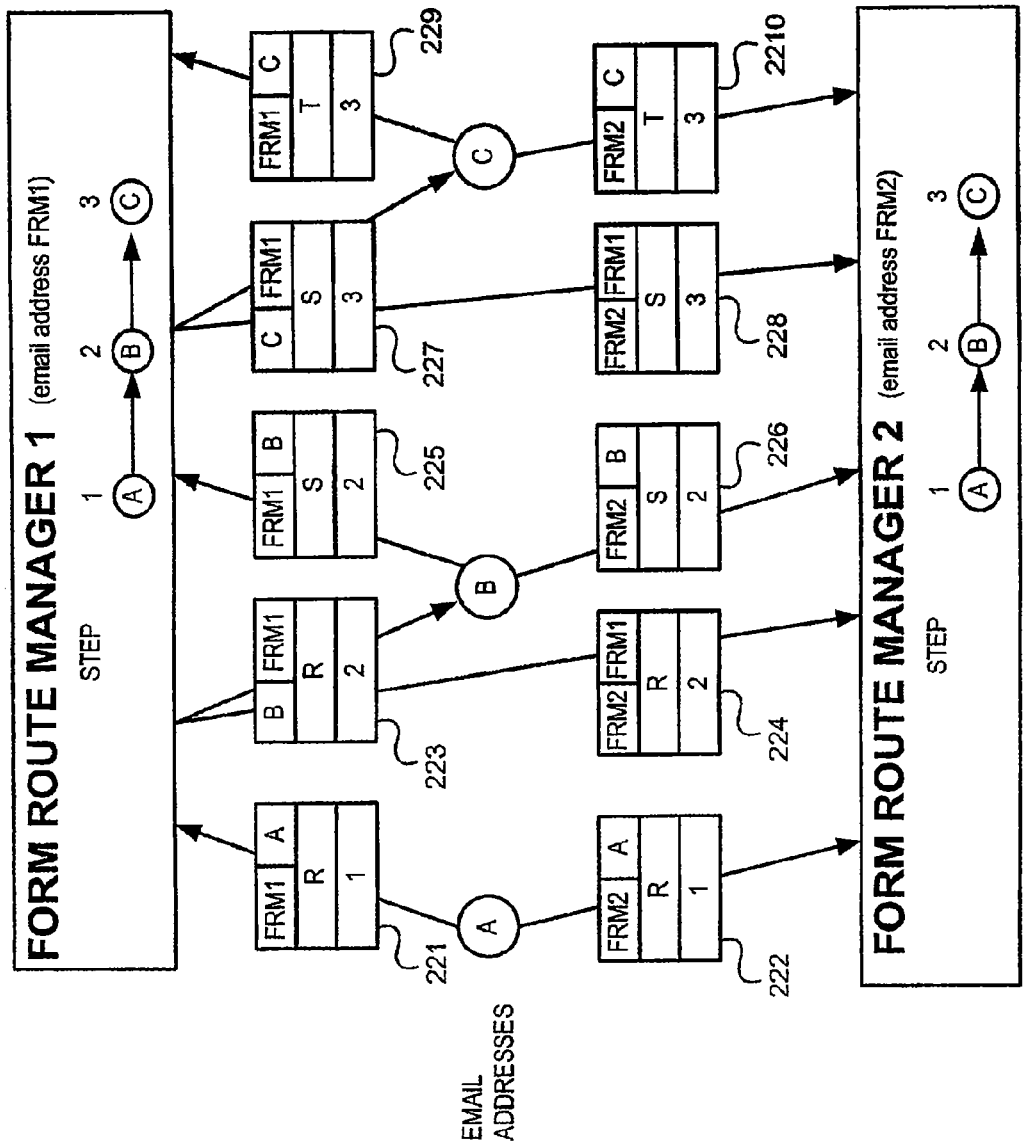
FIG. 22 is a block diagram and sequence of email illustrating one form route manager backing up another form route manager.

As mentioned, the email system may be used so that two form route manager units can be backup units for each other, and this is illustrated in FIG. 22. Each workflow email is addressed to the second form route manager as well as the email address to which the email is sent. This ensures that the second form route manager has a copy of the email and can track the progress of the workflow with respect to the form route manager, which sent the email. Many email systems can address a message to a list of email addresses or can provide a courtesy copy of the email to another email address. The user at email address A can send email 221 to form route manager 1 and email 222 to form route manager 2. Form route manager 1 sends an email 223 to the email address B and an email 224 to form route manager 2. When the user at email address B completes the process step, the email is sent back using the REPLY ALL function available in many email systems that will send the email to the sender and all the addressees on the original email. This will send an email 225 to the form route manager 1 and an email 226 to the form route manager 2. This permits form route manager 2 to track the workflow. The form route manager 1 sends the email 227 to the email address C and email 228 to form route manager 2. The user at email address C sends email 229 to form route manager 1 and email 2210 to form route manager 2 using the REPLY ALL function. If form route manager 1 fails, form route manager 2 is ready and synchronized with the workflow. The email addresses can use the REPLY ALL function and send emails to both form route managers, because the emails to the failed form route manager will be queued in the email system. Because the two form route managers need not be physically close, the form route managers can be spaced miles apart to ensure a catastrophe does not affect system reliability.

Workflow Document Format Changed by Form Route Manager Based on Route

In certain workflows, it is desirable to control what data each user in the procedure can see, enter, or modify based on the step in the route. The form to be used may be specified in the route. The form route manager holds a set of document templates in a forms library that are used as email formats. This may require that the form route manager extract data from an email it receives and insert it into an email form that it is sending. The route has a form field associated with a route step that designates the form to be used for that step. For FIG. 23, the SQL TABLE FORMS illustrates the route structure to implement the forms function.

| SQL TABLE FORMS: | | | |
|---|---|---|---|
| STEP | NEXT E-MAIL ADDRESS | NEXT STEP | NEXT FORM |
| 1 | B | 2 | W |
| 2 | C | 3 | X |
| 3 | NULL | NULL | |

Figure 23:
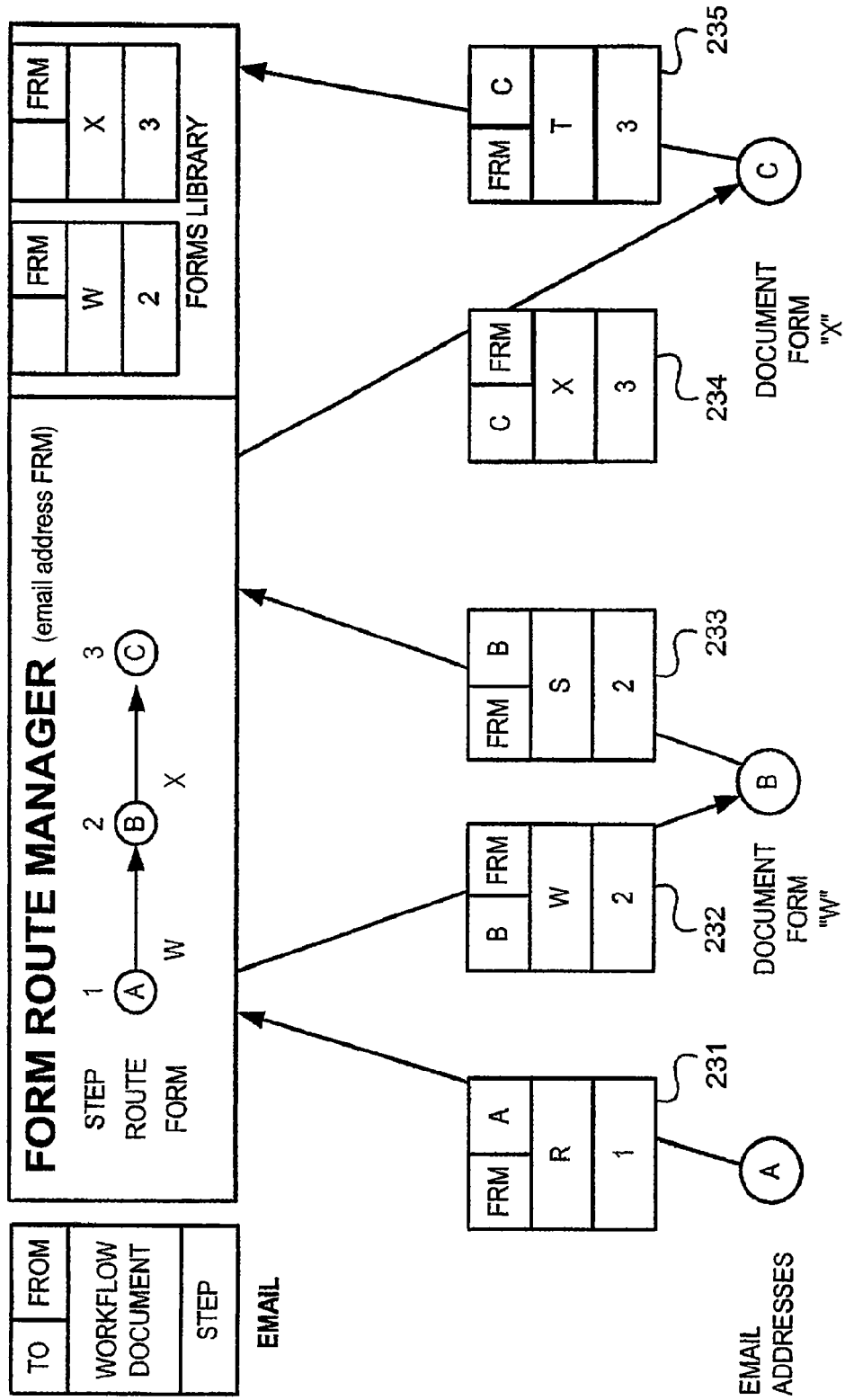
FIG. 23 is a block diagram and sequence of emails illustrating the document format change by form route manager based on the route.

In FIG. 23, the form route manager receives email 231 from a user at email address A in format R, determines from the NEXT FORM field for the next step 2 in the route that document format W is to be used and sends email 232 to email address B in format W. In similar fashion, email 233 received in format S is mapped to format X for email 234 to email address C.

Workflow Status, Route Editing, and Document Forms Request Emails

Figure 24:
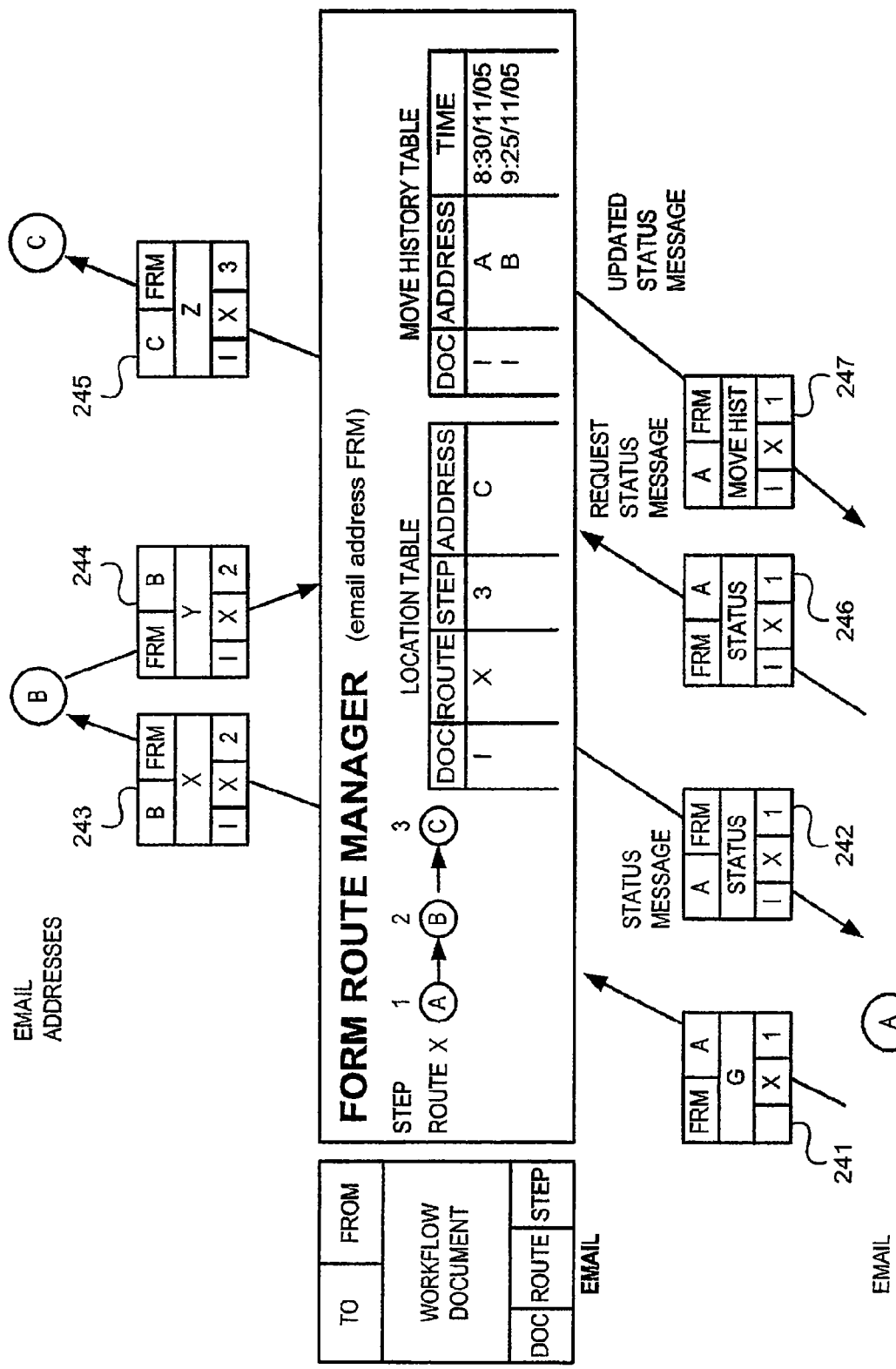
FIG. 24 is a block diagram and sequence of emails illustrating the STATUS REQUEST and the response and use of email REPLY functions for users to obtain status on documents.

Users in workflow may want information on the progress or the statistics of the workflow, such as the average process time. However, many of the users are not connected to the form route manager and only have access using email. The critical parameter for such information is the value of DOC, the index for the LOCATION and MOVE HISTORY tables. Each document has a unique DOC value. In certain embodiments, the users must save the value of DOC if they want to get status on the document. To facilitate email access, FIG. 24 illustrates a set of email formats. In response to an email 241, having a control field STATUS, and sent by a user at email address A, an email 242 is sent by the form route manager to email address A with the STATUS and the DOC=I at the same time as the email 243 is sent to the email address B. The user at email address A saves the email 242 for later use to request status on this document. The email sequence 244 and 245 advances the document to email address C. A user at email address A requests the status of the document by sending email 246 to form route manager by using the REPLY function on the email 242 that was saved earlier. The form route manager responds with email 247 with the LOCATION and MOVE HISTORY for the document with DOC=I. A user at email address A can save email 247 and use it or email 242 to request subsequent status.

Because many workflow users are connected to the form route manager just through the email system, the present invention provides a way to create or edit the route and emails for a workflow by use of emails. A request for email to the form route manager returns a route and emails documents that may be used to create a new route and emails for a new procedure or to edit a route or form for an existing procedure. The document edited in the PC is sent back to the form route manager to be added to the library of procedures, routes, and forms. It may be desirable to have a security system that permits only those with the correct password or user address to modify or add routes and forms.

The workflow may be initiated from a PC, terminal, or workstation by sending a workflow email to the form route manager. One of ordinary skill would understand after review of the present application, that the computers at each email address can encompass any device with a display and input, including hand-held and portable terminals, bar code readers, radio frequency, infrared, and ultraviolet-connected terminals, and other input/output devices that may participate in business procedures. The initial workflow document email can be obtained from the form route manager by sending a request email for blank workflow emails for each of the active procedures. The form route manager responds with a list of procedures that may be initiated by that user. The user edits the list and sends it back to the form route manager. The form route manager then responds with workflow document emails in their initial state as requested. These may be used immediately or saved by the user in their mail log for later use. Alternatively, the email system can have blank initial email forms that were sent by the form route manager in folders. Users can initiate workflow processes by just selecting the appropriate email, use the REPLY function to address the email to the form route manager, fill in the form and send it. Since the email was from the form route manager, the user need not address the email if REPLY is used.

The workflow procedure can be initiated by a computing machine or system connected to the email system. As an example, a company may have annual reviews. Human resources has the date of last review for each user and can initiate a review procedure for each user who has a last review date later than one year from the current date by sending a workflow document email, with the appropriate HR information, to the form route manager to send to each manager who has an employee needing a review. Once initiated, the review procedure can be monitored to ensure that every employee receives his or her annual review.

Route Role Mapping to Users

The route for a procedure requires the email address of the people who process each step. However, there may be a workflow that is the same but requires different people. Rather than creating a different route for each use, the route may have role symbols that are used to map to the actual email address of the people who are to execute the procedure. For the business travel reimbursement example, the roles are initiator, approver, and payer. The SQL TABLE ROLE ROUTE and SQL TABLE ROLES show the relationships for concepts illustrated in FIG. 25.

| STEP | SQL TABLE ROLE ROUTE: NEXT ROLE | NEXT STEP |
|---|---|---|
| 1 | R2 | 2 |
| 2 | R3 | 3 |
| 3 | NULL | NULL |

| PROJECT | SQL TABLE ROLES: ROLE | EMAIL ADDRESS |
|---|---|---|
| PROJECT 1 | R1 | A |
| PROJECT 1 | R2 | B |
| PROJECT 1 | R3 | C |
| PROJECT 2 | R1 | D |
| PROJECT 2 | R2 | E |
| PROJECT 2 | R3 | F |
| PROJECT 3 | R1 | TBD |
| PROJECT 3 | R2 | MGR TBD |
| PROJECT 3 | R3 | FIN |

Figure 25:
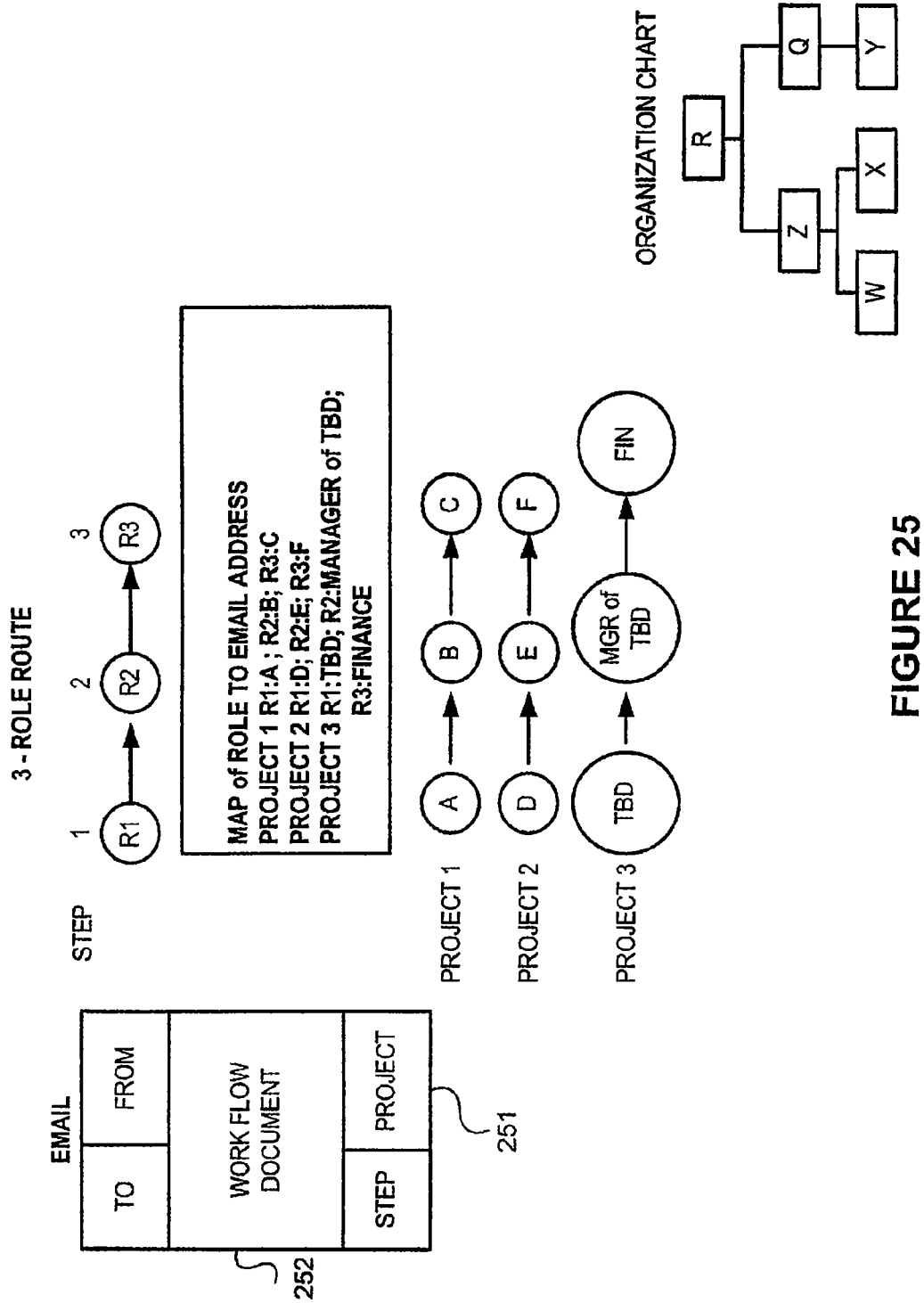
FIG. 25 is a block diagram and tables illustrating the mapping of a three-step route with the roles at each step mapped to the email address based on a project identifier.

In FIG. 25, these three roles are shown as R1, R2, and R3. The email 251 includes the control field PROJECT 252, which permits the selection of email addresses based on the value of PROJECT. The mapping in SQL TABLE ROLE ROUTE permits the selection of the email addresses based on Project 1 or Project 2 where for Project 1, R1 is email address A while for Project 2, R1 is email address D. The roles may be specified or may be determined based on other information such as an organization structure. The SQL TABLE ORGANIZATION illustrates the relationship of employees and managers.

| SQL TABLE ORGANIZATION: | |
| --- | --- |
| EMPLOYEE | MANAGER OF EMPLOYEE |
| W | Z |
| X | Z |
| Y | Q |
| Z | R |
| Q | R |

For Project 3, R1 is to be determined (TBD), and is the email address of the initiator of the workflow. Based on TBD, R2 is selected as the email address of the manager of TBD, the manager of the initiator, and R3 is the email address FIN, finance or the accounting department. For example using the organization illustrated in SQL TABLE ORGANIZATION, an email from employee W with PROJECT=Project 3 would be sent to the manager of employee W, Z. Similarly, an email from employee Y would be sent to manager Q. The mapping table can be designed to identify alternate or backup personnel where the role table specifies a list of email addresses with a selection rule. Special emails to the form route manager that edit the mapping table may be used to modify or to assign an alternate when a person is absent or on vacation.

In summary, the route role position may map to a list of people, each of whom may perform the process. The mapping of roles to people can be based on an organization chart. As an example, in the business travel reimbursement procedure, the traveler role may not be assigned to a specific person in the route but may be designated TBD when the email is received by the forms route manager. The R2 manager role is then mapped to the user who is the manager of the traveler.

Load Balancing

Some procedure routes identify two or more people who may execute a specific process step. For a workflow tracked with LOCATION table, the form route manager can be used to make the selection of the user to balance the load among the designated people. The selection is based on rules that can be set in the form route manager. As an example, a rule can be set to send the workflow email to the user with the smallest number of workflow emails in the LOCATION table. This mechanism, however, makes the assignment without the possibility of reassigning the email to another user and implements a multi-queue and multi-server structure. Another mechanism has a queue in the form route manager and each user has no more than one workflow email in the LOCATION table. When a user completes a process step and sends the email to the form route manager, the form route manager can then send that user another email from the queue. This implements a more effective single-queue-multi-server structure.

Advantages Associated with Email Systems

Some email systems, such as Microsoft Exchange, have an email recall function that removes unopened email from the email in-box of a recipient. This can recover emails sent to a user who is not processing workflow documents and is holding up documents in process.

Many email systems provide functions that separate emails based on sender identification. This will provide an easy way for users to separate the workflow emails from their other email. Sort by date and other sorts of the in-box can be used to prioritize the workflow emails for each user. Some email systems will sort on the subject field and the form route manager can send the due date in this field. Some email systems have several email priorities that can be used by the business procedure to help prioritize the users' workflow emails. Some email systems have an automated email-forwarding mechanism that will permit a user to assign a second user as the recipient of the emails. This function forwards to the second user the emails addressed to the first user. This function can be used when a user goes on vacation or on an extended trip and cannot execute the process steps assigned to him. Use of the REPLY and REPLY ALL functions is essential for easy use of the email based workflow system. It avoids the need for any of the users to ever enter the address of the form route manager and easily supports a backup, alternate form route manager. The email systems are evolving to provide good user interfaces and functions. The email based workflow system can take advantage of many of these functions and minimize the need for any special programs in the PC, terminal host, or workstation.

Advantages Associated with the Internet

Microsoft Exchange permits users to access their in-boxes using remote PC's connected by phone lines or the Internet. Microsoft Exchange also sends and receives emails from the Internet so the workflow users can be email clients on the Internet. These email system capabilities permit the form route manager to control workflow procedures that have process steps extending beyond the LAN-connected PC's, terminals, and workstations and permit the workers to have remote access and addresses anywhere on the Internet, which extends the workflow capabilities beyond the traditional boundaries of a company and permits integration of workflow among commercial trading partners. Many email systems have these capabilities so implementation of the form route manager program is not limited to Microsoft Exchange.

The workflow users of email systems can connect to the Internet and participate in the workflow controlled by a form route manager attached somewhere on the Internet. The users need not be concerned about remembering the email address of the form route manager, since the workflow email is from the form route manager and the response is returned using the REPLY function. The users may participate in workflow controlled by two or more form route manager units and need not distinguish between the form route manager addresses, since the response emails return to the correct form route manager. The workers need only open their email, set the email to reply to sender, process their step, and send the modified email.

Advantages Associated with the World Wide Web

In one embodiment, the workflow system can be an integration of email and World Wide Web technologies where the form route manager is a World Wide Web site with email capability. The emails from the form route manager include the URL (Uniform Resource Locator, the human readable address of an Internet site or a specific web page) or IP (Internet Process, the system address of an Internet site) of the form route manager and the message from the user in the form of connections to the form route manager web site. Many email systems are web browser based or integrate with browser technology. Many of these can launch a connection to a web site from a URL or IP address embedded in an email. A user receives an email with the URL or IP address of the form route manager web site and connects to the site by selecting the address embedded in the email. The form route manager determines the step in the route and provides access to the document. The user acts on the document as a web page that is sent back to the form route manager web site. The form route manager determines the next step in the route and the email address of the next user, addresses an email with the embedded URL or IP address of the form route manager web site, and sends the email. This process continues until the workflow route is complete.

One embodiment assigns every document in the workflow a unique URL to a web page that contains the document and a STEP field. The functions described for the email based workflow system that uses email are directly translated to the hybrid Internet world wide web and email workflow system where the emails sent by the form route manager are real email and the responses by the users take the form of connections and submissions of web pages to the form route manager web site. Note that the user need not know the URL of the form route manager since it is embedded in the email 266. This permits the users to interact with multiple form route managers with ease since the URL address in the email directs the user to the correct form route manager web site. The user email in-box remains as the interface to all of the form route manager workflow servers, independent of the means by which the user sends back the message: email or web connection.

Figure 26:
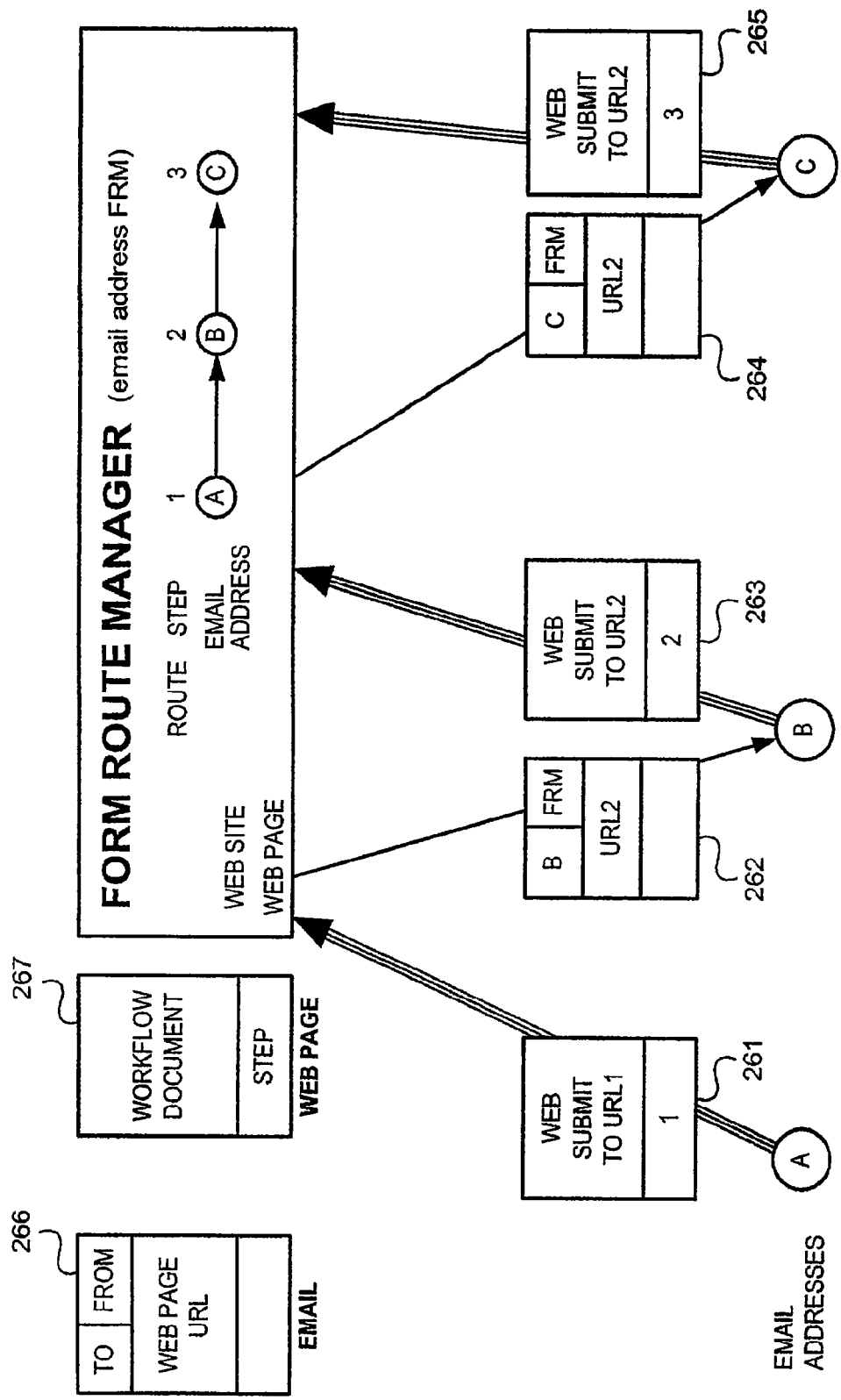
FIG. 26 is a block diagram and sequence of World Wide Web accesses and emails illustrating a combined web page and email based workflow system.

FIG. 26 describes the operation of the hybrid email World Wide Web workflow system. The user at email address A initiates the workflow by connecting to the form route manager web site using URL1, receives a web page 267 with the initial form of the document, and starts a document on a workflow route by submitting the web page 261 back to the form route manager. The form route manager determines from the STEP field in the web page that this is the first step in the route and assigns URL2 as the URL for this document. From the route, the forms route manager determines that B is the next email address, addresses the email to B, updates the web page STEP field to the value of the next step, embeds URL2, the URL of the web page with this document in the form route manager web site, in the email and sends the email 262 to email address B. A user at email address B connects to the form route manager web site by selecting the embedded URL2 in the email 262 and the form route manager web site sends the document to B as a web page 263. The user at email address B receives the web page 263 with the document, updates the document and submits the web page 263. The form route manager receives web page 263 and determines from the STEP field and the route that email address C is the next email address on the route and sends a similarly constructed email 264 to C including URL2 as the embedded URL. A user at email address C connects to the form route manager web site using URL2, receives the web page with the document, processes the document, and submits the web page 265 to the form route manager web site. The form route manager receives the web page 265 and determines from the STEP field that the route is complete for the workflow.

The message-based workflow can be further integrated into the web technology by replacing the sending of an email to an email address with the sending of a specific web page 276 to an IP address using "push" technology. One of the earliest implementations of push technology was PointCast, which uses the broadcast model in the context of web servers and browsers. PointCast or a another conventional push technology can provide a mechanism for a web site to push a web page to a specific IP address or the IP address can poll the web site and pull a web page when provided by the web site.

Figure 27:
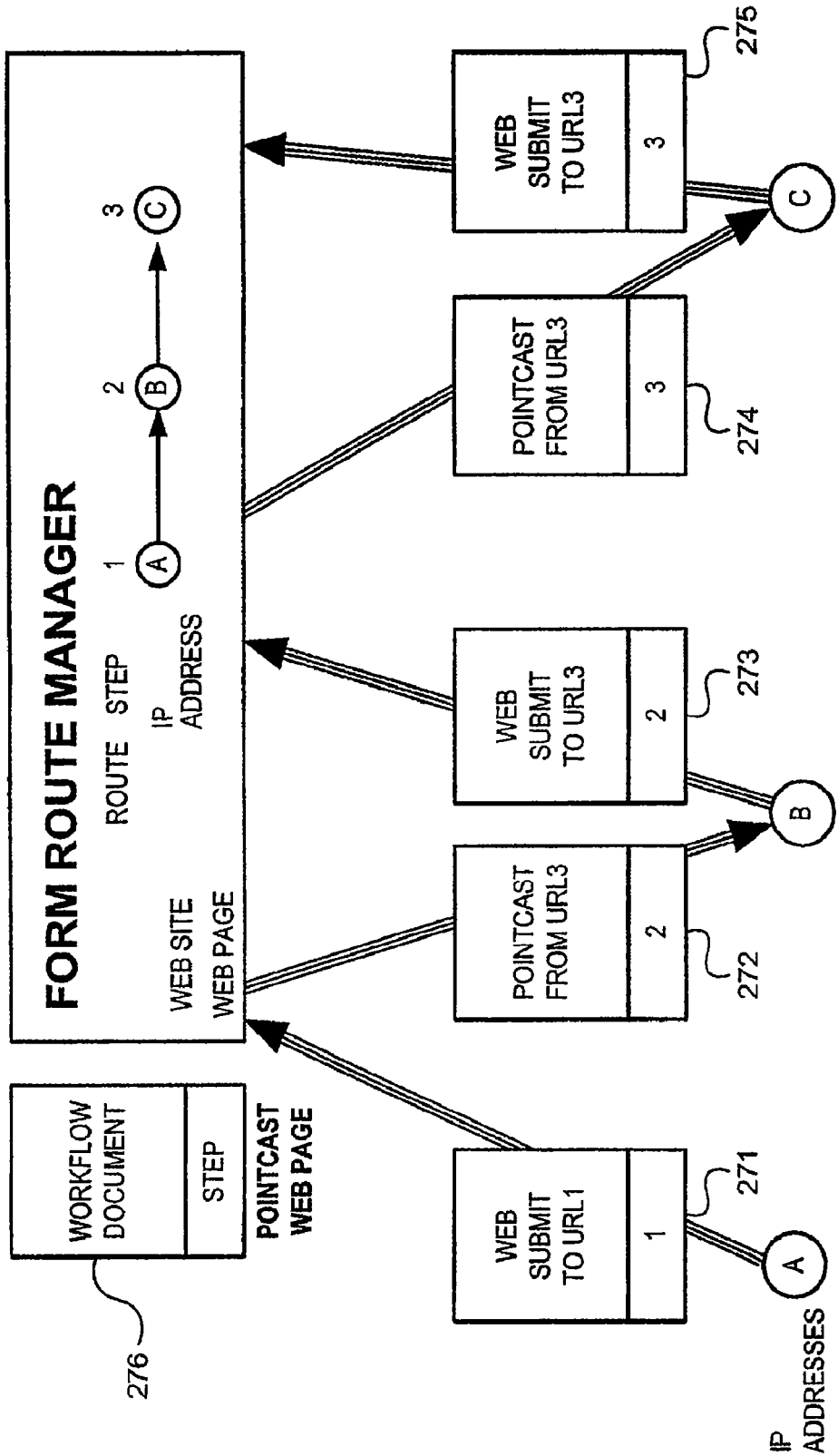
FIG. 27 is a block diagram and sequence of World Wide Web accesses and web page data transfers illustrating the use of web page technology for message based workflow system.

FIG. 27 illustrates one implementation of PointCast messages from the forms route manager to send the document to a user as a web page where the user processes the document and submits the web page back to the form route manager web site. The user at IP address A submits web page 271 to the form route manager web site. The form route manager determines from STEP=1 that this is the initial document, assigns URL3 as the URL for this document, determines from the route that IP address B is the next IP address and sets STEP=2, the next step in the route, and PointCast 272 to IP address B using URL3. The PointCast may be the entire web page or part of a page with URL3 that appears in an in-box like web page at IP address B where the user must request the page by submitting a request to URL3. The in-box like web page can function much as the email in-box to hold the workflow documents waiting for the user. The user at IP address B processes the web page and submits the web page 273 to URL3, the form route manager web site. The form route manager determines from STEP=2 and the route that the next step is 3 and the next IP address is C. The form route manager updates the STEP field to 3 and sends PointCast 274 to IP address C. The user at IP address C processes the web page and submits the web page 275 to URL3, the form route manager web site. The form route manager determines from STEP=3 and the route that this completes the workflow for this document.

The workflow may be initiated from a library of email in a folder in the email system, where there is one email for each workflow process and each is addressed with the email address of the appropriate form route manager. These may be copied by the users and sent to the form route manager. In a hybrid, email/web system, the form route manager addresses are the URL of the form route manager and the user connects to the form route manager site using this web address. The web page can have a folder of forms. These folders can be thought of as the library of forms that businesses have where each form is tailored to a specific process. For example, travel expense forms, employee address update forms, etc. Each form is a document with an underlying process. This electronic library of email or web forms not only provides the document for the process, but also provides the initial form for the electronic route that supports the process.

The present invention permits workflow systems to have functions that in the past have been implemented only in database workflow systems, while permitting the wide participation of workers connected through email messaging systems, including the Internet, without requiring the PC's, terminals, or workstations of these workers to have any special program other than email or a browser used with the World Wide Web. The invention eliminates the barriers that have hindered the widespread use of electronic workflow systems and will permit rapid growth of this technology, which will effectively focus the efforts of office workers for a majority of business procedures and will dramatically improve the quality of results, reduce processing time, and lower costs.

The present invention also relates to integration of the workflow system with a calendar system. A calendar system can be a feature of a commercial software product such as Microsoft Outlook or Microsoft Schedule+. Microsoft Outlook will be used as an example, but those skilled in the art will understand how the invention can be applied to other calendar systems. Microsoft Outlook is discussed in detail in Syroid and Leuf, *Outlook 2000 In A Nutshell* (2001) O'Reilly, which is hereby incorporated by reference.

Microsoft Outlook has facilities to implement message-based integration with the workflow system, e.g., an alert message and an email calendar scheduling message format. The alert message mechanism triggers a message to calendar users at a specified date and time. The mechanism can be modified to send an email to a specified email address at the specified date and time. Microsoft Outlook also uses email messages to coordinate the scheduling of calendar event by one user with another calendar or to add, modify, or delete calendar events. This mechanism can be used without modification where the email messages from the workflow system are designed to follow the format of the Microsoft Outlook email messages and contain the information to schedule the requested calendar event.

Figure 28:
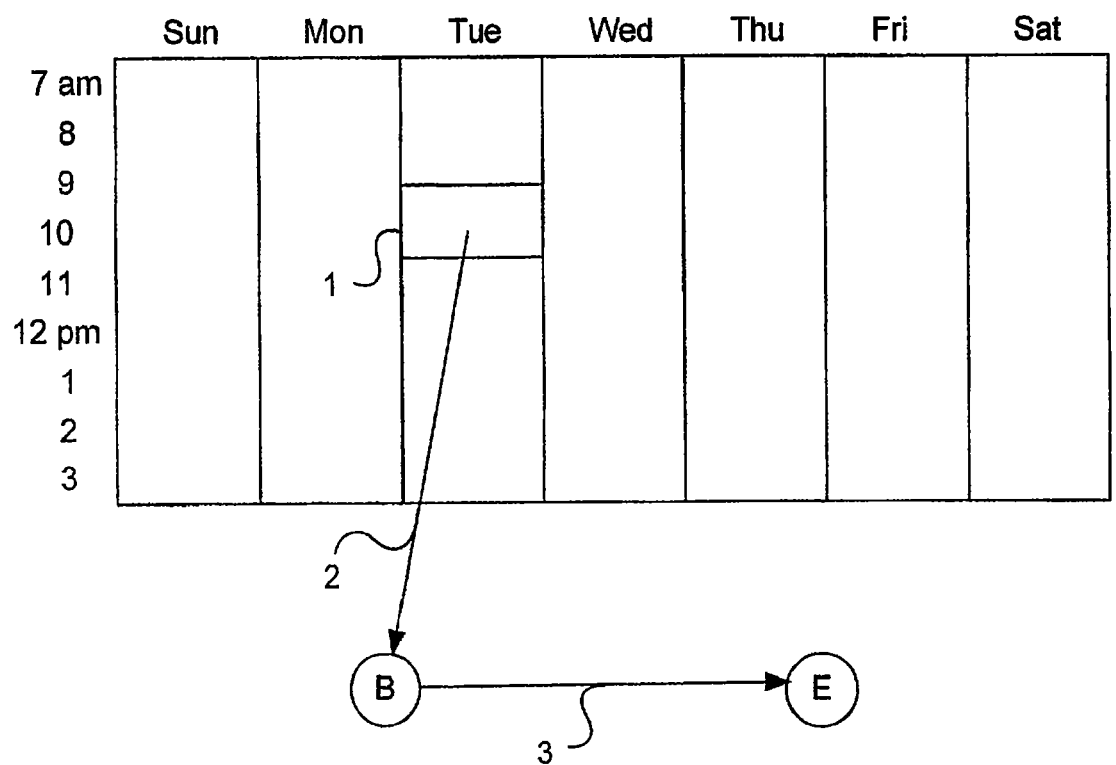
FIG. 28 illustrates a calendar system detecting that a calendar event matches the current date and time and sending a message to a workflow system to initiate a workflow associated with the calendar event.

FIG. 28 illustrates a calendar system displaying an event 1 (e.g., a meeting) set for 9 am Tuesday. When the time matches the set date and time, the calendar system sends email 2 to email address B to initiate a workflow route 3 having email address B and email address E.

Figure 29:
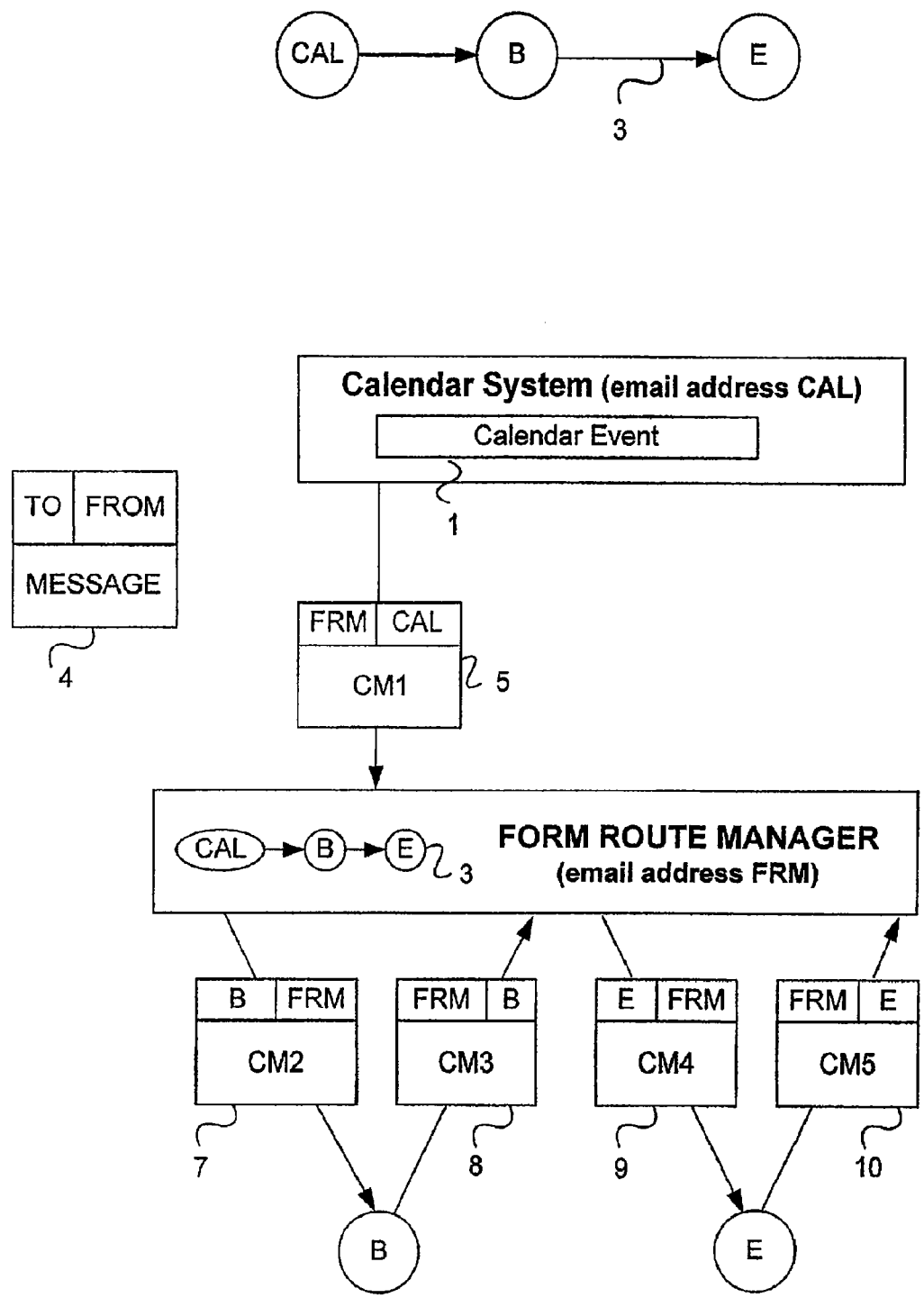
FIG. 29 illustrates the details of a workflow and messages sent by the calendar system and the workflow system to initiate a workflow from a calendar event.

FIG. 29 illustrates a workflow route 3 having a calendar system with an email address CAL, which initiates a workflow route where a user at email address B executes the next step and a user at email address E executes the final step. The email 4 contains from and to address fields to indicate the source and recipient of the email and a message body. There is an email system, a calendar system, the form route manager, and four email addresses shown in FIG. 29, namely, the calendar system with email address CAL, the form route manager with email address FRM, the user at email address B, and the user at email address E. The calendar system detects the calendar event 1 and sends a modified calendar alert such as an email 5 to the form route manager. The email 5 initiates the workflow route 3 in the form route manager. The form route manager examines the route 3 and determines that the email address B is the next step in the route 3 and sends an email 7 to the user at email address B who completes the step and sends an email 8 to the form route manager. The form route manager receives the email 8, examines the route 3, determines the user at email address E will execute the next step, and sends email 9 to the email address E. The user at email address E executes the work at that step and sends the email 10 to the form route manager, which examines the route 3 and determines that the route 3 is complete.

Figure 30:
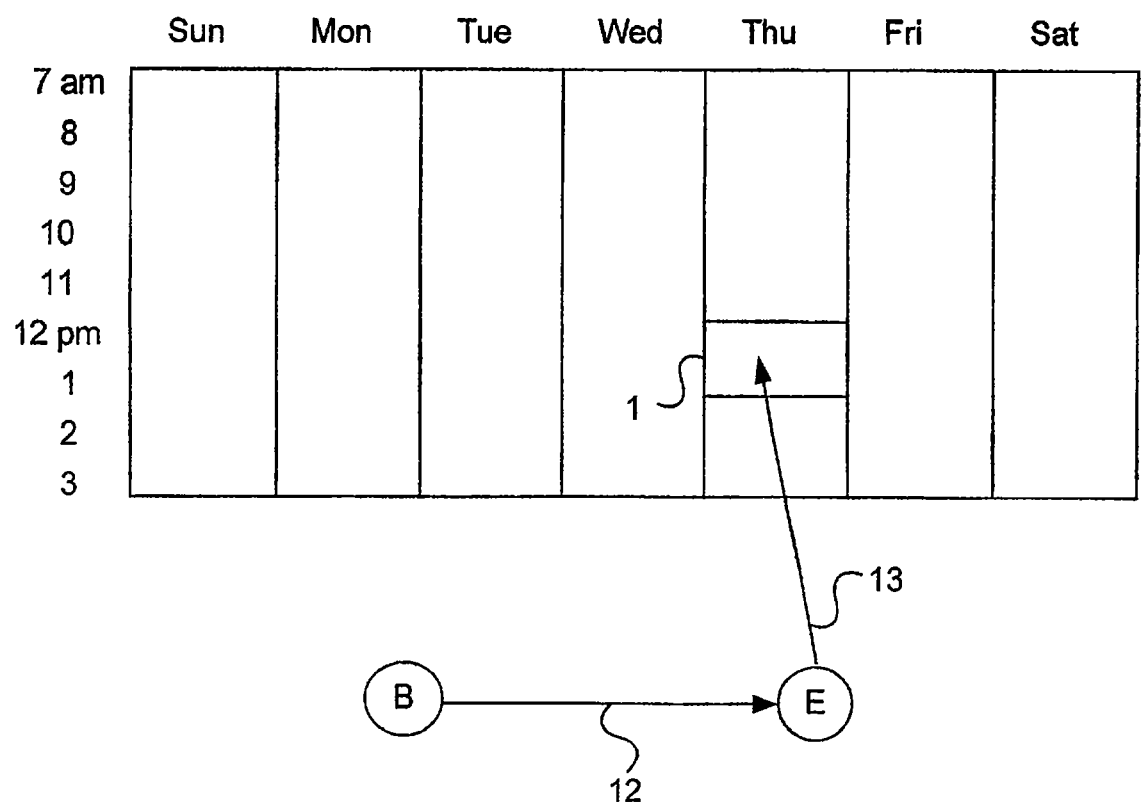
FIG. 30 illustrates a workflow executing a route where a route step completes and sends a notification message to the calendar system to create a calendar event based on the message.

FIG. 30 illustrates a process, where a user at email address B initiates a workflow route 12, followed by a work step executed by a user at email address E, and then an email 13 to a calendar system to schedule a calendar event 1 for Thursday at noon.

Figure 31:
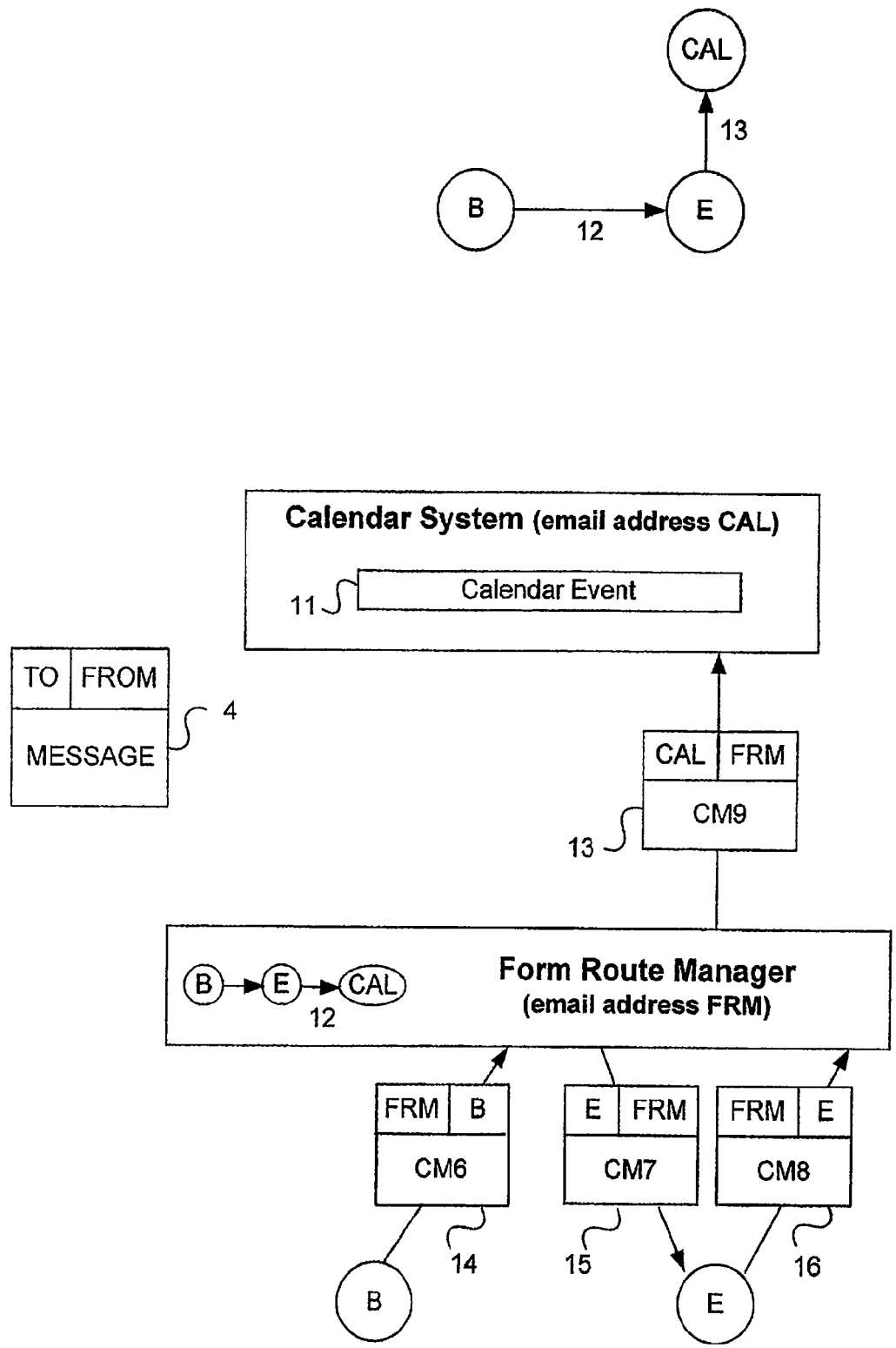
FIG. 31 illustrates the details of the route and messages sent by the workflow system and the calendar system to set a calendar event from the workflow route.

FIG. 31 illustrates a workflow route 12 initiated by a user at email address B followed by a user at email address E. The final route step at the user at email address E contains an indicator to send a notification message 13 to the calendar system. The notification message 13 follows the format of the calendar system to schedule a calendar event for a specific date and time. In response to notification message 13, the calendar system schedules a calendar event 11 in the calendar system. The email message format 4 includes the address fields to, from, and the message body. The user at email address B initiates the workflow route 12 by sending an email 14 to the form route manager. The form route manager examines the route 12, determines the next step is at email address E, and sends email 15 to email address E. When the user at email address E completes the step, an email 16 is sent to the form route manager. The form route manager receives the email 16, examines the route 12 and determines that the route is complete and that a notification email 13 is to be sent to the calendar system. The calendar system receives the notification email 13 and, based on the parameters for a specific date and time, schedules the calendar event 11. It should be noted that any route step can contain a notification indicator and a route can be designed to create calendar events at any specified route step. The calendar system and the workflow systems are integrated by use of appropriate messages. Email messages are easily used for this integration.

Another project management tool that can be used with the present invention is a project management system such as Microsoft Project. Microsoft Project is suitable, but persons of skill in the art will understand how the invention can be applied to other project management systems. Microsoft Project supports two facilities that can be used to implement message-based integration with the workflow system: a Mail Application Program Interface (MAPI) and Visual Basic macro development and execution capability. Microsoft Project uses email and the World Wide Web to assign tasks, request status on tasks, and to accept updating information as tasks progress and complete. Microsoft Project provides the user documentation, e.g., the help file and user manual, which are hereby incorporated by reference. The messages are designed for a person who manages the project to send messages to people on the team and so that the team members can accept or decline task assignments, respond to status requests, and send information on status. To execute these functions, Microsoft Project can use MAPI to create, send, receive and process messages. In one embodiment, the invention modifies these capabilities to automate these message-processing functions by use of Visual Basic macros.

Figure 32:
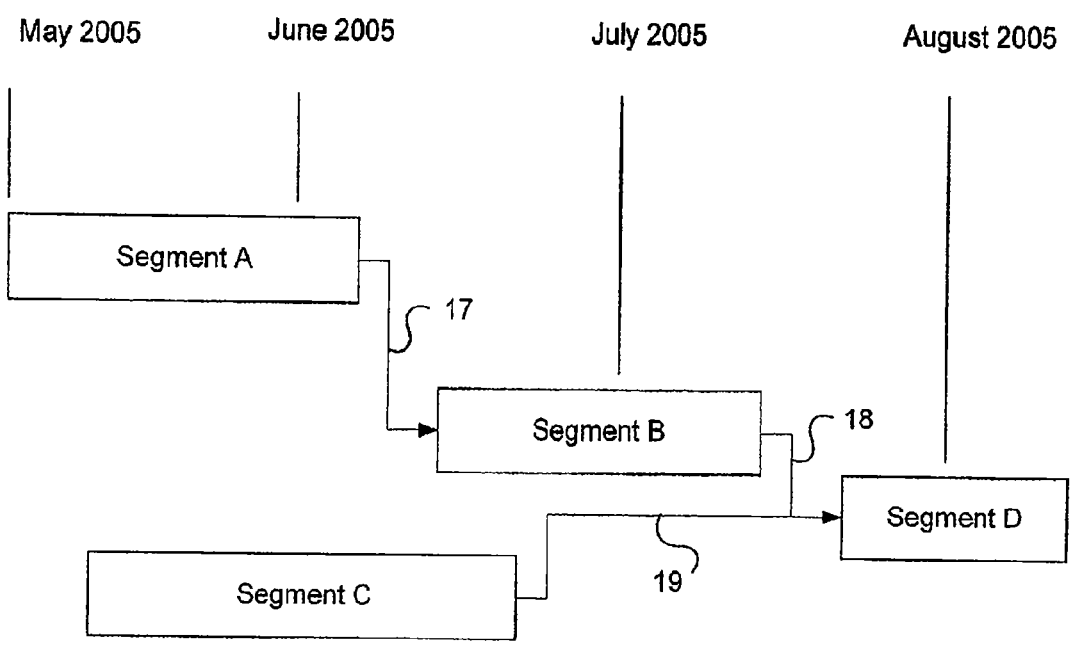
FIG. 32 illustrates project segments in a project management system and shows their relationship and the project plan with respect to a calendar.

FIG. 32 illustrates a project management program display of four project segments, the calendar dates for the beginning and end for each project segment, and the relationship between the project segments. The calendar display shows the estimated beginning and end dates of the project segments. For example, segment A begins early in May 2005 and is scheduled to complete in early June. Link 17 indicates that segment A must complete before segment B begins. Link 18 indicates that segment B must complete before segment D begins, and link 19 indicates that segment C must complete before segment D begins. The estimated project segment durations are the source of the plan and schedule of the overall project. The overall project duration is calculated based on the duration of segment A, plus the duration of segment B, plus the duration of segment D. If, however, the duration of segment C becomes larger than the sum of the durations of segment A and segment B, the calculated duration is the sum of segment C and segment D.

A project management system helps to estimate the duration of a complex project composed of many interrelated project segments. The project management system can identify the critical path for the project, that is, the sequence of project segments that determine the total project duration. In FIG. 32, one critical path is segment A, segment B, and segment D; another is segment C and segment D. The project management system can be used during the execution of the project. For example, after segment A is completed, the actual beginning and end dates can be entered, and a new estimate of the project end date can be calculated. However, in practice, capturing the actual dates is a difficult task and the project management system is used for planning but not for measuring the execution of a project. In many cases, the measurement is done on a periodic basis, at milestones or when it is apparent that the project is in trouble. With the actual dates for the completed project segments and new estimates of the segments that have not completed, the project can be planned again and a new completion date calculated. It would be beneficial if the project management system could calculate the completion date based on capturing the actual execution time of the project segments.

Figure 33:
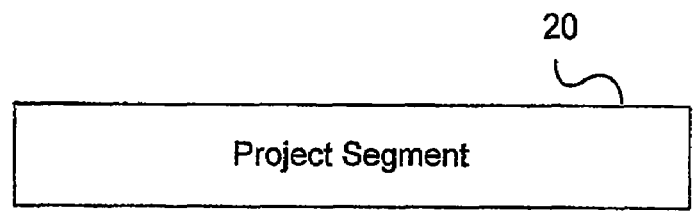
FIG. 33 illustrates the relationship of a project segment and a workflow system. A project management system initiates a workflow route with a message to the workflow system and the completion of the workflow route results in the workflow system sending a message to the project management system.
Figure 33:
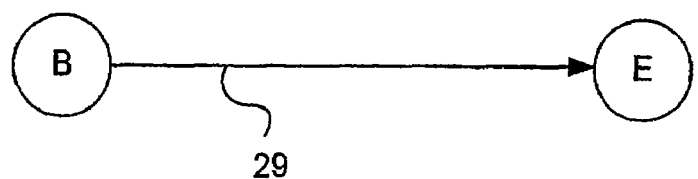
Figure 33:
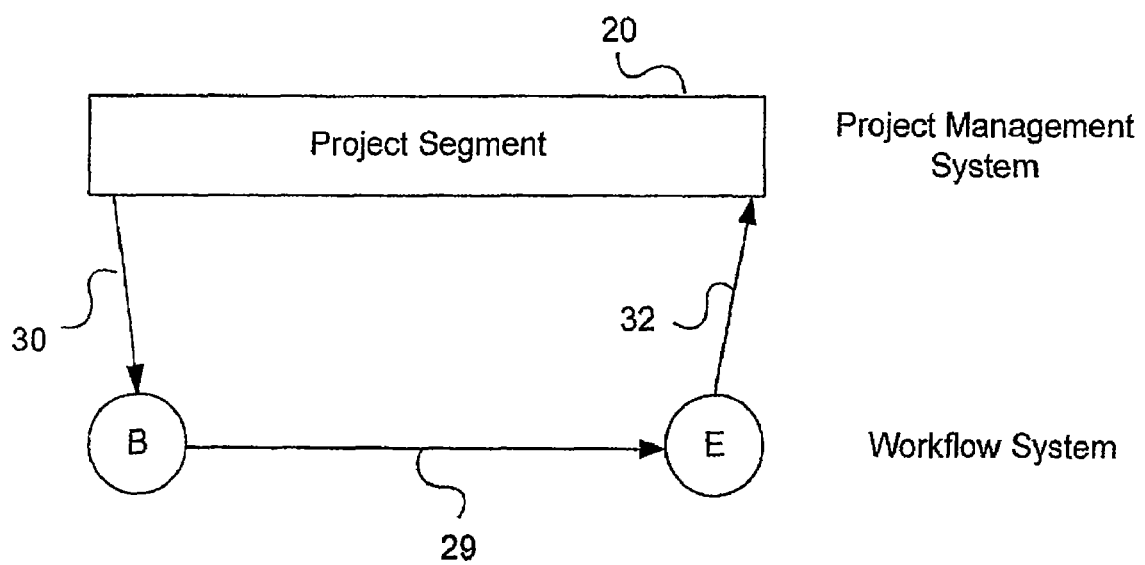

A workflow route can be used to control most project segments, which are processes. FIG. 33 illustrates the relationship between a project segment 20 and a workflow route 29. FIG. 33 also illustrates a project management system that sends a message 30 to a workflow system to initiate a workflow route 29 and the workflow system sends a message 32 to the project management system at the completion of the route 29. Integration of the project management system and the workflow system permits the project management system to initiate the execution of a project segment and to record the completion of the project segment. This permits the project management system to actually manage the project.

Figure 34:
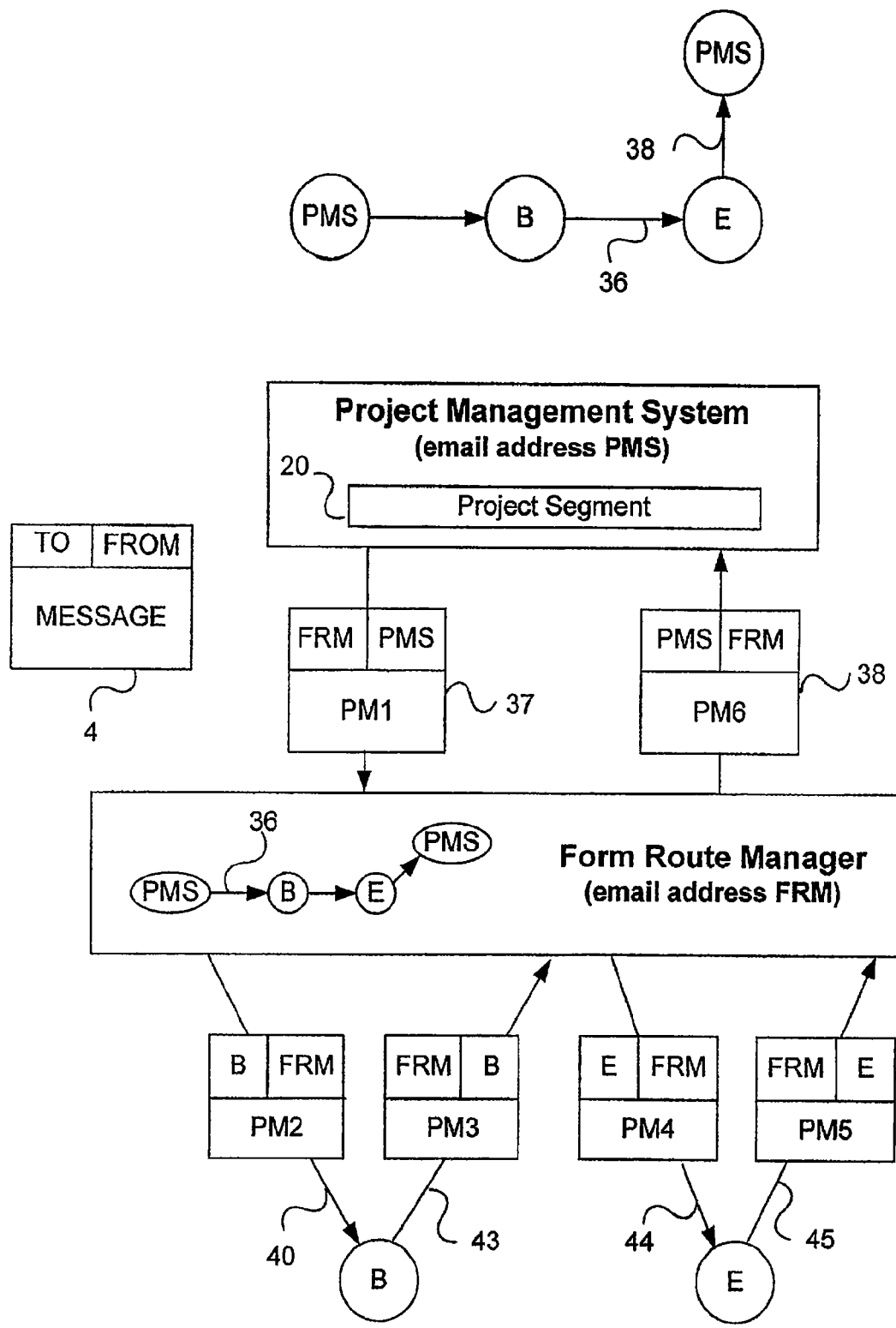
FIG. 34 illustrates the details of the relationships between the project management system and workflow system shown in FIG. 33.

FIG. 34 illustrates a route 36 that is initiated by a project management system with email address PMS followed by a user at email address B then a user at email address E. At the completion of the route 36, a notification message 38 is sent to the project management system. FIG. 34 illustrates the email message format 4 with the address fields to and from, the message body, and a sequence of messages to implement the integration of a project segment 20 with a route 36. The project management system initiates the project segment 20 and sends a message 37 to the form route manager.

The message body of email 37 initiates workflow route 36. The form route manager examines the route 36 and determines that the next step is email address B and sends email 40 to email address B. The user at email address B executes the workflow step and returns email 43 to the form route manager. The form route manager receives the email 43, examines the route 36, determines that the next step is email address E, and sends email 44 to email address E. The user at email address E executes the workflow step and returns email 45 to the form route manager. The form route manager receives email 45, examines the route 36, determines that the route 36 is complete, and sends a notification message 38 to the email address PMS of the project management system.

Figure 35:
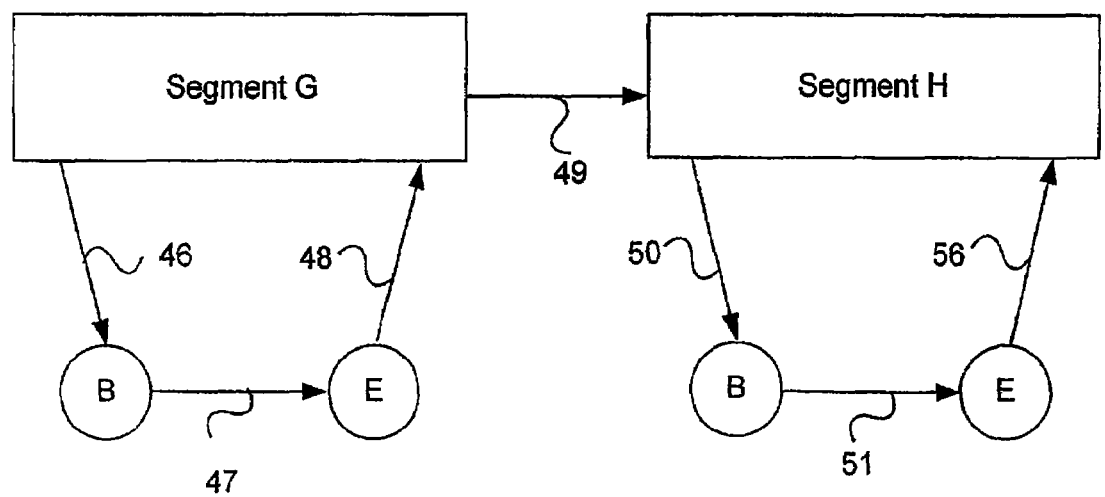
FIG. 35 illustrates the relationship between two project segments where completion of segment G is a condition for the beginning of segment H and the relationship of each project segment to their associated workflow routes.

FIG. 35 illustrates the relationship between a segment G with a link 49 to a segment H where completion of segment G triggers the beginning of segment H. FIG. 35 further illustrates segment G associated with workflow route 47 and segment H associated with a workflow route 51. The beginning of segment G sends message 46 to initiate route 47. At the completion of route 47, message 48 is sent to indicate the completion of segment G. The link 49 in the project management system indicates the completion of segment G will initiate segment H and will send message 50 to initiate workflow route 51. At the completion of route 51, a message 56 is sent to indicate the completion of segment H.

Figure 36:
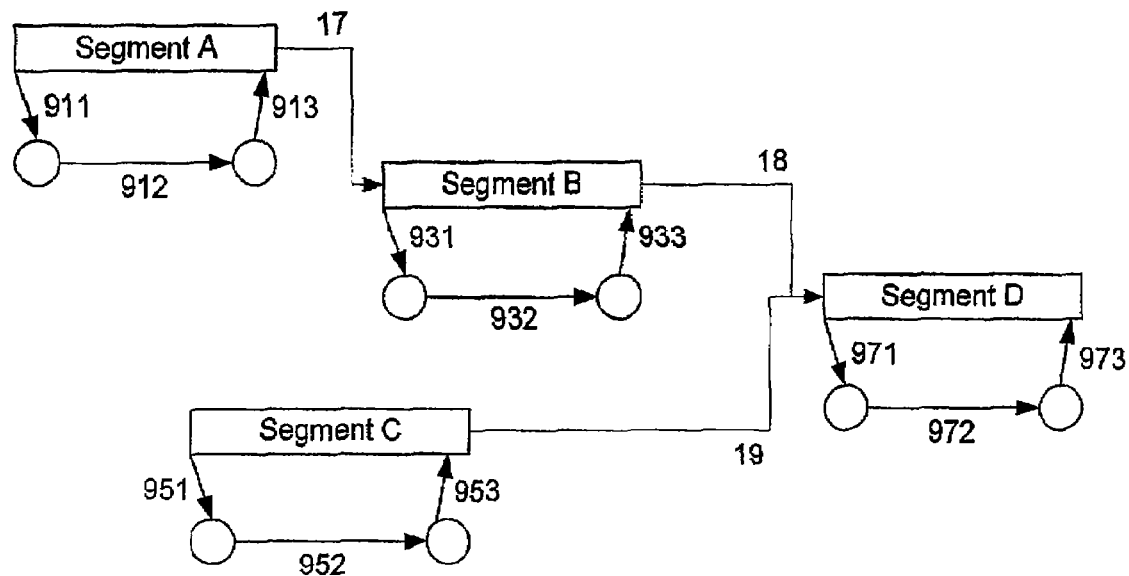
FIG. 36 illustrates the details of the relationship of project segments and their associated workflow routes to implement the set of projects illustrated in FIG. 32.

FIG. 36 illustrates the set of segments shown in FIG. 32. The task for segment A is contained in route 912, for segment B in route 932, for segment C in route 952, and for segment D in route 972. The project management system starts segment A by initiating the route 912 with a message 911 and receives message 913 at the completion of route 912 signaling the completion of the task for segment A. The project management system has a relationship 17 so the completion of segment A starts segment B. The project management system starts segment B by sending message 931 to initiate route 932. When the route 932 completes, message 933 is sent to the project management system signaling the completion of the task for segment B. In parallel, segment C starts with a message 951 to initiate route 952. When route 952 completes, message 953 is sent to signal the completion of the task for segment C. Relationships 18 and 19 relate the beginning of segment D to when segment B and segment C complete. Segment D starts by sending a message 971 to initiate route 972. When route 972 completes, segment D and the project are completed.

Figure 37:
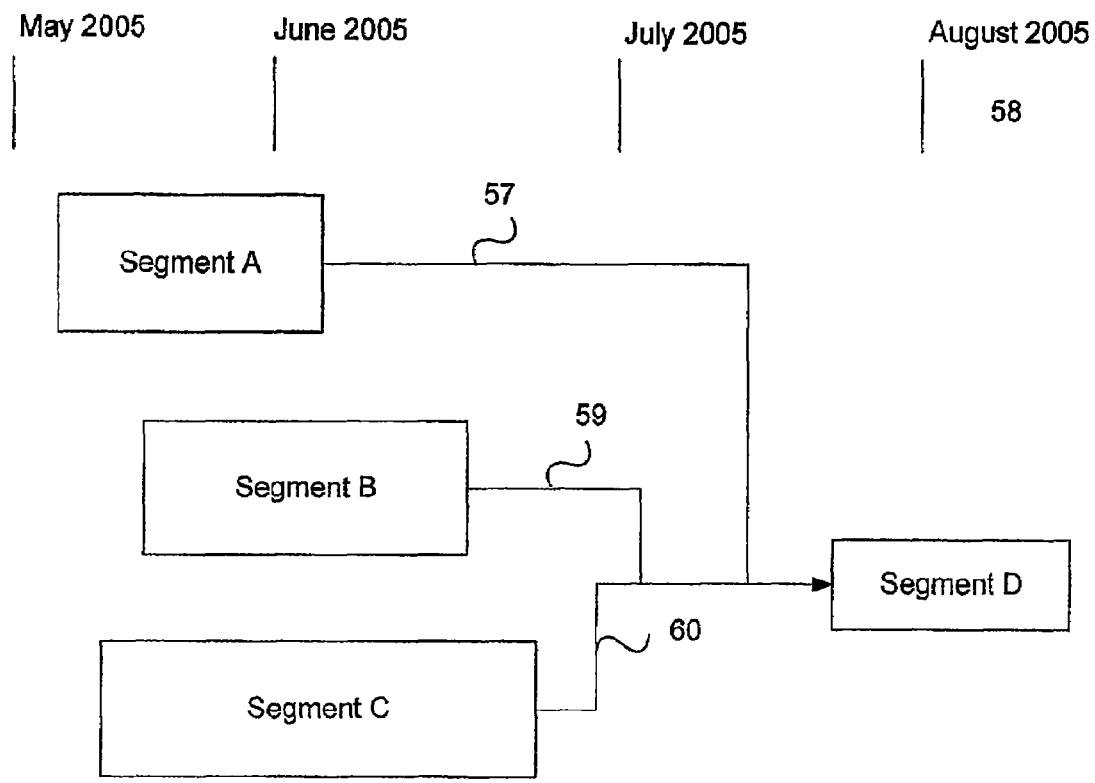
FIG. 37 illustrates the project segments of FIG. 32 when their relationship changes such that segment A is no longer a condition for the beginning of segment B, that is, they may run in parallel.
Figure 38:
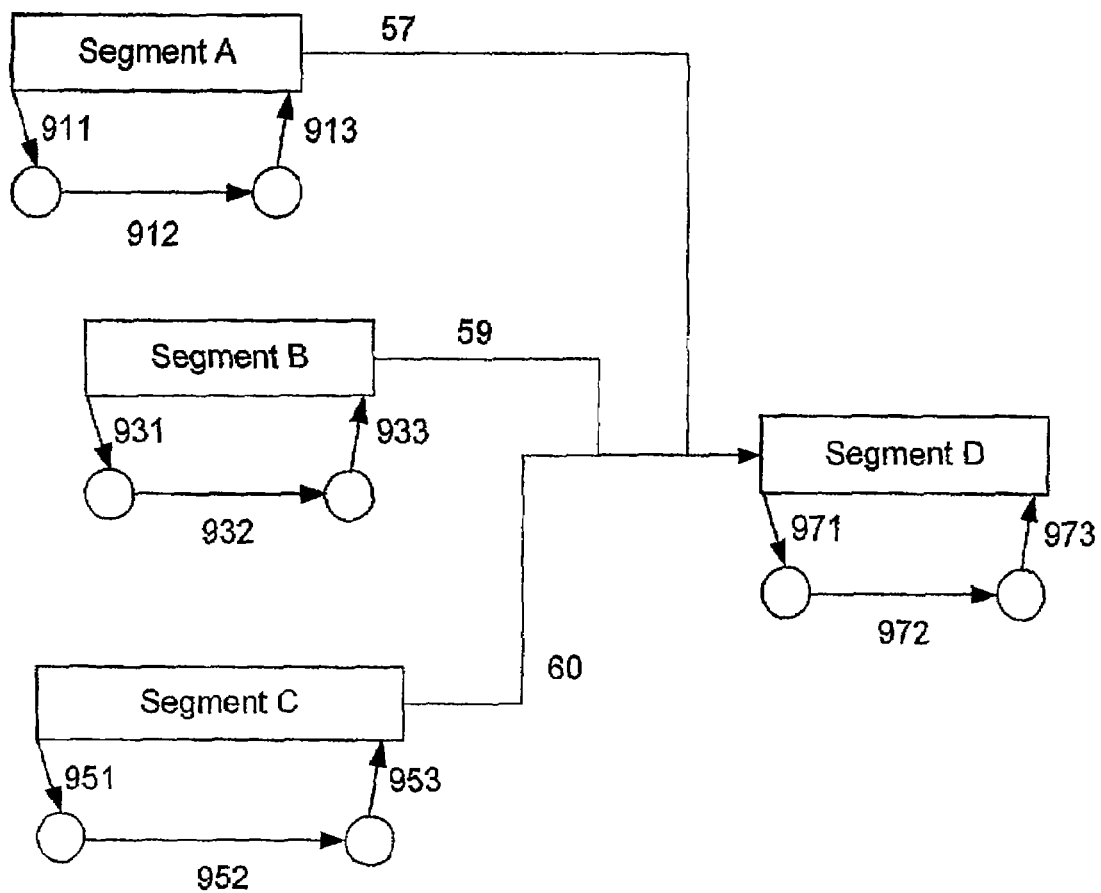
FIG. 38 illustrates that the relationship between the individual projects and their associated workflow routes remain even when the relationship between segments change as shown in FIG. 37.

FIG. 38 illustrates the relationships between individual project segments and their associated workflow routes remain the same even if the relationship between the segments changes. For example, suppose during the project the relationship between segments change from that depicted in FIG. 32 to that in FIG. 37. This new set of relationships between the segments is indicated by link 57, link 59, and link 60. Now segment A and segment B are in parallel rather than in series with each, while as before they and segment C must all finish before beginning segment D. This might appear to result in extra work to change the associated workflow routes. However, it becomes clear upon comparing FIGS. 36 and 38 that each project segment maintains its own associated workflow route so the change in the relationships between the segments permitted a corresponding change in relationship between the associated workflow routes without additional effort.

Figure 39:
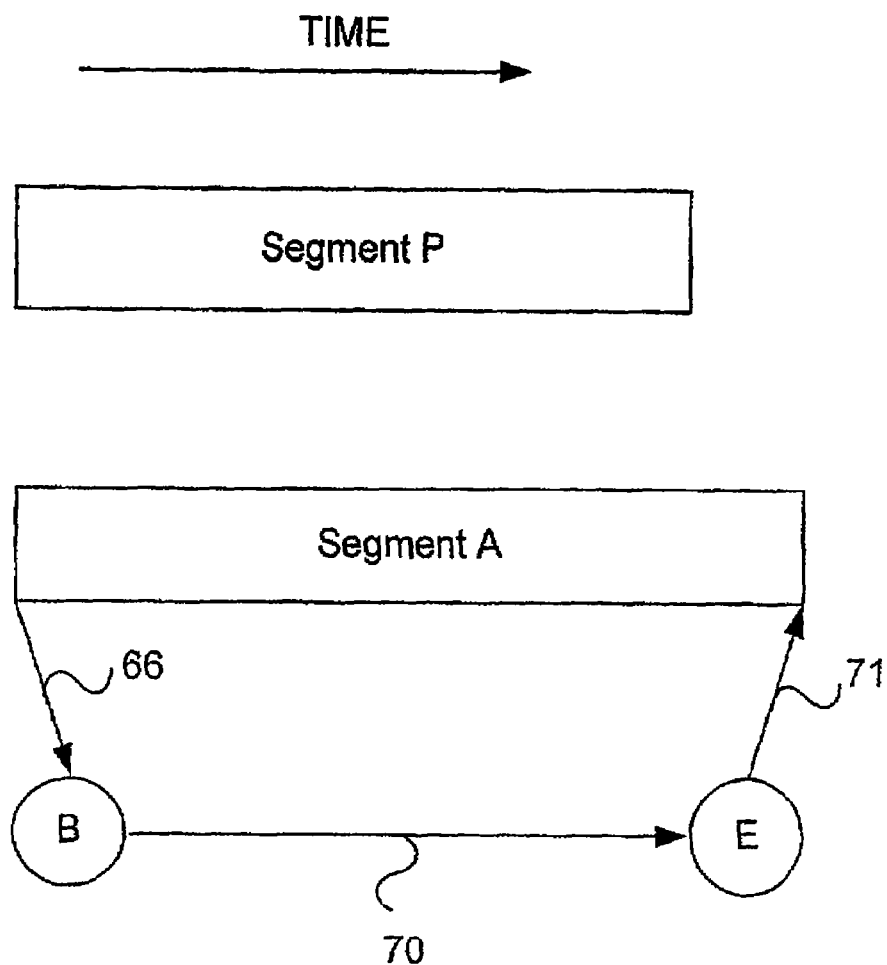
FIG. 39 illustrates how the workflow route reports time for completing a project segment and updates the project management system.

FIG. 39 illustrates how workflow of the present invention can be used to control and track the execution of an individual project segment A. As shown, the workflow route includes an individual segment P, which represents the estimated duration and segment A, which represents the actual duration. At the beginning of segment A, the project management system sends a message 66 at step B of the workflow route 70, and at step E the workflow system sends a message 71 to the project management system to indicate the completion of segment A. The workflow route can then calculate and report the time for completing a project segment and thus keep the project management system current.

Figure 40A:
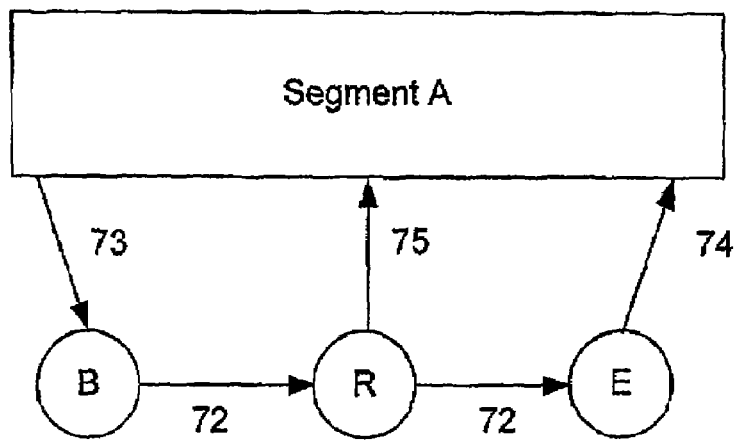
FIGS. 40A and 40B illustrate a workflow route where the workflow system sends a message at a step to the project management system to report on the progress toward completion of a project segment.
Figure 40B:
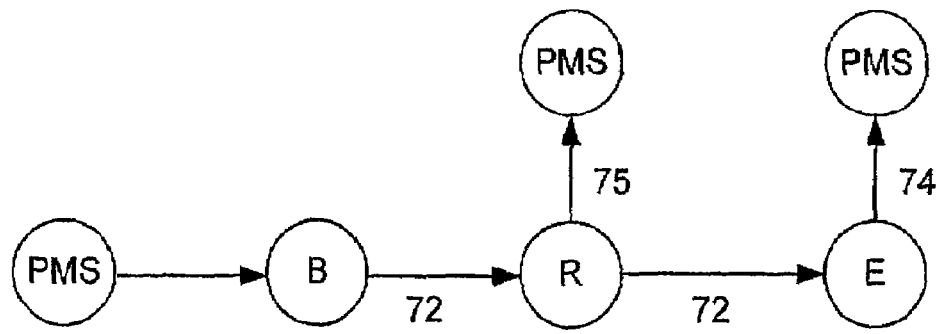

FIGS. 40A and 40B illustrate if a project segment is modified and it changes the workflow route, the modified route can be entered into the workflow system and the relationship can be set in the workflow route and in the project segment. For example, if the project segment A shown in FIG. 40A requires interim reporting, a step R can be added in route 72. As before the addition, a message 73 initiates the route 72 at step B, but when the route 72 reaches step R, a message 75 is sent to the project management system. When route 72 completes at step E, a message 74 is sent to the project management system. The project planning, actual execution tracking, and project recovery planning use the project management system. The linking of the systems by use of messages creates a project planning and execution tracking system.

I hereby incorporate herein the computer program listing described in U.S. Pat. No. 5,978,836.

What is claimed is:

1. An apparatus, comprising:
a memory;
a form route manager configured to access a Web page, the Web page being associated with an initial travel reimbursement document configured to be populated by a user to produce a submitted travel reimbursement document, at least a portion of the form route manager including at least a portion of the memory,
the form route manager configured to send an e-mail including a Web address associated with the submitted travel reimbursement document to a first destination address from a plurality of destination addresses associated with approval of submitted travel reimbursement document,
the form route manager configured to receive an e-mail approval from the first destination address, the form route manager configured to send an e-mail containing the Web address associated with the submitted travel reimbursement document to a next destination address from the plurality of destination addresses.

2. The apparatus of claim 1, wherein:
the user is associated with a notification address; and
the form route manager configured to send an e-mail to the notification address when the e-mail to the first destination address is sent.

3. The apparatus of claim 1, wherein:
the user is associated with a notification address; and
the form route manager configured to send an e-mail to the notification address when an e-mail response is received from a last destination address from the plurality of destination addresses.

4. The apparatus of claim 1, wherein:
the user is associated with a notification address; and
the form route manager configured to send an e-mail to the notification address when the e-mail to the first destination address is sent and when an e-mail response is received from a last destination address from the plurality of destination addresses.

5. The apparatus of claim 1, wherein:
the user is associated with a notification address; and
the form route manager configured to send an e-mail to the notification address when an e-mail rejection is received from an address from the plurality of destination addresses.

6. The apparatus of claim 1, wherein:
the user is associated with a notification address; and
the form route manager is configured to send an e-mail to the notification address when an approval is received from a destination address from the plurality of destination addresses.

7. The apparatus of claim 1, wherein:
the plurality of destination addresses includes at least one of an address of a manager of the user, an address of a finance department member and an address of an accounting department member.

8. An apparatus, comprising:
a memory;
a form route manager configured to receive an e-mail from a user, the e-mail including a travel reimbursement document having an approval request, at least a portion of the form route manager including at least a portion of the memory,
the form route manager configured to send an e-mail including the travel reimbursement document to a first destination address from a plurality of destination addresses associated with approval of the travel reimbursement document, the form route manager configured to receive an e-mail approval from the first destination address, and
the form route manager configured to send an e-mail including at least one of the travel reimbursement document or a modified version of the travel reimbursement document to a next destination address from the plurality of destination addresses.

9. The apparatus of claim 8, wherein:
the user is associated with a notification address; and
the form route manager configured to send an e-mail to the notification address when the e-mail to the first destination address is sent.

10. The apparatus of claim 8, wherein:
the user is associated with a notification address; and
the form route manager configured to send an e-mail to the notification address when an e-mail response is received from a last destination address from the plurality of destination addresses.

11. The apparatus of claim 8, wherein:
the user is associated with a notification address; and
the form route manager configured to send an e-mail to the notification address when the e-mail to the first destination address is sent and when an e-mail response is received from a last destination address from the plurality of destination addresses.

12. The apparatus of claim 8, wherein:
the user is associated with a notification address; and
the form route manager configured to send an e-mail to the notification address when an e-mail rejection is received from an address from the plurality of destination addresses.

13. The apparatus of claim 8, wherein:
the user is associated with a notification address; and
the form route manager is configured to send an e-mail to the notification address when an approval is received from a destination address from the plurality of destination addresses.

14. The apparatus of claim 8, wherein:
the plurality of destination addresses includes at least one of an address of a manager of the user, an address of a finance department member and an address of an accounting department member.

15. A method, comprising:
receiving a message from a user, the message including information associated with a travel reimbursement document;
sending an e-mail including information associated with the travel reimbursement document to a first destination address from a plurality of destination addresses associated with approval of the travel reimbursement document;
receiving an e-mail approval from the first destination address; and
sending an e-mail including information associated with the travel reimbursement document to a next destination address from the plurality of destination addresses.

16. The method of claim 15, wherein the message from the user is based on a Web page associated with an initial travel reimbursement document.

17. The method of claim 15, wherein:
the e-mail sent to the first destination address includes a Web address to a submitted travel reimbursement document; and
the e-mail sent to the next destination address includes the Web address to the submitted travel reimbursement document.

18. The method of claim 15, wherein the message from the user is an e-mail including an initial travel reimbursement document having an approval request.

19. The method of claim 15, further comprising:
sending an e-mail to a notification address associated with the user after the sending the e-mail to the first destination address.

20. The method of claim 15, further comprising:
sending an e-mail to a notification address associated with the user when an e-mail response is received from a last destination address from the plurality of destination addresses.

21. The method of claim 15, wherein:
the sending an e-mail to a destination address from the plurality of destination addresses includes at least one of an address of a manager of the user, an address of a finance department member and an address of an accounting department member.

22. The method of claim 15, wherein:
the receiving the message from the user, the sending the e-mail to the first destination address, the receiving the e-mail from the first destination address and the sending the e-mail to the next destination address is from a computer within a network.

* * * * *